(12) United States Patent
Emigh

(10) Patent No.: US 8,881,520 B2
(45) Date of Patent: Nov. 11, 2014

(54) LINEAR ROLLER BEARING ASSEMBLY AND SUB-ASSEMBLY AND RECIPROCATING MACHINERY INCORPORATING THE SAME

(76) Inventor: S. Grant Emigh, Wilsonville, OR (US)

(*) Notice: Subject to any disclaimer, the term of this patent is extended or adjusted under 35 U.S.C. 154(b) by 0 days.

(21) Appl. No.: 13/495,984

(22) Filed: Jun. 13, 2012

(65) Prior Publication Data

US 2012/0255295 A1    Oct. 11, 2012

Related U.S. Application Data

(63) Continuation-in-part of application No. 12/776,283, filed on May 7, 2010, now Pat. No. 8,220,258.

(60) Provisional application No. 61/176,221, filed on May 7, 2009.

(51) Int. Cl.

| | |
|---|---|
| F01B 29/10 | (2006.01) |
| F02G 1/04 | (2006.01) |
| F16C 19/00 | (2006.01) |
| B21K 1/10 | (2006.01) |
| B21D 53/10 | (2006.01) |
| B21K 1/76 | (2006.01) |
| B23P 17/00 | (2006.01) |
| H01H 15/00 | (2006.01) |
| H01H 15/10 | (2006.01) |
| H01H 19/635 | (2006.01) |
| H01H 1/12 | (2006.01) |
| F16C 11/12 | (2006.01) |
| F16H 19/06 | (2006.01) |

(52) U.S. Cl.
CPC ............... *F16C 11/12* (2013.01); *F16H 19/06* (2013.01)
USPC ....... 60/525; 60/517; 29/898.03; 29/898.061; 29/898.062; 29/898.064; 200/16 R; 200/503; 384/50; 384/52; 384/55; 384/56

(58) Field of Classification Search
CPC .......... F02G 1/043; F16C 29/04; F16H 19/06
USPC ................ 384/50, 52, 55, 56; 74/89.2, 89.22; 60/517, 525; 29/898, 898.03, 898.061, 29/898.062, 898.064; 200/16 R, 503
See application file for complete search history.

(56) References Cited

U.S. PATENT DOCUMENTS 3,452,175 A * 6/1969 Wilkes ........................ 200/503
3,452,309 A * 6/1969 Wilkes ........................ 335/209

(Continued)

FOREIGN PATENT DOCUMENTS

| JP | 2000104733 A | 4/2000 |
|---|---|---|
| JP | 2001221229 A | 8/2001 |
| KR | 1019920001073 A1 | 1/1992 |

OTHER PUBLICATIONS

ISA/KR, International Search Report/Written Opinion in related application PCT/US2010/034128, Jan. 3, 2011.

(Continued)

*Primary Examiner* — Kenneth Bomberg
*Assistant Examiner* — Daniel Wagnitz
(74) *Attorney, Agent, or Firm* — Marger Johnson & McCollom, PC

(57) ABSTRACT

A roller bearing sub-assembly can include a first mounting portion, a second mounting portion spaced apart from the first mounting portion, a first roller disposed between the first and second mounting portions and straps wrapped partially around different portions of the first roller. The first mounting portion, second mounting portion, first roller and straps are configured such that the first and second mounting portions are moveable relative to each other along a selected direction for a distance that is approximately equal to a circumference of the first roller in opposite directions from a mid-stroke position. Linear roller bearing assemblies and methods of forming linear roller bearing assemblies are also disclosed, as are multi-cylinder Stirling engines and a thermal energy recovery system.

25 Claims, 28 Drawing Sheets

(56) References Cited

U.S. PATENT DOCUMENTS

| | | | | |
|---|---|---|---|---|
| 3,471,668 A | * | 10/1969 | Wilkes | 200/503 |
| 3,488,098 A | * | 1/1970 | Sobczak | 74/89.2 |
| 3,538,706 A | | 11/1970 | Toepel | |
| 3,548,138 A | * | 12/1970 | Van Dine | 200/503 |
| 3,622,211 A | | 11/1971 | Mitton | |
| 3,643,048 A | * | 2/1972 | Crow et al. | 200/503 |
| 3,643,049 A | | 2/1972 | LuConic et al. | |
| 3,651,291 A | * | 3/1972 | Bluem | 200/503 |
| 3,691,871 A | * | 9/1972 | Gladow et al. | 475/182 |
| 3,739,648 A | | 6/1973 | Payst | |
| 3,810,689 A | | 5/1974 | Moodie | |
| 3,850,043 A | * | 11/1974 | Tarbox | 74/89.2 |
| 3,859,488 A | * | 1/1975 | Jones | 200/503 |
| 3,932,045 A | | 1/1976 | Hillberry et al. | |
| 3,956,895 A | | 5/1976 | Noble et al. | |
| 4,018,488 A | * | 4/1977 | Manson | 384/18 |
| 4,278,304 A | * | 7/1981 | Traut | 384/51 |
| 4,290,264 A | | 9/1981 | Haines | |
| 4,346,945 A | | 8/1982 | Tsuboi | |
| 4,400,941 A | | 8/1983 | Rauch | |
| 4,973,291 A | * | 11/1990 | Mottate | 474/140 |
| 5,074,114 A | | 12/1991 | Meijer et al. | |
| 5,462,363 A | * | 10/1995 | Brinkman | 384/91 |
| 5,647,217 A | | 7/1997 | Penswick et al. | |
| 5,916,350 A | | 6/1999 | Varga | |
| 6,568,853 B2 | | 5/2003 | Mochizuki | |
| 7,240,580 B2 | | 7/2007 | Everman | |
| 2004/0197037 A1 | | 10/2004 | Weissflog | |
| 2010/0281861 A1 | * | 11/2010 | Emigh | 60/525 |

OTHER PUBLICATIONS

Hargreaves, C.M., "The Philips Stirling Engine," pp. 123, 340-342, Elsevier, 1991.

* cited by examiner

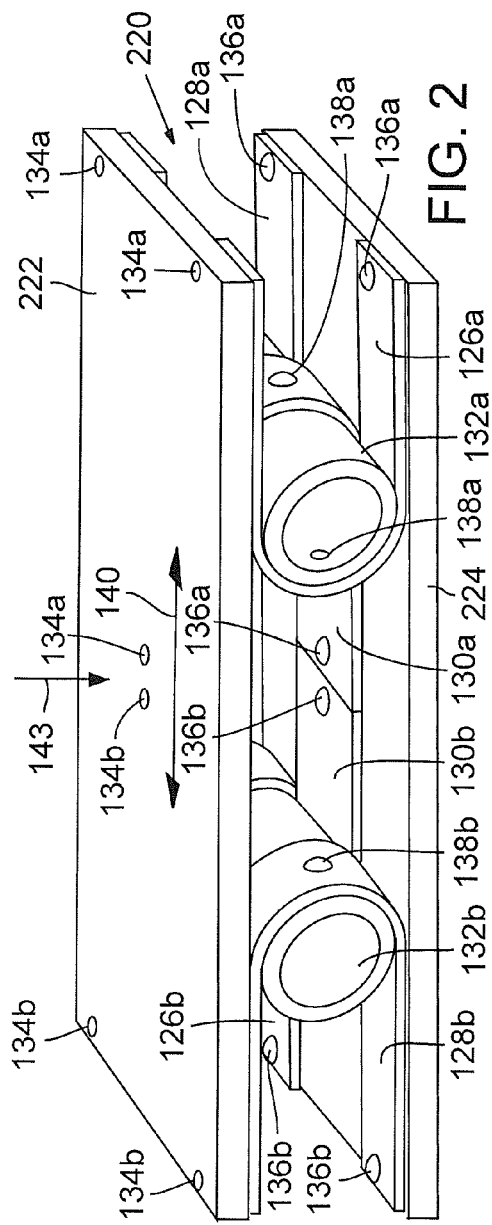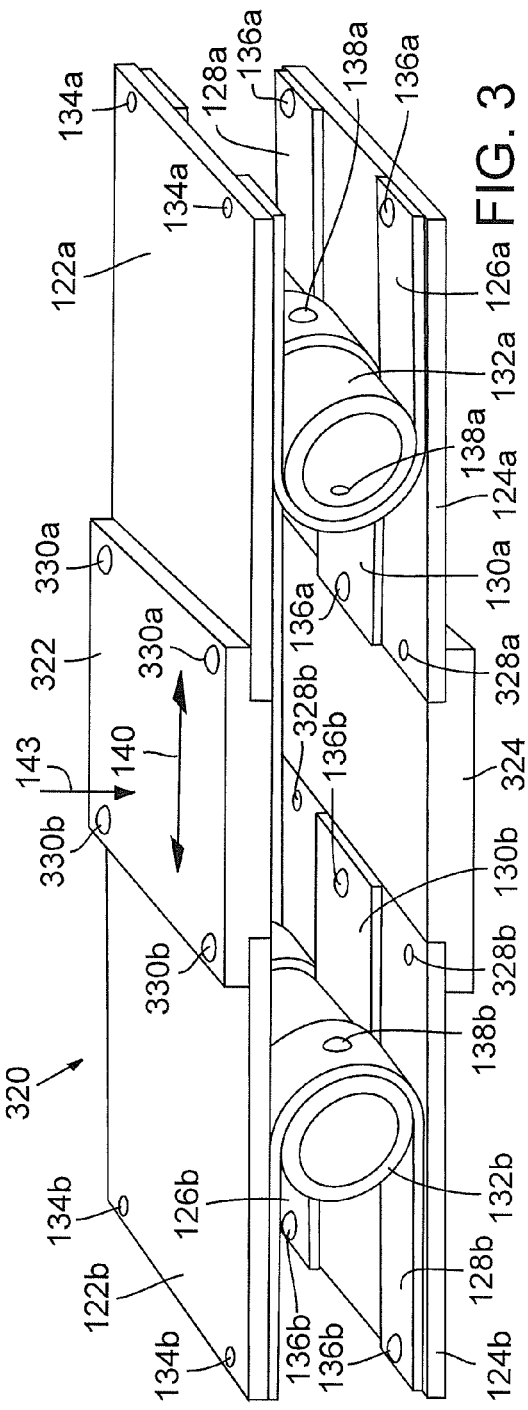

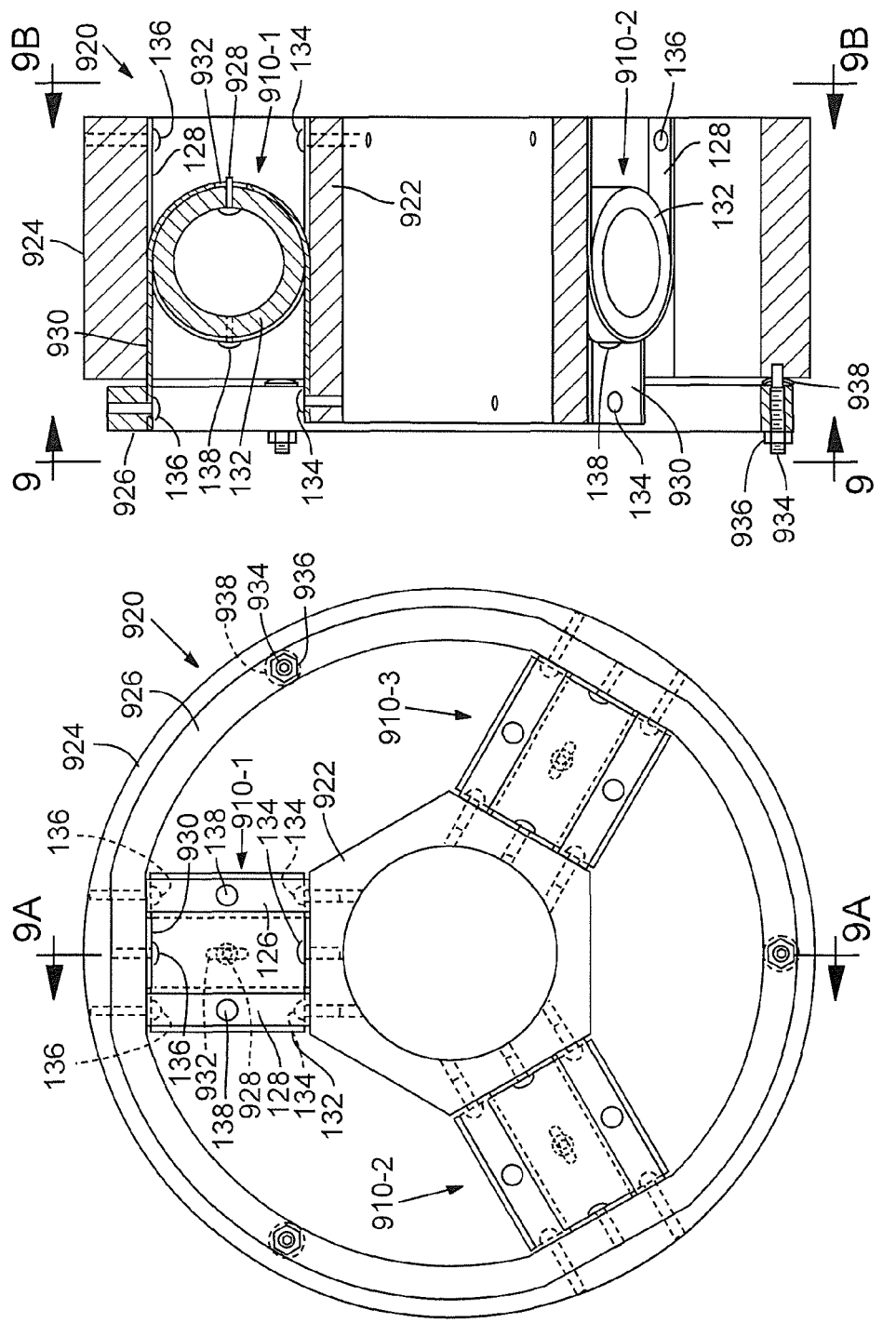

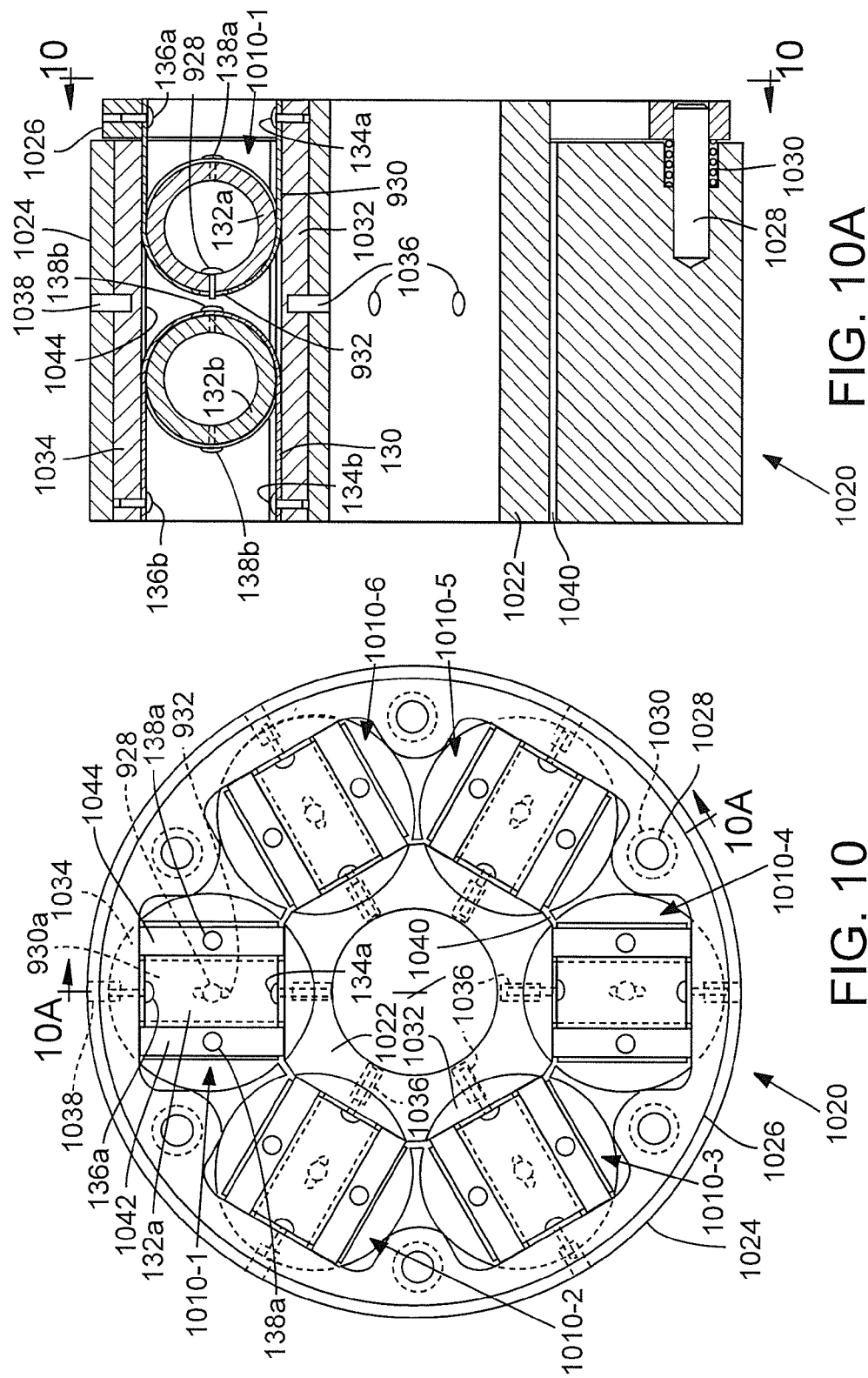

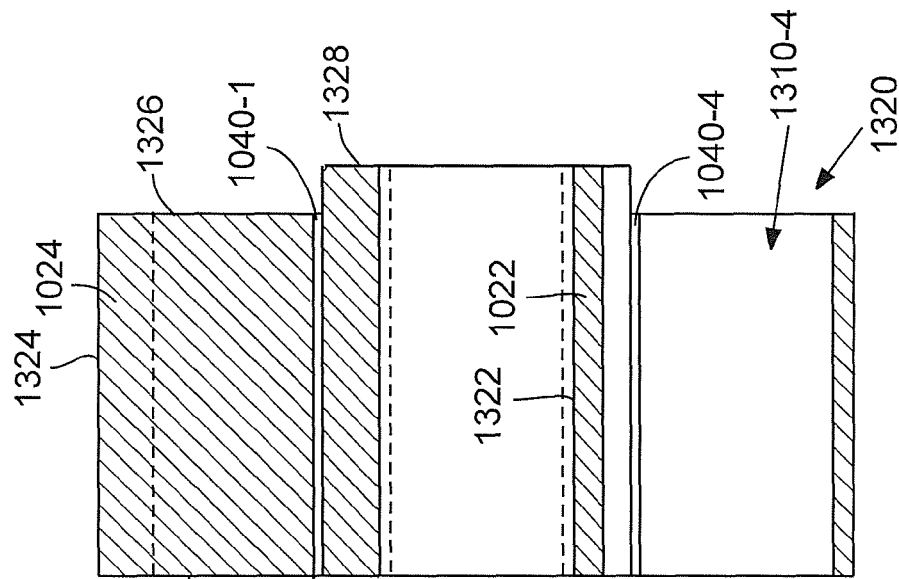
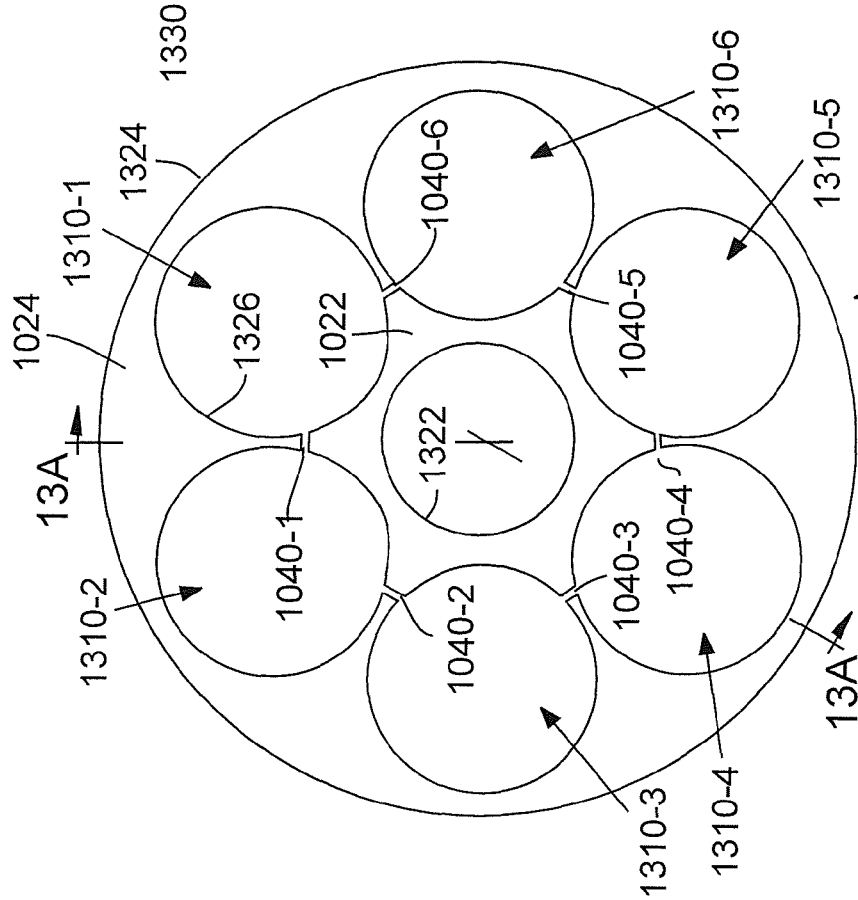
FIG. 13A
FIG. 13

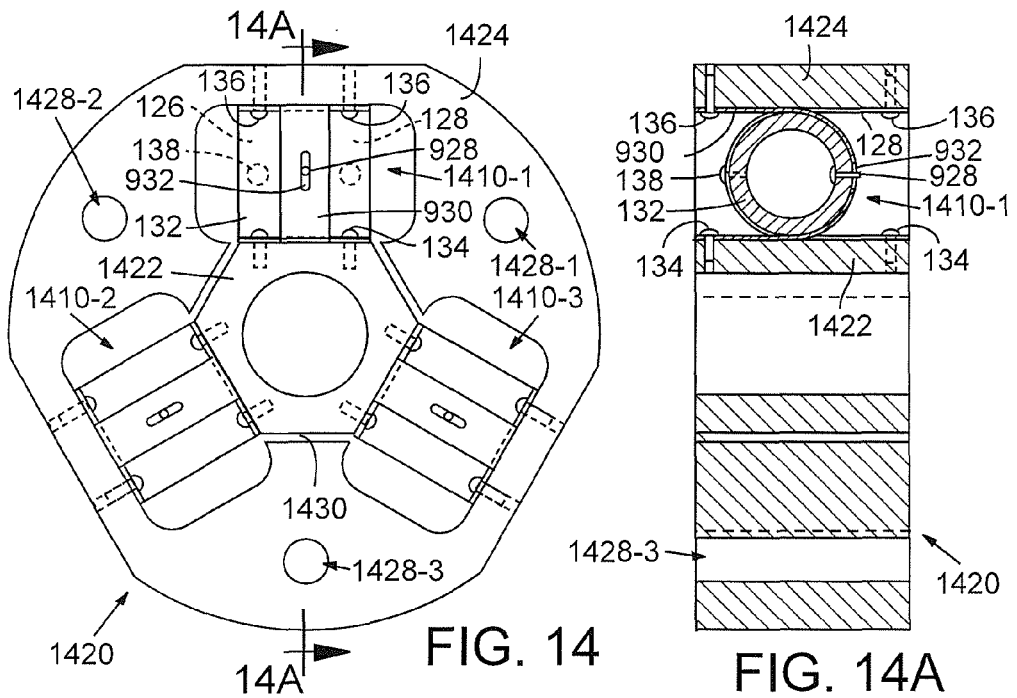
FIG. 14
FIG. 14A
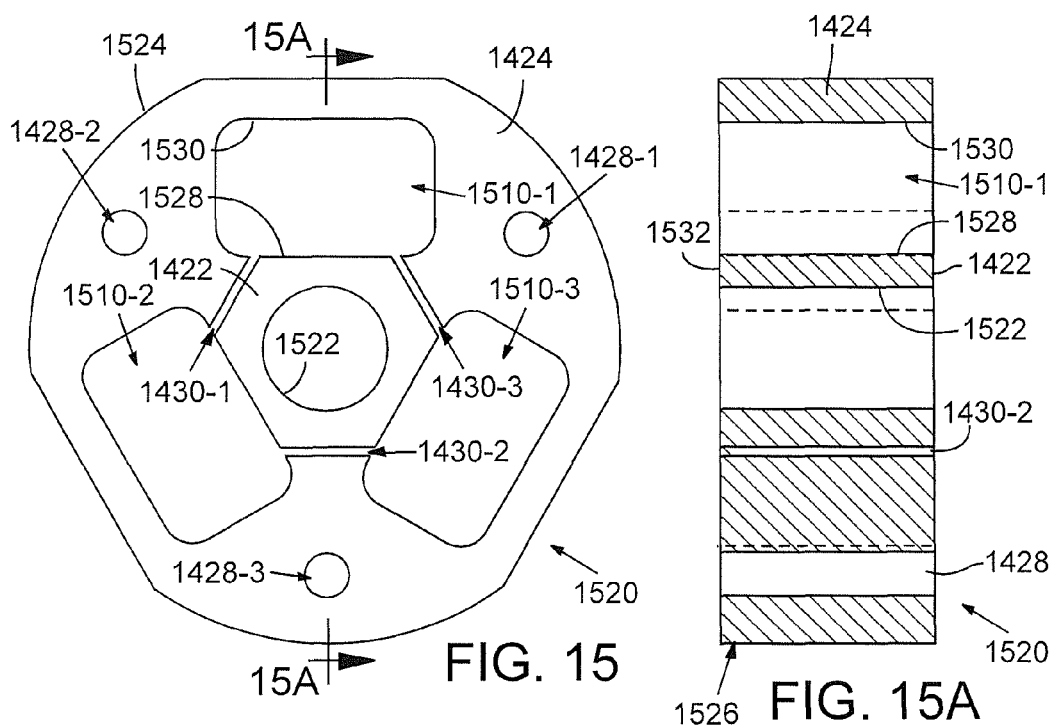
FIG. 15
FIG. 15A

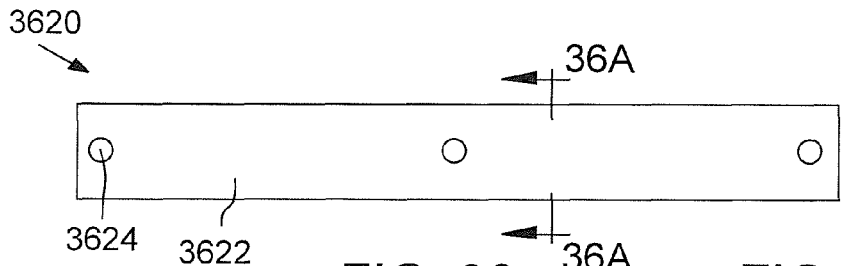 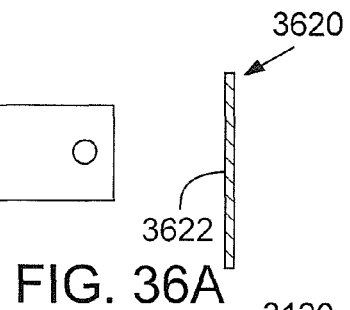
FIG. 36  FIG. 36A
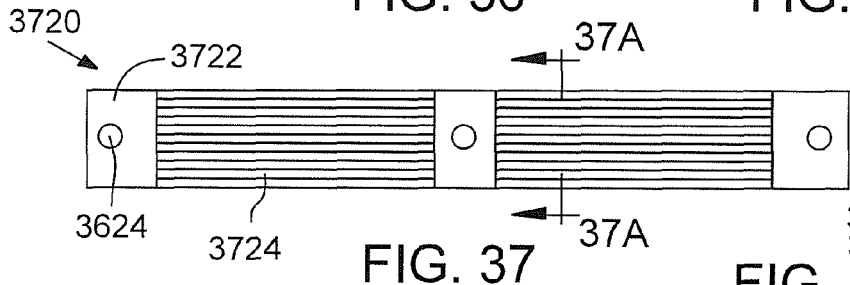 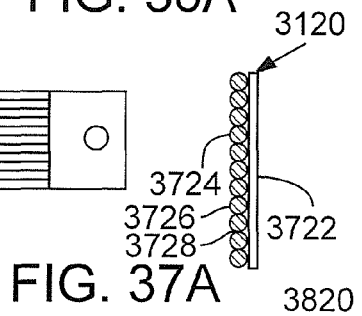
FIG. 37  FIG. 37A
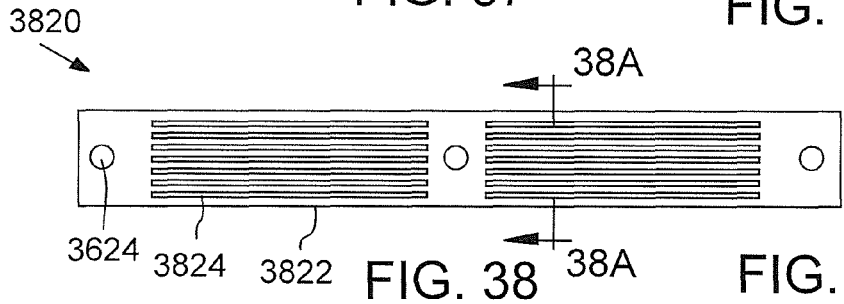 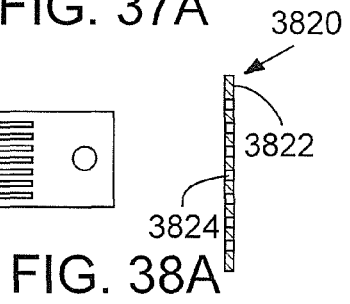
FIG. 38  FIG. 38A
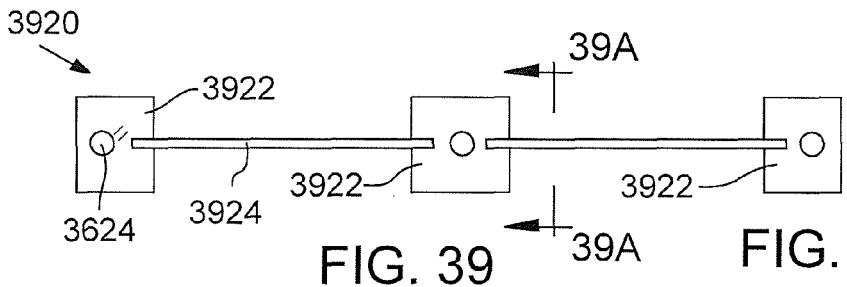 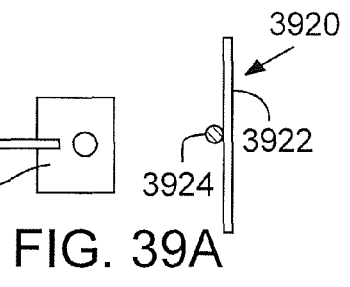
FIG. 39  FIG. 39A
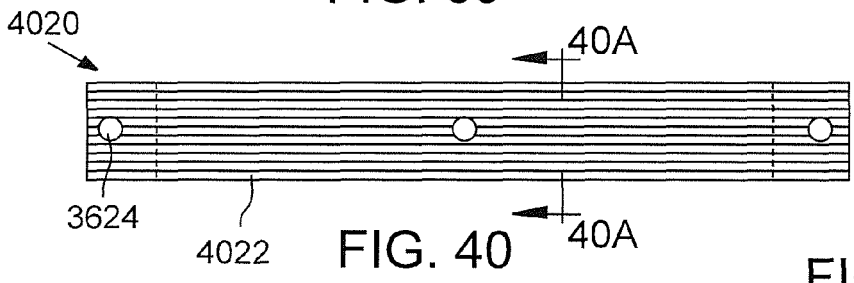 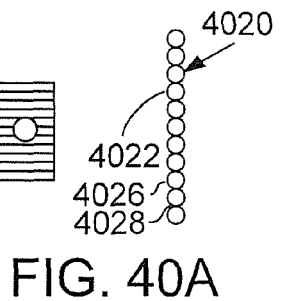
FIG. 40  FIG. 40A

LINEAR ROLLER BEARING ASSEMBLY AND SUB-ASSEMBLY AND RECIPROCATING MACHINERY INCORPORATING THE SAME

CROSS-REFERENCE TO RELATED PATENT APPLICATION

This application is a Continuation-In-Part of U.S. application Ser. No. 12/776,283, filed May 7, 2010, now U.S. Pat. No. 8,220,258, issued Jul. 17, 2012, which claims the benefit of U.S. Provisional App. No. 61/176,221, filed on May 7, 2009, the disclosure of which is incorporated herein by reference in its entirety.

BACKGROUND

1. Technical Field

This disclosure relates to linear roller bearing assemblies, roller-bearing sub-assemblies, and reciprocating machinery incorporating the same, more particularly in Stirling engines and cryocoolers.

2. Description of the Related Art

Free-piston Stirling engines and cryocoolers include linear bearings to guide and support components such as pistons which reciprocate within a pressurized gas environment. Differential gas pressures across the piston are sealed by a narrow, non-contact annular gap (clearance seal). It is desirable to maintain concentricity of this gap to maximize performance and efficiency by minimizing energy losses due to gas leakage through said gap. These bearings should prevent contact between the piston and cylinder as it reciprocates so as to avoid wear and energy loss. Rubbing of the piston would reduce the machine's life and performance due to wear, and contamination of both the working gas and the internal heat exchangers. The bearings must support the lateral and rotational loads. The bearings should not require lubrication that would contaminate the working gas and thus reduce performance and efficiency.

Flexural spiral springs and/or gas bearings are currently used to provide the long life linear bearings for these types of machines. Commonly used spiral flexure bearings (see e.g. FIG. 6 of U.S. Pat. No. 5,647,217) are limited in their stroke capability, frequency of operation, and radial load capacity. Gas bearings are also used in these types of machines. They can be expensive to manufacture, due to the extremely close dimensional tolerances required. Wear can occur during start-up and shut-down when contact is made between their mating surfaces. These bearings can lock up if a small foreign particle becomes lodged between these precision surfaces. Simple gas bearings do not provide rotational restraint that is usually required by linear alternators or motors.

Linear roller bearings have been used to guide linear movement of one surface relative to another. For example, U.S. Pat. No. 3,932,045 (the '045 patent) directed primarily to rolling contact joints useful as prosthetic joints, shows a linear bearing in FIGS. 14-16. The linear bearing includes two rollers and straps wrapped tightly around each roller. One problem with the linear bearing shown in FIGS. 14 and 15 of the '045 patent is that, over time, the straps can loosen around the rollers. The rollers can therefore slide laterally or slip rotationally within the straps to degrade the performance of the linear bearing. While the linear bearing shown in FIG. 16 of the '045 patent appears to include edge guides disposed on opposite ends of the rollers, the rollers can additionally rub against these guides if the straps loosen around the rollers. This rubbing can cause undesirable wear and friction. With the potential for undesirable loosening of the straps, lateral slide and rotational slip of the roller, and an undesirable amount of wear and friction during operation, the linear bearing of the '045 patent is not suitable for use in machinery such as Stirling engines and cryocoolers having components which reciprocate at high frequencies.

U.S. Pat. No. 7,240,580 (the '580 patent) is understood to disclose the use of linear bearings within a Z-axis positioner. Specifically, linear bearings guide movement of a stage along a single axis relative to a base. The straps in these linear bearings can be attached to a roller, or simply wrapped around the roller. However, the stage does not reciprocate at the frequencies encountered by components of machines such as Stirling engines and cryocoolers. Also, movement of the stage appears to be limited to approximately one quarter of the circumference of the roller due to the configuration of the Z-axis positioner. Such limited movement is not desirable within machines such as Stirling engines and cryocoolers where relatively long stroke length is desired to achieve power or work output.

Accordingly, a need remains for a better linear bearing suitable for Stirling engines, cryocoolers and like applications.

SUMMARY

According to some embodiments, a roller bearing sub-assembly is described as including first and second mounting portions spaced apart from each other, one or more rollers disposed between the first and second mounting portions and straps wrapped partially around different portions of one or more of the rollers. The mounting portions, one or more rollers and straps are configured to guide a linear movement of the first mounting portion relative to the second mounting portion along a selected direction for a distance that is approximately equal to a circumference of a roller in opposite directions from a mid-stroke position.

According to some embodiments, a linear roller bearing assembly is described as including a hub, a collar disposed around the hub and roller bearing sub-assemblies disposed in a radial pattern around the hub. The roller bearing sub-assemblies are configured to guide linear movement of the hub relative to the collar concentrically along a selected direction.

According to other embodiments, multi-cylinder Stirling engines having Stirling engine power modules connected together in series to form a closed loop are disclosed. These multi-cylinder Stirling engines can achieve high thermodynamic engine efficiency and power density.

According to other embodiments, a thermal energy recovery system is disclosed to increase the thermal efficiency of a Stirling engine power module.

BRIEF DESCRIPTION OF THE DRAWINGS

FIG. 2 is a perspective view of a roller bearing sub-assembly in a mid-stroke position, according to a second embodiment of the invention.

FIG. 3 is a perspective view of a roller bearing sub-assembly in a mid-stroke position, according to a third embodiment of the invention.

FIG. 9 is an end view of a linear roller bearing assembly according to a ninth embodiment of the invention.

FIG. 9A is a cross-sectional view of the linear roller bearing assembly shown in FIG. 9 in a mid-stroke position, taken along line 9A-9A of FIG. 9.

FIG. 10 is an end view of a linear roller bearing assembly according to a tenth embodiment of the invention.

FIG. 10A is a cross-sectional view of the linear roller bearing assembly shown in FIG. 10 in a mid-stroke position, taken along line 10A-10A of FIG. 10.

FIG. 13 is an end view illustrating the linear roller bearing assembly shown in FIG. 10 at an intermediate stage of fabrication.

FIG. 13A is a cross-sectional view of the linear roller bearing assembly shown in FIG. 10, taken along line 13A-13A of FIG. 13, at an intermediate stage of fabrication.

FIG. 14 is an end view of a linear roller bearing assembly according to a thirteenth embodiment of the invention.

FIG. 14A is a cross-sectional view of the linear roller bearing assembly shown in FIG. 14 in a mid-stroke position, taken along line 14A-14A of FIG. 14.

FIG. 15 is an end view of the linear roller bearing assembly shown in FIGS. 14 and 14A at an intermediate stage of fabrication.

FIG. 15A is a cross-sectional view of the linear roller bearing assembly shown in FIG. 14, taken along line 15A-15A of FIG. 15.

FIGS. 36-40 are top views of straps in roller bearing sub-assemblies according to some embodiments of the invention.

FIGS. 36A-40A are cross-sectional views of straps shown in FIGS. 36-40, respectively, according to some embodiments of the invention.

DETAILED DESCRIPTION OF THE ILLUSTRATED EMBODIMENTS

Exemplary embodiments of the present invention will now be described more fully hereinafter with reference to the accompanying drawings. These embodiments, however, may be modified in many different forms and should not be construed as limited to the description expressly set forth herein. Rather, these embodiments are provided so that this disclosure will be thorough and complete, and will fully convey the scope of the invention to those skilled in the art. It will be understood that when an element is referred to as being "connected to," "on," etc., another element, it can be directly connected to or directly on the other element, or intervening elements may also be present. In contrast, when an element is referred to as being "directly connected to," "directly on," etc., another element, there are no intervening elements present. Like reference numbers refer to like elements throughout.

Embodiments of the present invention address several problems and limitations of bearings currently used to guide and support the reciprocating components within high frequency machines such as long-life, maintenance-free, Stirling engines and cryocoolers. These machines require precise alignment of their internal reciprocating pistons and attached components. Linear bearings exemplarily described herein can increase the performance and efficiency of these machines by providing increased guidance precision, stroke length, and frequency of operation, load capability and operating life. These bearings can also be advantageously used in many other types of reciprocating machinery, as well as in any other type of machinery where precise movement along a single axis is desired.

Roller Bearing Sub-Assembly

Figure 1:
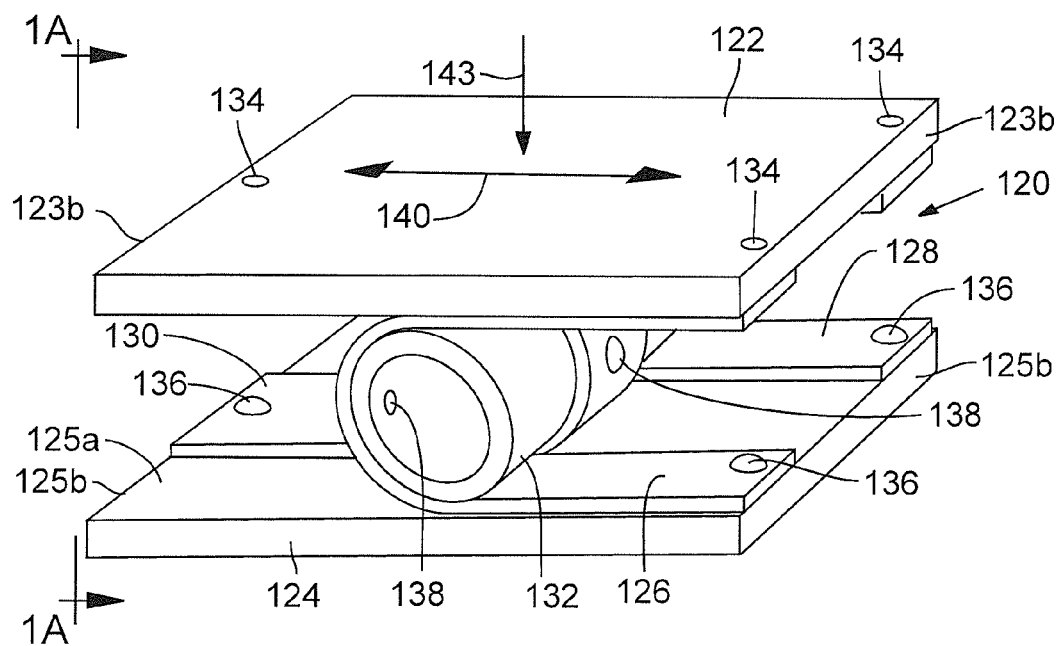
FIG. 1 is a perspective view of a roller bearing sub-assembly in a mid-stroke position, according to a first embodiment of the invention.
Figure 1A:
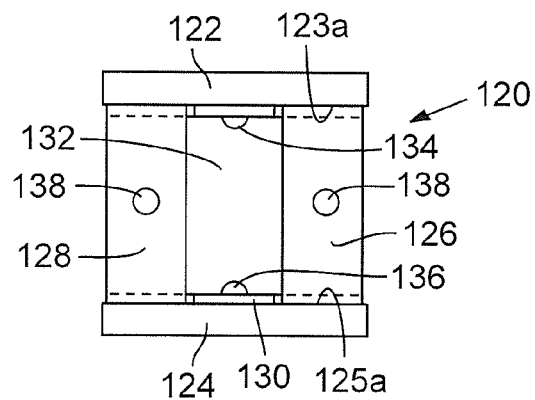
FIG. 1A is an end view of the roller bearing sub-assembly shown in FIG. 1, taken along line 1A-1A of FIG. 1.

FIG. 1 is a perspective view of a roller bearing sub-assembly in a mid-stroke position, according to a first embodiment of the invention. FIG. 1A is an end view of the roller bearing sub-assembly shown in FIG. 1, taken along line 1A-1A of FIG. 1.

Referring to FIGS. 1 and 1A, a roller bearing sub-assembly 120 includes mounting portions or rails (e.g., first mounting portion 122 and second mounting portion 124), straps (e.g., first peripheral strap 126, second peripheral strap 128 and central strap 130), a roller (e.g., roller 132), and attachments (e.g., first mounting portion attachments 134, second mounting portion attachments 136 and roller attachments 138).

The first mounting portion 122 includes a strap-supporting surface 123a and side surfaces 123b on opposite edges of the strap-supporting surface 123a. Likewise, the second mounting portion 124 includes a strap-supporting surface 125a and side surfaces 125b on opposite edges of the strap-supporting surface 125a. The strap-supporting surfaces 123a and 125a contact the straps 126, 128 and 130 as one or both of the mounting portions 122 and 124 move linearly along a selected direction (e.g., along direction indicated by arrow 140). The strap-supporting surfaces 123a and 125a are planar along the longitudinal direction of the straps (e.g., along the direction indicated by arrow 140), and are planar along a direction transverse to the longitudinal direction. The roller 132 is disposed between the strap-supporting surfaces 123a and 125a, and the straps 126, 128 and 130 are disposed between the roller 132 and the strap-supporting surfaces 123a and 125a.

A portion of the peripheral straps 126 and 128, and a portion of the central strap 130, (e.g., a first end thereof) are each secured to the first mounting portion 122 by a first mounting portion attachment 134. Likewise, another portion of the peripheral strap 126 and 128, and a portion of the central strap 130, (e.g., a second end thereof) are each secured to the second mounting portion 124 by a second mounting portion attachment 136.

In the illustrated embodiment, the first mounting portion attachments 134 and the second mounting attachments 136 secure the first and second ends of the peripheral straps 126 and 128 and the central strap 130 to the strap-supporting surface 123a of the first mounting portion 122 and to the strap-supporting surface 125a of the second mounting portion 124, respectively. It will be appreciated, however, that the first mounting portion attachments 134 can secure the first end of one or more of the straps 126, 128 and 130 to the side surfaces 123b of the first mounting portion 122. In such an embodiment, one or more of the peripheral straps 126 and 128 could extend onto at least a portion of one of the side surfaces 123b and the central strap 130 could extend onto at least a portion of the other of the side surfaces 123b. Likewise, the second mounting portion attachments 136 can secure one or more of the straps 126, 128 and 130 to the side surfaces 125b of the second mounting portion 124. In such an embodiment, one or more of the peripheral straps 126 and 128 could extend onto at least a portion of one of the side surfaces 125b and the central strap 130 could extend onto at least a portion of the other of the side surfaces 125b.

The straps 126, 128 and 130 are wrapped around different portions of the roller 132 to secure the roller 132 between the first mounting portion 122 and the second mounting portion 124. Ends of the first peripheral strap 126 extend away from the roller 132 in the same direction as ends of the second peripheral strap 128. Ends of the central strap 130 extend away from the roller 132 in the opposite direction as ends of the peripheral straps 126 and 128. The straps 126, 128 and 130 are spaced apart from each other along the axis of the roller 132 to reduce any contact wear between the straps experience during operation.

In the illustrated embodiment, a portion of each of the straps 126, 128 and 130 (e.g., a mid-point thereof) may be secured to the roller 132 by a roller attachment 138. It will be appreciated, however, that one or more of the straps 126, 128 and 130 may not be secured to the roller 132. For example, a portion of only the peripheral straps 126 and 128 may be secured to the roller 132 by a roller attachment 138, and the central strap 130 is not attached to the roller 132 by any roller attachment 138. In yet another embodiment, a portion of only the central strap 130 is secured to the roller 132 by a roller attachment 138, and the peripheral straps 126 and 128 are not attached to the roller 132 by any roller attachment 138.

In the illustrated embodiment, the roller 132 is cylindrical and roller attachments 138 are disposed at radially-opposite portions of the roller 138. As a result, each mounting portion 122 and 124 can move linearly along a selected direction (e.g., along direction indicated by arrow 140, which is perpendicular to the axis of the roller 132) for a distance equal to approximately half the circumference of the roller 132. To ensure that the maximum travel distance is attained, the length of the strap-supporting surfaces 123a and 125a (i.e., as measured in the longitudinal direction of the straps) should be at least half the circumference of the roller 132. In one embodiment, the length of the strap-supporting surfaces 123a and 125a can be greater than half the circumference of the roller 132 at least by an amount corresponding to the thickness of the straps 126, 128 and 130. Thus, the roller bearing sub-assembly 120 is configured such that the mounting portions 122 and 124 can move linearly along the selected direction 140 for a distance that is equal to approximately half the circumference of the roller 132.

The mounting portions are formed from a material that resists deformation (e.g., bending, compression, etc.) during operation of the roller bearing sub-assembly 120 when a load 143 is applied to the roller bearing sub-assembly 120. Exemplary materials for the mounting portions include carbon tool steels, stainless steels, beryllium copper, alumina, silicon nitride, glass, metal/ceramic composites and fiber reinforced plastics, or the like or a combination thereof. The first mounting portion 122 and the second mounting portion 124 can be formed from the same material or from different materials. The surfaces of one or more of the mounting portions may be treated to improve hardness, corrosion resistance, electrical and heat conductivity of the mounting portions. Such surface treatments may improve load capacity, bearing life, heat and/or electrical conductivity of the roller bearing sub-assembly 120. Exemplary surface treatments include heat treatments, chemical treatments, and physical coatings (e.g., chrome plating, titanium nitride, etc.). Surfaces of the first mounting portion 122 and the second mounting portion 124 can be treated with the same surface treatment or with different surface treatments.

The straps are formed of a suitably hard material that is also flexible during operation of the roller bearing sub-assembly 120. Exemplary materials for the straps include spring carbon steel, stainless steel, beryllium copper, titanium and longitudinally oriented ceramic fibers, optically transparent fibers (e.g., glass fibers) and composites of metal and/or longitudinally-oriented ceramic fibers, or the like or a combination thereof. The straps 126, 128 and 130 can be formed from the same material or from different materials. Similar to the mounting portions, the surfaces of one or more of the straps may be treated to improve hardness, corrosion resistance, electrical and heat conductivity of the straps. Surfaces of the straps 126, 128 and 130 can be treated with the same surface treatment or with different surface treatments.

The thickness and width of the straps 126, 128 and 130 is dependent upon numerous design factors including: physical and material properties (e.g., bending fatigue strength, compressive bearing strength, elastic modulus, hardness, conductivity, etc.) of the material from which the straps are formed, roller diameter and the resulting bending stress, frequency, travel velocity, and travel distance resulting in tensile stresses due to the roller's inertia, type and properties of the attachments used, and contact bearing stress due to load 143 acting between the roller 132 and straps 126, 128 and 130. When the roller 132 has a diameter in a range of about 25 mm to about 50 mm, each of the straps 126, 128 and 130 may have a thickness in a range of about 0.1 mm to about 0.5 mm. In one embodiment, when the roller 132 has a diameter of about 25 mm, each of the straps 126, 128 and 130 may have a thickness in a range of about 0.1 mm to about 0.2 mm when, for example, the load 143 is 40 kg. Each of the straps 126, 128 and 130 may have a width in a range of about 5 mm to about 20 mm. In one embodiment, the width of the central strap 130 is about twice the width of the peripheral straps 126, 128 so as to equalize longitudinal tensile stresses in each strap 126, 128 and 130.

The roller 132 is formed from a material that resists deformation (e.g., bending, compression, etc.) during operation of the roller bearing sub-assembly 120 when a load 143 is applied to the roller bearing sub-assembly 120. The roller 132 and any of the mounting portions can be formed from the same material or from different materials. Exemplary materials for the roller 132 include carbon tool steels, stainless steels, beryllium copper, alumina, silicon nitride, glass, and composites of metal, ceramic and/or epoxy, or the like or a combination thereof. The roller 132 can be configured as a hollow, essentially cylindrical roller. The roller material and the dimensions of the hollow roller 132 can be adjusted to provide a radial spring preload force that exceeds the radial load and thereby maintains contact between the mounting portions, straps, and roller 132 during operation of the roller bearing sub-assembly 120 for maximum bearing life and precision. As will be discussed in greater detail below, radial preloading of various components within a roller bearing sub-assembly may also be provided by adjustable mounting devices or interference fits with mating parts.

The diameter and length of the roller 132 is dependent upon the contact stress resulting from load 143 applied between the mounting portions 122 and 124, the strap 126, 128 and 130 and the roller 132. In one embodiment, the roller 132 can have a diameter in a range of about 25 mm to about 50 mm. In one embodiment, the length of the roller 132 is at least about 20 mm. In another embodiment, the length of the roller 132 is at least about 30 mm.

In one embodiment, the straps are formed of a metal material while the mounting portions and roller are formed of a ceramic material to prevent fretting corrosion between these components. In other embodiments, surface regions of the mounting portions, straps and roller that contact one another may be provided with surface coatings that can extend life by preventing the fretting corrosion or other types of physical degradation. Exemplary surface coatings include chrome plating, hard anodizing, heat treatments such as nitriding and flame hardening, ceramic coating, vapor depositions, diffusion treatments, and the like. When the roller bearing sub-assembly 120 is disposed within an inert operating environment or in a vacuum, surfaces of the mounting portions, straps, and roller may be coated with a dry lubricant such as molybdenum disulfide, graphite, or with a ceramic, an oxide, or any suitable plastic known in the art.

In the illustrated embodiment, the attachments 134, 136 and 138 are provided as pin, or the like, to permanently attach the various straps 126, 128 and 130 to various ones of the mounting portions 122 and 124 and the roller 132. However, any of the attachments 134, 136 and 138 may provide for permanent or temporary attachment of any of the straps 126, 128 and 138 to any of the mounting portions 122 and 124 and the roller 132. For example, any of the attachments may be provided as a fastener such as a rivet, screw, pin, or the like or a combination thereof. These fasteners can be retained semi-permanently using lock washers, adhesives, or the like or a combination thereof. In other embodiments, any of the attachments may be provided as adhesive material, solder material, brazing material, or the like or a combination thereof, which is located between any of the straps and the roller or between the any of the straps and any mounting portion. In another embodiment an attachment may be provided as a weld where any of the straps is welded to the roller or any of the mounting portions.

Constructed as described above, the roller bearing sub-assembly 120 permits linear motion of the first mounting portion 122 relative to the second mounting portion 124 only along the selected direction 140 while preventing the roller 132 from moving (e.g., via linear or rotational sliding) relative to the straps 126, 128 and 130. Thus, engagement of the roller 132 with the straps 126, 128 and 130 is constrained to rolling contact. As a result, insignificant wear or friction can result during operation of this bearing if the mounting portions 122 and 124, the straps 126, 128 and 130 and the roller 132 are fabricated from sufficiently hard materials. It will be appreciated that significantly improved bearing life can be achieved when the operating stress levels in one or more of the mounting portions, straps and roller are maintained below their respective fatigue/endurance limits. Further, precision dimensional manufacture of the rails, straps and roller, and accurate assembly of the roller bearing sub-assembly 120 can enhance the performance of the roller bearing sub-assembly 120.

FIG. 2 is a perspective view of a roller bearing sub-assembly in a mid-stroke position, according to a second embodiment of the invention.

Referring to FIG. 2, a roller bearing sub-assembly 220 according to a second embodiment includes mounting portions or rails (e.g., first mounting portion 222 and second mounting portion 224), straps (e.g., first peripheral straps 126*a* and 126*b*, second peripheral straps 128*a* and 128*b* and central straps 130a and 130b), rollers (e.g., rollers 132a and 132b), and attachments (e.g., first mounting portion attachments 134a and 134b, second mounting portion attachments 136a and 136b and roller attachments 138a and 138b).

The mounting portions, straps, and attachments may all be provided as exemplarily described with respect to the roller bearing sub-assembly 120. However, in the roller bearing sub-assembly 220, each of the first peripheral straps 126a and 126b, second peripheral straps 128a and 128b and central straps 130a and 130b, are secured to the same first mounting portion 222 by a first mounting portion attachment 134a or 134b. Likewise, each of the first peripheral straps 126a and 126b, second peripheral straps 128a and 128b and central straps 130a and 130b, are secured to the same second mounting portion 224 by a second mounting portion attachment 136a or 136b.

In the illustrated embodiment, the roller bearing sub-assembly 220 is configured such that ends of the first peripheral straps 126a and 126b (as well as ends of the second peripheral straps 128a and 128b) are distant from each other and extend in opposite directions while ends of the central straps 130a and 130b are proximate to each other and extend in opposite directions. As a result, the ends of the peripheral straps 126a and 128a extend in the same direction as the end of the central strap 130b. Likewise, the ends of the peripheral straps 126b and 128b extend in the same direction as the end of the central strap 130a. In the illustrated embodiment, the central straps 130a and 130b are separate straps, but they may alternatively be provided as a single continuous loop strap. In such an embodiment, the single continuous loop strap may be secured to the first mounting portion 222 by one or two first mounting portion attachments. Likewise, the single continuous loop strap may be secured to the second mounting portion 224 by one or two second mounting portion attachments.

It will be appreciated, however, that the roller bearing sub-assembly 220 may be configured in other ways. For example, the roller bearing sub-assembly 220 can be configured such that ends of the first peripheral straps 126a and 126b (as well as ends of the second peripheral straps 128a and 128b) are proximate to each other and extend in opposite directions while ends of the central straps 130a and 130b are distant from each other and extend in opposite directions. In such an example, the first peripheral straps 126a and 126b (as well as the second peripheral straps 128a and 128b) may be separate straps as shown, or they may be provided as a single continuous loop strap. In another example, the roller bearing sub-assembly 220 can be configured such that the ends of the peripheral straps 126a and 128a extend in the same direction as the ends of the peripheral straps 126b and 128b, and such that the end of the central strap 130a extends in the same direction as the end of the central strap 130b.

Constructed as described above, the roller bearing sub-assembly 220 provides a stable structure for supporting normally-directed loads such as a load indicated by arrow 143. In addition, the rollers 132a and 132b may help to maintain the first mounting portion 222 and the second mounting portion 224 in a substantially parallel relationship as the mounting portions 222 and 224 move linearly relative to each other along the selected direction 140.

FIG. 3 is a perspective view of a roller bearing sub-assembly in a mid-stroke position, according to a third embodiment of the invention.

Referring to FIG. 3, a roller bearing sub-assembly 320 according to a third embodiment includes mounting portions or rails (e.g., first mounting portions 122a and 122b and second mounting portions 124a and 124b), straps (e.g., first peripheral straps 126a and 126b, second peripheral straps 128a and 128b and central straps 130a and 130b), rollers (e.g., rollers 132a and 132b), attachments (e.g., first mounting portion attachments 134a and 134b, second mounting portion attachments 136a and 136b, roller attachments 138a and 138b, first spacer attachments 330a and 330b and second spacer attachments 328a and 328b) and mounting portion spacers or rail spacers (e.g., first mounting portion spacer 322 and second mounting portion spacer 324). The first spacer attachments 330a and 330b and second spacer attachments 328a and 328b may be provided as attachments such as those exemplarily described above with respect to the roller bearing sub-assemblies 120 or 220 of the first or second embodiments.

The mounting portions, straps, and attachments may all be provided as exemplarily described with respect to the roller bearing sub-assemblies 120 or 220. However, in the roller bearing sub-assembly 320, the first mounting portion spacer 322 is secured between first mounting portions 122a and 122b and the second mounting portion spacer 324 is secured between second mounting portions 124a and 124b. The first spacer attachments 330a and 330b secure the first mounting portion spacer 322 to the first mounting portions 122a and 122b, respectively. Likewise, the second spacer attachments 328a and 328b secure the second mounting portion spacer 324 to the second mounting portions 124a and 124b, respectively.

In one embodiment, one or more of the mounting portion attachments 134a, 134b, 136a and 136b may optionally secure one or more of the mounting portions 122a, 122b, 124a and 124b to a mounting portion spacer or rail spacer. Accordingly, one or more of the mounting portion attachments 134a and 134b in the illustrated embodiment may not only secure a central strap 130a or 130b to a corresponding first mounting portion 122a or 122b, but may also secure a first mounting portion 122a or 122b to the first mounting portion spacer 322. Likewise, one or more of the mounting portion attachments 136a and 136b in the illustrated embodiment may not only secure a central strap 130a or 130b to a corresponding second mounting portion 124a or 124b, but may also secure a second mounting portion 124a or 124b to the second mounting portion spacer 324. It will be appreciated that the roller bearing sub-assembly 320 may be configured such that one or more (or all) mounting portion attachments secures a peripheral strap to a mounting portion may also secure a mounting portion to a mounting portion spacer.

Constructed as described above, the roller bearing sub-assembly 320 provides a stable structure for supporting normally-directed loads such as a load indicated by arrow 143. In addition, the rollers 132a and 132b may help to maintain the first mounting portions 122a and 122b and the second mounting portions 124a and 124b in a substantially parallel relationship as they move linearly relative to each other along the selected direction 140. Lastly, the width of the mounting portion spacers 322 and 324 can be selected to create a space within the roller bearing sub-assembly 320 (e.g., between the first mounting portions and the second mounting portions sized sufficiently to receive a device.

Figure 4:
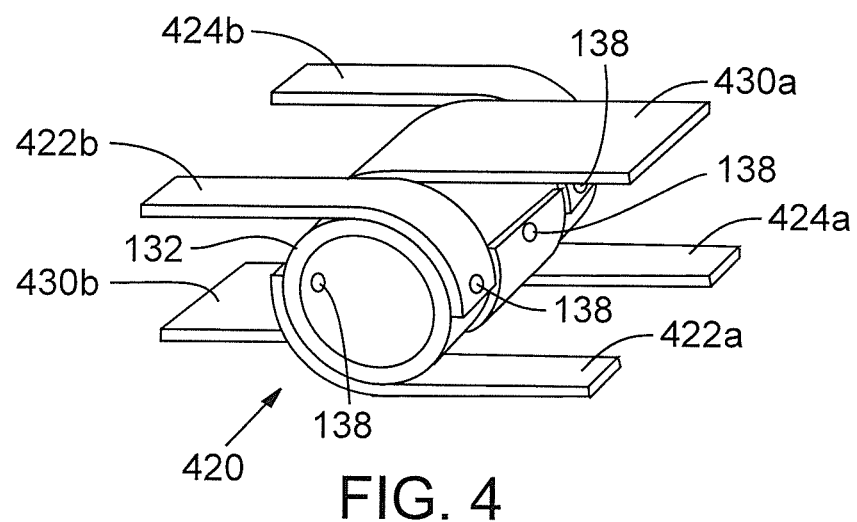
FIG. 4 is a perspective view of a partially-constructed roller bearing sub-assembly in a mid-stroke position, according to a fourth embodiment of the invention.

FIG. 4 is a perspective view of a partially-constructed roller in a mid-stroke position, bearing sub-assembly according to a fourth embodiment of the invention.

Referring to FIG. 4, roller bearing sub-assembly 420 includes straps (e.g., a first pair of complementary peripheral straps 422a and 422b, a second pair of complementary peripheral straps 424a and 424b and a pair of complementary central straps 130a and 130b), a roller (e.g., roller 132), and attachments (e.g., roller attachments 138).

The straps, roller and attachments may all be provided as exemplarily described with respect to the roller bearing sub-assemblies 120, 220 or 320. However, the straps in the roller bearing sub-assembly 420 are provided such that each pair of complementary straps is partially wrapped around radially-opposite portions of the roller 132. Further, the straps are provided such that ends of straps within each pair of complementary straps are disposed at opposite sides of the roller 132 along a longitudinal axis of the roller 132. In the roller bearing sub-assembly 420, each of the straps should be secured to the roller 132 (e.g., by roller attachments 138).

Although not shown, the roller bearing sub-assembly 420 may further include mounting portions and other attachments such as first mounting portion attachments 134, second mounting portion attachments 136, all of which may be provided as exemplarily described above with respect to the roller bearing sub-assemblies 120, 220 or 320 of the first, second, or third embodiments.

In the exemplarily illustrated embodiment, each strap is partially wrapped around the roller 132 such that, in the mid-stroke position, each strap is wrapped around one-quarter of the circumference of the roller 132. In another embodiment, however, one or more straps can be partially wrapped around the roller 132 such that, in the mid-stroke position as exemplarily illustrated, the one or more straps are wrapped around less than or more than one-quarter of the circumference of the roller 132.

Figure 5:
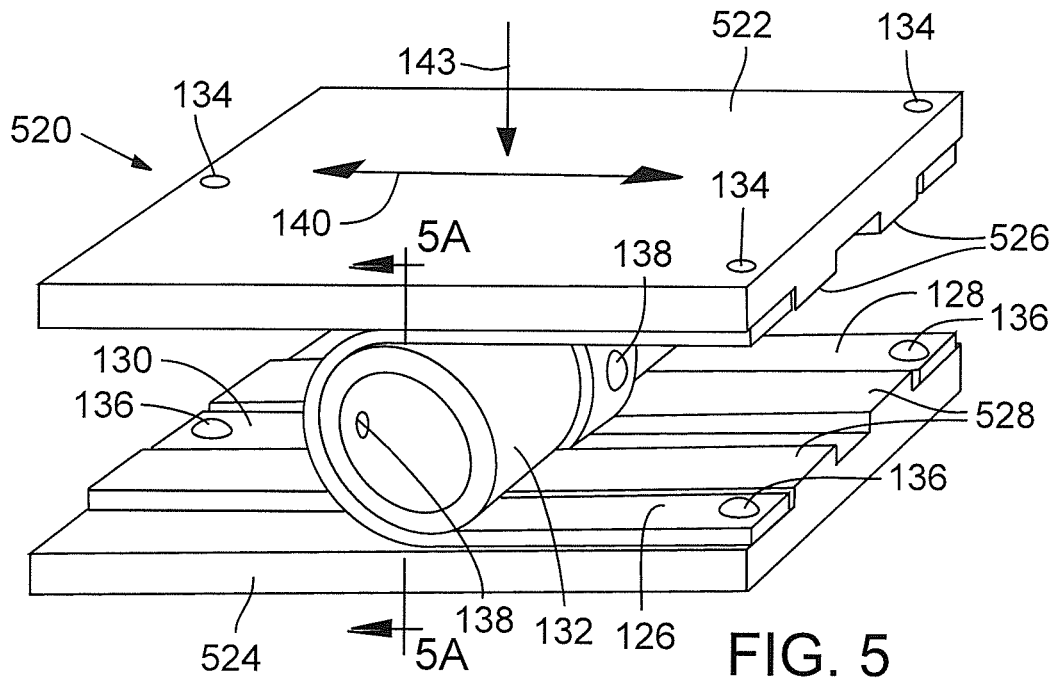
FIG. 5 is a perspective view of a roller bearing sub-assembly in a mid-stroke position, according to a fifth embodiment of the invention.
Figure 5A:
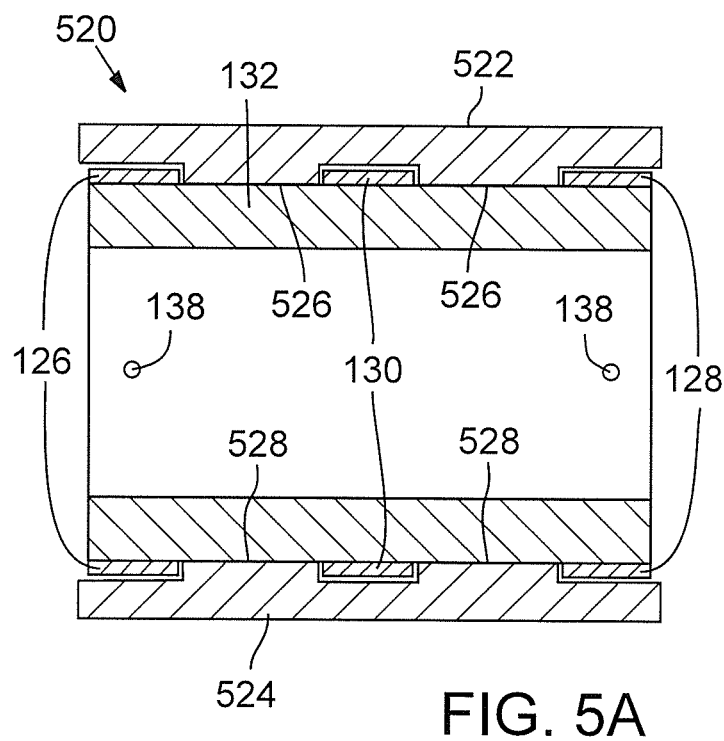
FIG. 5A is a cross-sectional view of the roller bearing sub-assembly shown in FIG. 5, taken along line 5A-5A of FIG. 5.

FIG. 5 is a perspective view of a roller bearing sub-assembly in a mid-stroke position, according to a fifth embodiment of the invention. FIG. 5A is a cross-sectional view of the roller bearing sub-assembly shown in FIG. 5, taken along line 5A-5A of FIG. 5.

Referring to FIGS. 5 and 5A, a roller bearing sub-assembly 520 according to a fifth embodiment includes mounting portions or rails (e.g., first mounting portion 522 and second mounting portion 524), straps (e.g., first peripheral strap 126, second peripheral strap 128 and central strap 130), a roller (e.g., roller 132), and attachments (e.g., first mounting portion attachments 134, second mounting portion attachments 136 and roller attachments 138).

The first mounting portion 522 is similar to the first mounting portion 122, but includes first support ribs 526 extending between the straps 126, 128 and 130 to contact the roller 132. Likewise, the second mounting portion 524 is similar to the second mounting portion 124, but includes second support ribs 528 extending between the straps 126, 128 and 130 to contact the roller 132. The support ribs 526 and 528 extend along the selected direction 140. In one embodiment, the height of the support ribs 526 and 528 is greater than the thickness of the straps 126, 128 and 130.

In one embodiment, the height of the support ribs 526 and 528 is in a range of about 0 mm to about 0.2 mm greater than the maximum thickness tolerance of the straps 126, 128 and 130. The width of the support ribs 526 and 528 is dependent upon the contact stress induced by load 143. In one embodiment, the width of the support ribs 526 and 528 is at least about 25 mm. In another embodiment, the width of the support ribs 526 and 528 is at least about 50 mm.

In the illustrated embodiment, each of the support ribs 526 and 528 and respective ones of the mounting portions 522 and 524 constitute a single, monolithic piece. In other embodiments, however, one or both of the support ribs 526 and 528 may be provided as a separate piece or layer that is attached to or deposited on a corresponding one of the mounting portions 522 and 524.

In the illustrated embodiment, each of the support ribs 526 and 528 extend from respective ones of the mounting portions 522 and 524. In another embodiment, however, the support ribs 526 and 528 may be replaced with a corresponding number of ribs extending circumferentially around the roller 132 and located between the portions of the straps 126, 128 and 130 that are wrapped around the roller 132. In yet another embodiment, the roller bearing sub-assembly 520 may include one or both of the support ribs 526 and 528 in addition to one or more ribs extending circumferentially around the roller 132.

In the illustrated embodiment, the straps 126, 128 and 130 of the roller bearing sub-assembly 520 are configured as exemplarily described with respect to the straps 126, 128 and 130 of the roller bearing sub-assemblies 120, 220 and 320. In other embodiments, however, the straps 126, 128 and 130 of the roller bearing sub-assembly 520 may be configured as exemplarily described with respect to straps 422*a*, 422*b*, 424*a*, 424*b*, 430*a* and 430*b* of the roller bearing sub-assembly 420.

Constructed as described above, the roller bearing sub-assembly 520 can provide for increased lateral precision since variations in the thickness of the straps 126, 128 and 130 will not affect the rolling motion of the roller 132. Reduced load capacity may result from the reduced roller bearing area. However, by ensuring that one or more of the straps 126, 128 and 130 is sufficiently narrow, adequate contact area between the roller 132 and the support ribs 526 and 528 can be provided to maintain adequate load capacity.

Figure 6:
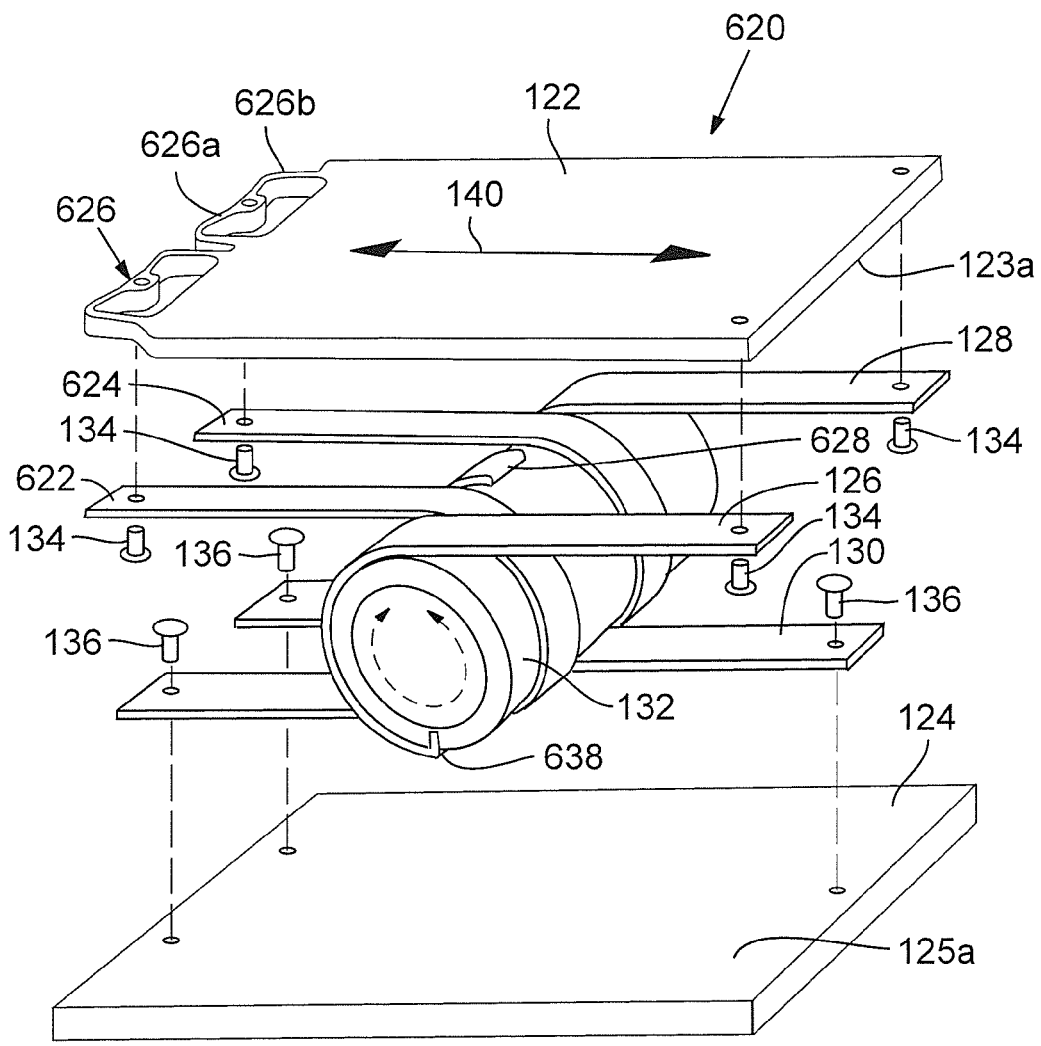
FIG. 6 is a partially exploded, perspective view of a roller bearing sub-assembly in a mid-stroke position, according to a sixth embodiment of the invention.

FIG. 6 is a partially exploded, perspective view of a roller bearing sub-assembly in a mid-stroke position, according to a sixth embodiment of the invention.

Referring to FIG. 6, a roller bearing sub-assembly 620 according to a sixth embodiment includes mounting portions or rails (e.g., first mounting portion 122 and second mounting portion 124), straps (e.g., first peripheral strap 126, second peripheral strap 128, central strap 130, first intermediate strap 622 and second intermediate strap 624), a roller (e.g., roller 132), and attachments (e.g., first mounting portion attachments 134, second mounting portion attachments 136 and roller attachments 638).

According to the sixth embodiment, tensioning devices 626 may be coupled to the first mounting portion 122. As exemplarily illustrated, each tensioning device 626 includes a resilient beam 626*a* set apart from the bulk of the first mounting portion 122 by resilient support arms 626*b*. Each beam 626*a* is configured to be at least partially resiliently deformable along the longitudinal direction of the straps. Each beam 626*b* is configured to be at least partially and equally deformable along the lateral direction of the straps. The tensioning devices 626 can load the intermediate straps 622 and 624 under tension. When the intermediate straps 622 and 624 are under a sufficient amount of tension and because they are not attached to the roller 132, the straps 126, 128, 130, 622 and 624 are tensioned and can be prevented from undesirably loosening during rotation of the roller 132 throughout the full stroke of the roller bearing sub-assembly 620. In one embodiment, the tensioning devices 626 and the first mounting portion 122 can be integrally formed together into a single, monolithic piece or part. In another embodiment, the tensioning devices 626 and the first mounting portion 122 are separately formed pieces, which can be subsequently coupled together (e.g., by welding, adhesive, clamping, screws, contact, etc.). In another embodiment, the tensioning devices 626 may be coupled to the second mounting portion 124 instead of the first mounting portion 122. In yet another embodiment, the tensioning devices 626 may be omitted.

Generally, the straps 126, 128 and 130 are provided as exemplarily described above with respect to the roller bearing sub-assembly 120, 220, 320 or 520. In the sixth embodiment, however, the second end of each of the first and second peripheral straps 126 and 128 is not secured to the second mounting portion 124. Likewise, the first end of the central strap 130 is not secured to the first mounting portion 122. Rather, the second ends of the peripheral straps 126 and 128, and the first end of the central strap 130, are secured to the roller 132. In this embodiment, roller attachments are used to secure the various ends of the straps 126, 128 and 130 to the roller 132. Generally, each roller attachment can include adhesive material (e.g., epoxy glue, etc.), solder material, brazing material, a weld, or the like or a combination thereof. In the illustrated embodiment, however, each roller attachment for a strap is provided as a roller attachment 638, which includes a tip of the strap that is inserted into a slot 628 formed in the roller 132. Each tip can be retained within a slot 628 by an interference fit, adhesive material (e.g., epoxy glue, etc.), solder material, brazing material, a weld, or the like or a combination thereof.

In the exemplarily illustrated embodiment, each strap 126, 128 and 130 is partially wrapped around the roller 132 such that, in the mid-stroke position, each strap 126, 128 and 130 is wrapped around one-half of the circumference of the roller 132. Also, the straps 126, 128 and 130 are provided such that the second ends of straps 126 and 128 are disposed at a radially-opposite side of the roller 132 from the first end of the central strap 130. In addition, the second ends of the straps 126 and 128 extend away from the roller 132 in the same direction as the first end of the central strap 130.

The first intermediate strap 622 and the second intermediate strap 624 are configured as generally described with respect to the straps 126, 128 and 130 of the roller bearing sub-assemblies 120, 220 and 320. In the sixth embodiment, however, the first end of each of the intermediate straps 622 and 624 may be secured to a tensioning device 626 by a first mounting portion attachment 134 and the second end of each of the intermediate straps 622 and 624 may be secured to the second mounting portion 124 by a second mounting portion attachment 136. Moreover, one or both of the first and second intermediate straps 622 and 624 are not secured to the roller 132 by any roller attachment 638. In addition, the first and second ends of the intermediate straps 622 and 624 extend away from the roller in the opposite direction as the first ends of the peripheral straps 126 and 128, and in the opposite direction as the second end of the central strap 130. Each of the intermediate straps 622 and 624 may have a width in a range of about 5 mm to about 20 mm. In one embodiment, the width of the central strap 130 is greater than the width of the intermediate straps 622 and 624.

Constructed as exemplarily described above, the straps 126, 128, 130, 622 and 624 are disposed between the roller 132 and the strap-supporting surfaces 123a and 125a. Moreover, the straps 126, 128, 130, 622 and 624 can be configured such that all straps 126, 128, 130, 622 and 624 contact the strap-supporting surfaces 123a and 125a when the roller bearing sub-assembly 620 is in, for example, the illustrated mid-stroke position. It will also be appreciated that the intermediate straps 622 and 624 will contact the strap-supporting surfaces 123a and 125a throughout the full stroke of the roller bearing sub-assembly 620. However, the peripheral straps 126 and 128 will contact the strap-supporting surfaces 123a and 125a for a first half of the stroke and contact only the strap-supporting surface 123a for a second half of the stroke. Likewise, the central strap 130 will contact the strap-supporting surfaces 123a and 125a for the second half of the stroke and contact only the strap-supporting surface 125a for the first half of the stroke. Thus, depending on the stroke position of the roller bearing sub-assembly 620, the roller 132 may be supported between the first and second mounting portions 122 and 124 by three, four or five straps.

Constructed as exemplarily described above, each mounting portion 122 and 124 can move linearly along a selected direction (e.g., along direction indicated by arrow 140, which is perpendicular to the axis of the roller 132) for a distance approximately equal to the circumference of the roller 132. To ensure that the maximum travel distance is attained, the length of the strap-supporting surfaces 123a and 125a (i.e., as measured in the longitudinal direction of the straps) should be at least equal to the circumference of the roller 132. In one embodiment, the length of the strap-supporting surfaces 123a and 125a can be greater than the circumference of the roller 132 at least by an amount corresponding to the thickness of the straps 126, 128, 130, 622 and 624. Thus, the roller bearing sub-assembly 620 can be configured such that the mounting portions 122 and 124 can move relative to each other along the selected direction 140 for a distance that is approximately equal to the circumference of the roller 132 in opposite directions from the mid-stroke position shown in FIG. 6.

Figure 7:
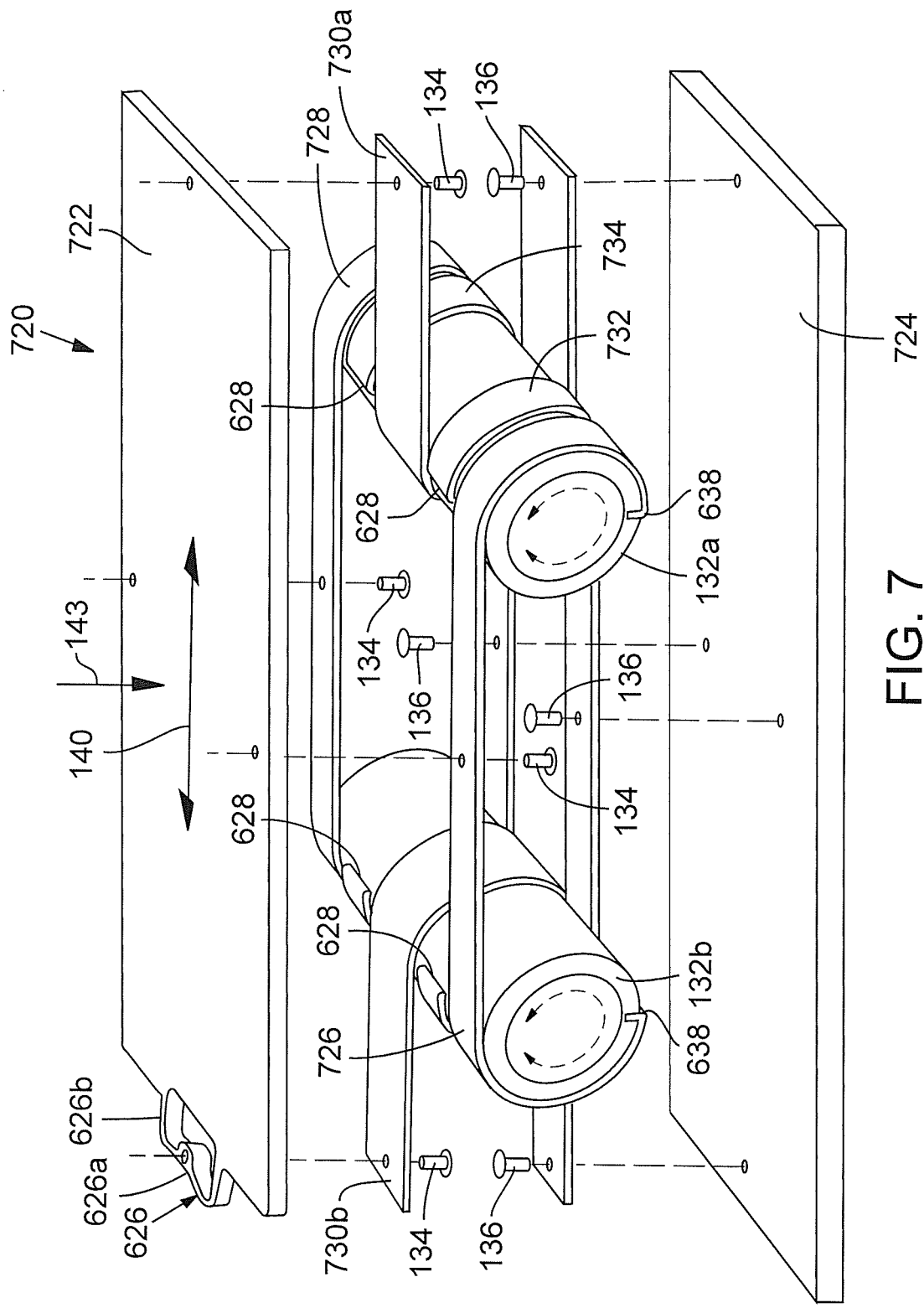
FIG. 7 is a partially exploded, perspective view of a roller bearing sub-assembly in a mid-stroke position, according to a seventh embodiment of the invention.

FIG. 7 is a partially exploded, perspective view of a roller bearing sub-assembly in a mid-stroke position, according to a seventh embodiment of the invention.

Referring to FIG. 7, a roller bearing sub-assembly 720 according to a seventh embodiment includes mounting portions or rails (e.g., first mounting portion 722 and second mounting portion 724), straps (e.g., first peripheral strap 726, second peripheral strap 728, first central strap 730a, second central strap 730b, first intermediate strap 732 and second intermediate strap 734), rollers (e.g., rollers 132a and 132b), attachments (e.g., first mounting portion attachments 134, second mounting portion attachments 136 and roller attachments 638). The mounting portions, straps, and attachments may all be provided as exemplarily described with respect to the roller bearing sub-assembly 620. The roller bearing sub-assembly 720 may optionally include a tensioning device 626 as exemplarily described above with respect to the roller bearing sub-assembly 620.

In the roller bearing sub-assembly 720, the first end of each of the peripheral straps 726 and 728, and the first end of each of the intermediate straps 732 and 734, is secured to the first roller 132a by a roller attachment 638 as discussed above with respect to the roller bearing sub-assembly 620. Likewise, the second end of each of the peripheral straps 726 and 728, and the first end of each of the intermediate straps 732 and 734, is secured to the second roller 132b by a roller attachment 638 as discussed above with respect to the roller bearing sub-assembly 620.

A portion of each of the peripheral straps 726 and 728 (e.g., a mid-point thereof) is secured to the first mounting portion 722 by a first mounting portion attachment 134. Likewise, a portion of each of the intermediate straps 732 and 734 (e.g., a mid-point thereof) is secured to the second mounting portion 724 by a second mounting portion attachment 136. The first and second ends of the first central strap 730a are secured to the first and second mounting portions 722 and 724, respectively, by first and second mounting portion attachments 134 and 136, respectively. The first and second ends of the second central strap 730b are secured to the tensioning device 626 and the second mounting portion 724, respectively, by first and second mounting portion attachments 134 and 136, respectively. Moreover, while the first central strap 730a is partially wrapped around the first roller 132a, the first central strap 730a is not secured to the first roller 132a by any roller attachment. Because the second central strap 730b is secured to the tensioning device but not to the second roller 132b, the tensioning device 626 can tension all straps within the roller bearing sub-assembly. The second central strap 730b is partially wrapped around the second roller 132b, but is not secured to the second roller 132b by any roller attachment.

Constructed as described above, the roller bearing sub-assembly 720 provides a stable structure for supporting normally-directed loads such as a load indicated by arrow 143. In addition, the rollers 132a and 132b may help to maintain the first mounting portion 722 and the second mounting portion 724 in a substantially parallel relationship as the mounting portions 722 and 724 move linearly relative to each other along the selected direction 140.

Linear Roller-Bearing Assembly

Figure 8:
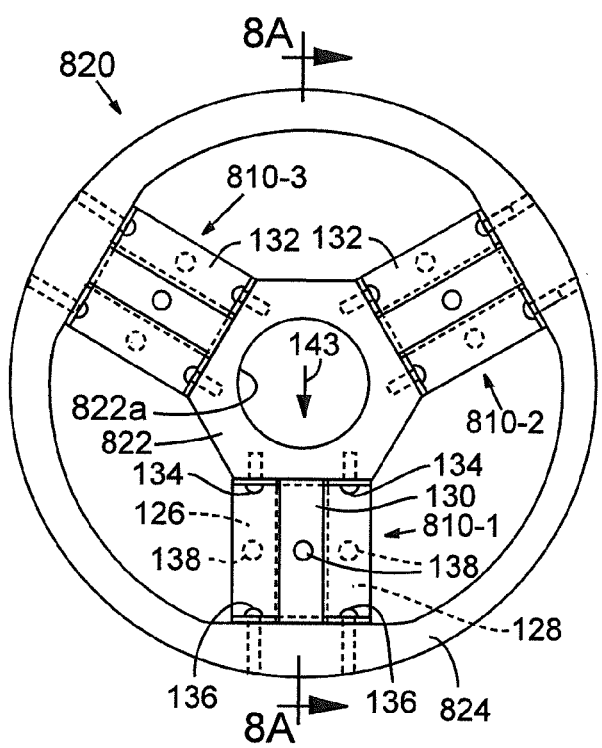
FIG. 8 is an end view of a linear roller bearing assembly according to an eighth embodiment of the invention.
Figure 8A:
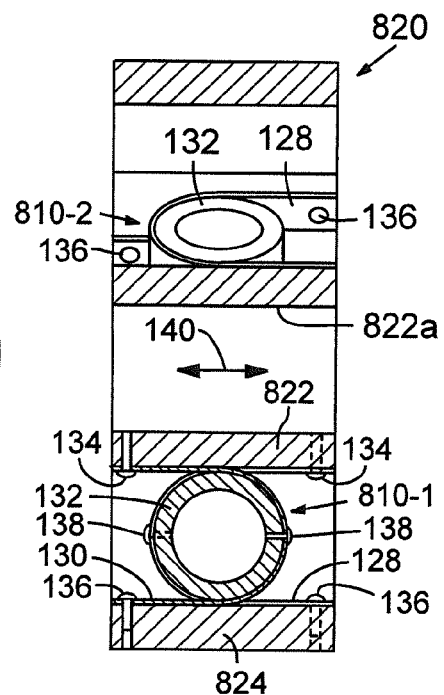
FIG. 8A is a cross-sectional view of the linear roller bearing assembly shown in FIG. 8 in a mid-stroke position, taken along line 8A-8A of FIG. 8.

FIG. 8 is an end view of a linear roller bearing assembly according to an eighth embodiment of the invention. FIG. 8A is a cross-sectional view of the linear roller bearing assembly shown in FIG. 8 in a mid-stroke position, taken along line 8A-8A of FIG. 8.

Referring to FIGS. 8 and 8A, a linear roller bearing assembly 820 according to an eighth embodiment includes roller bearing sub-assemblies (e.g., first roller bearing sub-assembly 810-1, second roller bearing sub-assembly 810-2, and third roller bearing sub-assembly 810-3, each generically referred to herein as a "roller bearing sub-assembly 810"), a hub (e.g., hub 822) and a collar (e.g., collar 824).

The roller bearing sub-assemblies 810 are spaced apart from each other at a regular interval around the hub 822. Each of the roller bearing sub-assemblies 810 is provided as exemplarily described with respect to FIG. 1. For example, each of the roller bearing sub-assemblies 810 may include peripheral straps 126 and 128, a central strap 130, a roller 132 secured to the straps 126, 128 and 130 by roller attachments 138. Within each of the roller bearing sub-assemblies 810, first ends of the straps 126, 128 and 130 are secured to a portion of the hub 822 (i.e., a "mounting portion of the hub 822") by first mounting portion attachments 134 and second ends of the straps 126, 128 and 130 are each secured to a portion of the collar (i.e., a "mounting portion of the collar 824"). Thus, the mounting portion of the hub 822 can correspond to the first mounting portion 122 described above with respect to the first embodiment, and form a part of a roller bearing sub-assembly 810. Likewise, the mounting portion of the collar 824 can correspond to the second mounting portion 124 described above with respect to the first embodiment, and form a part of a roller bearing sub-assembly 810. As exemplarily illustrated, the mounting portions of the hub 822 and collar 824 define surfaces that are substantially planar. Accordingly, surfaces defined by the mounting portions of the hub 822 and collar 824 correspond to the strap-supporting surfaces 123a and 125a described above with respect to the first embodiment.

Although the roller bearing sub-assemblies 810 are described above as being provided as described with respect to FIG. 1, it will be appreciated that each of the roller bearing sub-assemblies 810 can be provided as any type of roller bearing sub-assembly described herein.

In the illustrated embodiment, the thickness of each of the straps 126, 128 and 130 within the same roller bearing sub-assembly 810 is the same. Moreover, the thickness of each of the straps 126, 128 and 130 of different roller-bearing sub-assemblies 810 is the same. When each of the straps 126, 128 and 130 of different roller-bearing sub-assemblies 810 is the same, the axis of the hub 822 is aligned with the axis of the collar 824. Because the hub 822 and collar 824 are moveably coupled to each other via the roller-bearing sub-assemblies 810, an axis of the hub 822 can be radially positioned with respect to an axis of the collar 824 by ensuring that the thickness of the straps 126, 128 and 130 in each of the roller-bearing sub-assemblies 810 is different from the thickness of the straps 126, 128 and 130 in every other roller bearing sub-assembly 810. In another embodiment, the width of the straps 126, 128 and 130 in one of the roller-bearing sub-assemblies 810 can be made different from the width of the straps 126, 128 and 130 in at least one other roller bearing sub-assembly 810 to compensate, for example, for differences in loads experienced between the various roller-bearing sub-assemblies 810, for a particular orientation of the linear roller bearing assembly relative to a gravitational, electrical or magnetic field, or the like or a combination thereof.

Although the linear roller bearing assembly 820 has been described above as including only three roller bearing sub-assemblies 810 disposed in a radial pattern around the hub 822, it will be appreciated that the linear roller bearing assembly 820 can include more than three roller bearing sub-assemblies disposed in a radial pattern around the hub 822. Further, increasing the number of roller bearing sub-assemblies may increase the load capacity under which the linear roller bearing assembly 820 can suitably operate.

The hub 822 may be configured to be coupled to a moveable component (e.g., a piston, etc.) of a machine (e.g., a Stirling engine, a cryocooler, a pump, a refrigerator, etc.). In the illustrated embodiment, the hub 822 is lighter than the collar 824 and includes a central bore or cavity 822a, which can be used to further minimize the weight of the hub 822 and increase the resonant natural frequency with which the hub 822 can be moved linearly along the selected direction 140. In one embodiment, the moveable component of the machine may be coupled to the hub 822 by being threadedly engaged with the central bore 822a of the hub 822. In other embodiments, however, the hub 822 may be coupled to an immovable component of a machine and the collar 824 can be moveable along the selected direction 140.

The collar 824 is disposed around the hub 822 and the roller bearing sub-assemblies 810 are disposed in a radial pattern around the hub 822. The collar 824 may be configured to be coupled to an immoveable component (e.g., a housing, a mounting point) of a machine (e.g., a Stirling engine, a cryocooler, a pump, etc.). The immoveable component of the machine may be coupled to the collar 824 by any suitable method. In other embodiments, however, the collar 824 may be coupled to a movable component of a machine when, for example, the hub 822 is coupled to an immovable component of the machine.

In one embodiment, within at least one of the roller bearing sub-assemblies 810, the rollers and mounting portions are formed of electrically insulating material(s) and one or more of the straps is formed of an electrically conductive material (e.g., beryllium copper alloy) suitable for transmitting one or more types of electrical current (e.g., voltage, polarity, phase, wave shape, etc.). In this embodiment, the mounting portion attachments 134 and 136 may also be formed of an electrically conductive material. The electrically conductive strap, and the optional electrically conductive first mounting portion attachment 134 and/or second mounting portion attachment 136 which contact the electrically conductive strap, forms an electrical connector. Wires and/or components within a machine may be electrically connected together by the electrical connector. Thus, at least one of the roller bearing sub-assemblies 810 may include at least one electrical connector configured to transmit signals, power, or the like or a combination thereof, outside the roller bearing sub-assembly 810 (e.g., to wires and/or components within a machine that incorporates the linear roller bearing assembly 820) and conduct the electric current to a moving device (e.g., an armature, a transducer, a sensor, or the like or a combination thereof).

In the illustrated embodiment, each of the hub 822 and the collar 824 constitute a single, monolithic piece. In other embodiments, however, the hub 822 and the collar 824 may each be formed from multiple pieces. The hub 822 and collar 824 may be formed from the same material(s) as described above with respect to the first mounting portion 122 and 124.

Constructed as described above, the linear roller bearing assembly 820 can stably support loads in both radial and torsional directions.

Figure 9B:
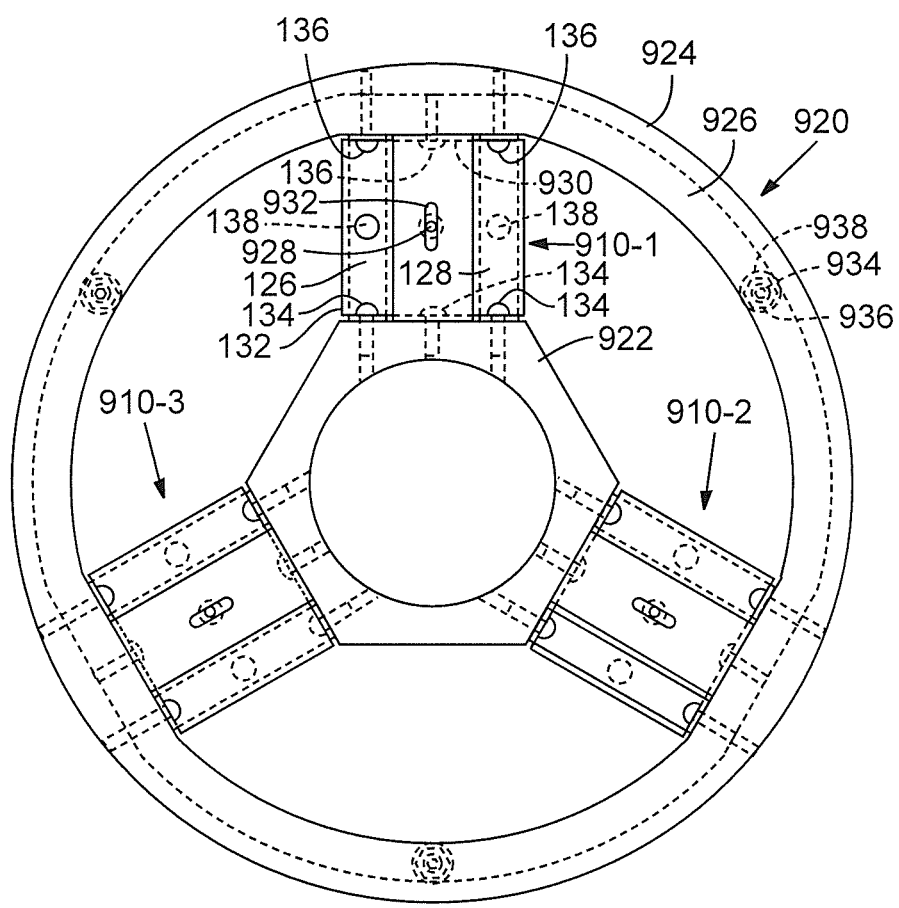
FIG. 9B is an end view of the linear roller bearing assembly shown in FIG. 9, taken along line 9B-9B of FIG. 9A.

FIG. 9 is an end view of a linear roller bearing assembly according to a ninth embodiment of the invention. FIG. 9A is a cross-sectional view of the linear roller bearing assembly shown in FIG. 9 in a mid-stroke position, taken along line 9A-9A of FIG. 9. FIG. 9B is an end view of the linear roller bearing assembly shown in FIG. 9, taken along line 9B-9B of FIG. 9A.

Referring to FIGS. 9, 9A and 9B, a linear roller bearing assembly 920 according to a ninth embodiment includes a roller bearing sub-assemblies (e.g., first roller bearing sub-assembly 910-1, second roller bearing sub-assembly 910-2, and third roller bearing sub-assembly 910-3, each generically referred to herein as a "roller bearing sub-assembly 910"), a hub (e.g., hub 922), a collar (e.g., collar 924), a tensioning device (e.g., including a tensioning ring 926 and adjustable attachment devices each including a screw 934, a lock nut 936, and a spring washer 938).

The roller bearing sub-assemblies 910 may be provided as exemplarily described above with respect to the eighth embodiment. However, in the illustrated embodiment, the second end of the central strap 930 of each of the roller bearing sub-assemblies 910 is secured to the tensioning device 926 by the attachment 136 instead of to the collar 924. Additionally in the illustrated embodiment, the central strap 930 of each of the roller bearing sub-assemblies 910 is not fixedly attached to the roller 132. Rather, the central strap 930 includes a slot 932 extending circumferentially around the roller 132 and a pin 928 extends from a surface of the roller 132 through the longitudinal slot 932. Constructed as described above, the pin 928 extending through the slot 932 of the central strap 930 enables the central strap 930 to slide circumferentially across the surface of the roller 132 when, for example, the tensioning device 926 is moved relative to the collar 924. Thus, the central strap 930 can be circumferentially free of the roller 132.

The tensioning ring 926 is a substantially rigid structure that is moveably coupled to the collar 924 via the adjustable attachment devices. In the illustrated embodiment, each adjustable attachment device includes a screw 934, a lock nut 936 and a spring washer 938. The screw 934 threadedly engages with the inner surface of a bore extending through the tensioning ring 926, and also extends into a recess formed in an end surface of the collar 924. The lock nut 936 is threadedly coupled to the screw 934 and is disposed on one side of the tensioning ring 926. The spring washer 938 is disposed between the tensioning ring 926 and the end surface of the collar 924. The spring washer 938 biases the tensioning ring 926 away from the end surface of the collar 924 while the lock nut 936 locks the screw 934 from turning within the tensioning ring 926. In one embodiment, the spring washer 938 may be omitted. Alternately the tensioning ring 926 can be deformable in the direction of the axis of the collar 924 and provide a strap tensioning force.

Constructed as described above, tension within the central strap 930 of each of the roller bearing sub-assemblies 910 can be adjusted by threading the screw 934 toward the end surface of the collar 924, resulting in an increase of tension within the central straps 930, or by threading the screw 934 away from the end surface of the collar 924, resulting in the spring washer 938 providing a relatively constant tensioning within the central straps 930. The lock nut 936 is used to lock the screw 934 after tension within the strap 930 is adjusted. When the tensioning device tensions the center strap 930, the peripheral straps 126 and 128 are also tensioned by virtue of the slippage allowed by the slot 932. The pins 928, which extend through the slots 932 of the central straps 930, can minimize or prevent travel of the central straps 930 along the longitudinal axis of the roller 132. It will be appreciated, however, that the pin 928 and slot 932 may be omitted from in one or more or all of the roller bearing sub-assemblies 910.

The hub 922 and collar 924 may be configured in a similar manner as described above with respect to the hub 822 and collar 824. For example, the hub 922 may be configured to be coupled to a moveable component (e.g., a piston, etc.) of a machine (e.g., a Stirling engine, a cryocooler, a pump, a refrigerator, etc.) and the collar 924 may be configured to be coupled to the immoveable component of the machine.

FIG. 10 is an end view of a linear roller bearing assembly according to a tenth embodiment of the invention. FIG. 8A is a cross-sectional view of the linear roller bearing assembly shown in FIG. 10 in a mid-stroke position, taken along line 10A-10A of FIG. 10.

Referring to FIGS. 10 and 10A, a linear roller bearing assembly 1020 according to a tenth embodiment includes roller bearing sub-assemblies (e.g., first roller bearing sub-assembly 1010-1, second roller bearing sub-assembly 1010-2, third roller bearing sub-assembly 1010-3, fourth roller bearing sub-assembly 1010-4, fifth roller bearing sub-assembly 1010-5, and a sixth roller bearing sub-assembly 1010-6, each generically referred to herein as a "roller bearing sub-assembly 1010"), a hub (e.g., hub 1022), a collar (e.g., collar 1024), tensioning device (e.g., including a tensioning ring 1026 and adjustable attachment devices, each including a pin 1028 and a coil spring 1030), hub attachments (e.g., hub attachments 1034), collar attachments (e.g., collar attachments 1036) and straps (e.g., first peripheral strap 1042, second peripheral strap 1044, central straps 130 and 930). Also shown in FIGS. 10 and 10A are mounting portions (e.g., first mounting portions 1032 and second mounting portions 1034).

The roller bearing sub-assemblies 1010 may be provided in a manner similar to that exemplarily described with respect to the second embodiment. However in the illustrated embodiment, each roller bearing sub-assembly 1010 includes a first peripheral strap 1042 and a second peripheral strap 1044 each provided as a continuous loop that is wrapped around rollers 132a and 132b and attached to the rollers 132a and 132b with the attachments 138a and 138b, respectively. With this configuration, the peripheral straps 1042 and 1044 need not be secured to any portion of the hub 1022 or collar 1024 by any mounting portion attachments. Rather, within each roller bearing sub-assembly 1010, first ends of the central straps 930 and 130 are secured to the first mounting portion 1032 by first mounting portion attachments 134a and 134b, respectively. Likewise, second ends of the central straps 930 and 130 are secured to the tensioning ring 1026 and the second mounting portion 1034, respectively, by second mounting portion attachments 136a and 136b, respectively. The first mounting portion 1032 is coupled to the hub 1022 by one or more hub attachments 1036 and the second mounting portion 1034 is coupled to the collar 1024 by one or more collar attachments 1038. Consequently, the central straps 930 and 130 of each roller bearing sub-assembly 1010 can be connected to either the hub 1022 or the collar 1024 via a first mounting portion 1032 or a second mounting portion 1034.

The hub attachments 1034 and collar attachments 1036 may be provided as exemplarily described with respect to the attachments 134, 136 and 138. In one embodiment, hub attachments 1034 (e.g., pins) are inserted into apertures formed in the hub 1022 and the first mounting portions 1032 to couple the hub 1022 and first mounting portions 1032 together. Likewise, collar attachments 1036 (e.g., pins) are inserted into apertures formed in the collar 1034 and second mounting portions 1034 to couple the collar 1024 and second mounting portions 1034 together. An adhesive material such as epoxy may be provided to fix the hub attachments 1036 and collar attachments 1038 within their respective apertures. Once inserted into an aperture, each hub attachment 1036 prevents a corresponding first mounting portion 1032 from sliding relative to the hub 1022 (e.g., along the direction of the axis of the hub 1022 and collar 1024). Likewise, once inserted into an aperture, each collar attachment 1038 prevents a corresponding second mounting portion 1034 from sliding relative to the collar 1024 (e.g., along the direction of the axis of the hub 1022 and collar 1024).

Constructed as exemplarily described above, the roller bearing sub-assemblies 1010 support the hub 1022 and precisely guide relative motion between the hub 1022 and the collar 1024 so that gaps 1040 between the hub 1022 and collar 1024 are maintained even as the hub 1022 and collar 1024 move relative to each other along a linear direction.

As exemplarily illustrated, the central strap 930 of each roller bearing sub-assembly 1010 is configured as exemplarily described above with respect to the ninth embodiment. Pin 928 may also be provided to extend from the surface of the roller 132a through a slot 932 formed in the central strap 930. Constructed as described above, the pin 928 extending through the slot 932 of the central strap 930 enables the central strap 930 to slide across the surface of the roller 132a when, for example, the tensioning ring 1026 is moved relative to the collar 1024.

Although the roller bearing sub-assemblies 1010 are described above as being provided in a similar manner as described with respect to the second embodiment, it will be appreciated that each of the roller bearing sub-assemblies 1010 can be provided as any type of roller bearing sub-assembly described herein.

Although the linear roller bearing assembly 1020 has been described above as including six roller bearing sub-assemblies 1010 disposed in a radial pattern around the hub 1022, it will be appreciated that the linear roller bearing assembly 1020 can include three or more roller bearing sub-assemblies disposed in a radial pattern around the hub 1022. Further, decreasing the number of roller bearing sub-assemblies may advantageously reduce the weight of the linear roller bearing assembly 1020. In one embodiment, one or more roller bearing sub-assemblies 1010 may be removed from locations that are not supporting preferential loading in one radial direction due to the presence of a gravitational, electrical or magnetic field, or the like or a combination thereof.

Similar to the tensioning device described above with respect to the ninth embodiment, the tensioning ring 1026 is a substantially rigid structure that is moveably coupled to the collar 1024 via tensioning attachment devices. In the illustrated embodiment, each adjustable attachment device includes a pin 1028 and a coil spring 1030. The pin 1028 is fixedly coupled to the collar 1024, and also extends into a clearance bore formed through the tensioning ring 1026. The compressed coil spring 1030 is disposed within the recess formed in the end surface of the collar 1024 and biases the tensioning ring 1026 away from the end surface of the collar 1024, thereby ensuring that the central straps 930 of the roller bearing sub-assemblies 1010 are maintained in a predetermined level of tension.

The hub 1022 and collar 1024 may be configured in a similar manner as described above with respect to the hub 822 and collar 824. For example, the hub 1022 may be configured to be coupled to a moveable component (e.g., a piston, etc.) of a machine (e.g., a Stirling engine, a cryocooler, a pump, a refrigerator, etc.) and the collar 1024 may be configured to be coupled to the immoveable component of the machine.

Figure 11:
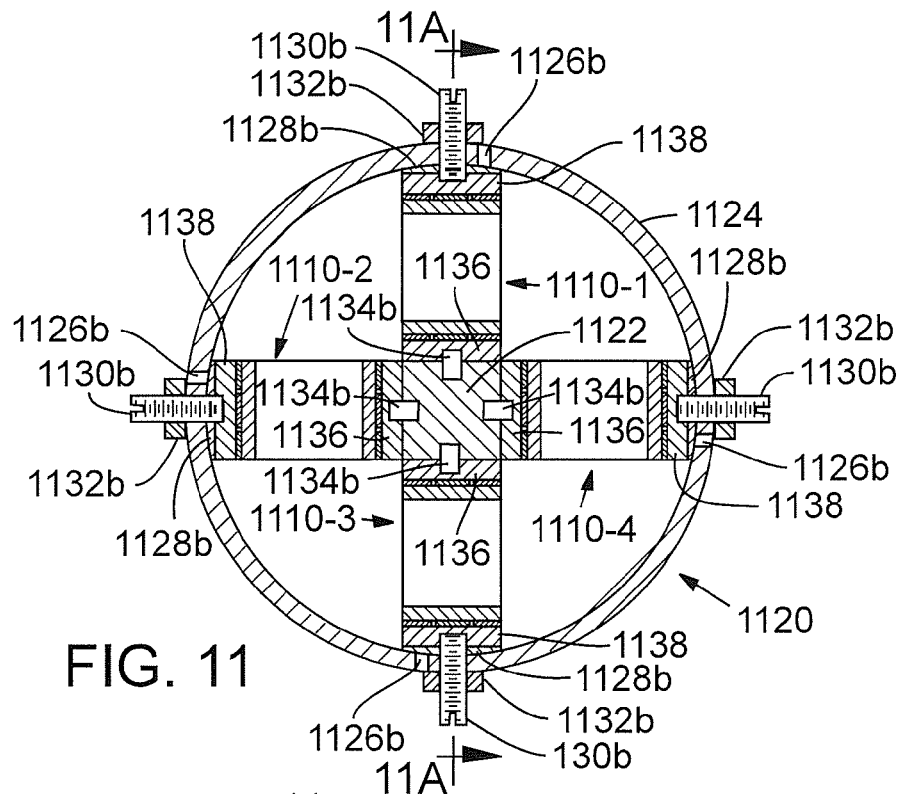
FIG. 11 is a cross-sectional view of a linear roller bearing assembly according to an eleventh embodiment of the invention.
Figure 11A:
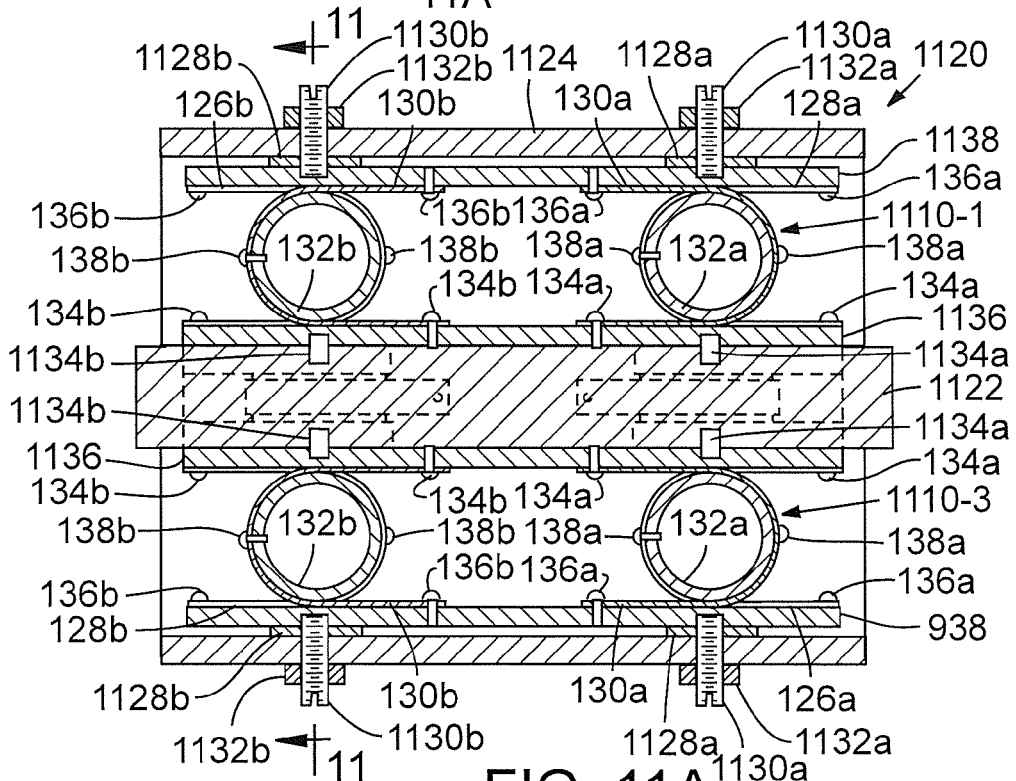
FIG. 11A is a cross-sectional view of the linear roller bearing assembly shown in FIG. 11 in a mid-stroke position, taken along line 11A-11A of FIG. 11.

FIG. 11 is a cross-sectional view of a linear roller bearing assembly according to an eleventh embodiment of the invention. FIG. 11A is a cross-sectional view of the linear roller bearing assembly shown in FIG. 11 in a mid-stroke position, taken along line 11A-11A of FIG. 11.

Referring to FIGS. 11 and 11A, a linear roller bearing assembly 1120 according to an eleventh embodiment includes roller bearing sub-assemblies (e.g., first roller bearing sub-assembly 1110-1, second roller bearing sub-assembly 1110-2, third roller bearing sub-assembly 1110-3 and fourth roller bearing sub-assembly 1110-4, each generically referred to herein as a "roller bearing sub-assembly 1110"), a hub (e.g., hub 1122), a collar (e.g., collar 1124), fixing devices (e.g., first fixing devices, each including a first screw 1130a, a first nut 1132a, a first access hole (not shown) and first fixing material 1128a, and second fixing devices, each including a second screw 1130b, a corresponding second nut 1132b, a second access hole 1126b and second fixing material 1128b), hub attachments (e.g., first hub attachments 1134a and second hub attachments 1134b). Also shown in FIGS. 11 and 11A are mounting portions (e.g., first mounting portions 1136 and second mounting portions 1138).

The roller bearing sub-assemblies 1110 may be provided as exemplarily described with respect to the second embodiment. For example, within each roller bearing sub-assembly 1110, first ends of the first peripheral straps 126a and 126b, second peripheral straps 128a and 128b, and central straps 130a and 130b are secured to a first mounting portion 1136 by first mounting portion attachments 134a and 134b. Likewise, second ends of the first peripheral straps 126a and 126b, second peripheral straps 128a and 128b, and central straps 130a and 130b are secured to a second mounting portion 1138 by second mounting portion attachments 136a and 136b. The first mounting portion 1136 is coupled to the hub 1122 by one or more first hub attachments 1134a and one or more second hub attachments 1134b and the second mounting portion 1138 is coupled to the collar 1124 by one or more first fixing devices and one or more second fixing devices. Consequently, the straps 126a, 126b, 128a, 128b, 130a and 130b of each roller bearing sub-assembly 1110 can be connected to either the hub 1122 or the collar 1124 via a first mounting portion 1136 or a second mounting portion 1138.

The hub attachments 1134a and 1134b may be configured in a similar manner as described above with respect to the hub attachments 1036. Likewise, the hub 1122 and the first mounting portions 1136 may be configured in a similar manner as described above with respect to the eighth embodiment to ensure that the hub 1122 and the first mounting portions 1136 are adequately secured to each other.

In the illustrated embodiment, the first screw 1130a of each first fixing device threadedly engages with the inner surface of a bore extending through the collar 1124, and also extends into a recess formed in the second mounting portion 1138. The first nut 1132a threadedly engages with first screw 1130a and can be tightened against an outer surface of the collar 1124. The first fixing material 1128a may be injected into a space formed between the collar 1124 and the second mounting portion 1138 through the first access hole. Likewise, the second screw 1130b of each second fixing device threadedly engages with the inner surface of a bore extending through the collar 1124, and also extends into a recess formed in the second mounting portion 1138. The second nut 1132b threadedly engages with second screw 1130b and can be tightened against the outer surface of the collar 1124. The second fixing material 1128b may be injected into the space formed between the collar 1124 and the second mounting portion 1138 through the second access hole 1126b. The first fixing material 1128a and second fixing material 1128b may be an adhesive material such as an epoxy. It will be appreciated however, that the first fixing material 1128a and the second fixing material 1128b may be omitted, as may the first access hole and the second access hole 1126b.

Although FIGS. 11 and 11A illustrate recesses formed in the second mounting portion 1138 that receive the first and second screws 1130a and 1130b, it will be appreciated that the recesses may be omitted. Further, although FIGS. 11 and 11A illustrate wherein the length and width of the recess in the second mounting portion 1138 is equal to the diameter of the first and second screws 1130a and 1130b, it will be appreciated that the length and width of the recess in the second mounting portion 1138 may be greater than the diameter of the first and second screws 1130a and 1130b. Accordingly, the axis of the hub 1122 can be radially positioned with respect to the axis of the collar 1124 by, for example, adjusting the amount by which the screws 1130a and 1130b extend through the collar 1124. Although not illustrated, shim washers may be provided between the collar 1124 and one or more of the mounting portions.

Although the roller bearing sub-assemblies 1110 are described above as being provided as described with respect to the second embodiment, it will be appreciated that each of the roller bearing sub-assemblies 1110 can be provided as any type of roller bearing sub-assembly described herein.

Although the linear roller bearing assembly 1120 has been described above as including four roller bearing sub-assemblies 1110 disposed in a radial pattern around the hub 1122, it will be appreciated that the linear roller bearing assembly 1120 can include three or more roller bearing sub-assemblies disposed in a radial pattern around the hub 1122.

The hub 1122 and collar 1124 may be configured in a similar manner as described above with respect to the hub 822 and collar 824. For example, the hub 1122 may be configured to be coupled to a moveable component (e.g., a piston, etc.) of a machine (e.g., a Stirling engine, a cryocooler, a pump, a refrigerator, etc.) and the collar 1124 may be configured to be coupled to the immoveable component of the machine.

Figure 12:
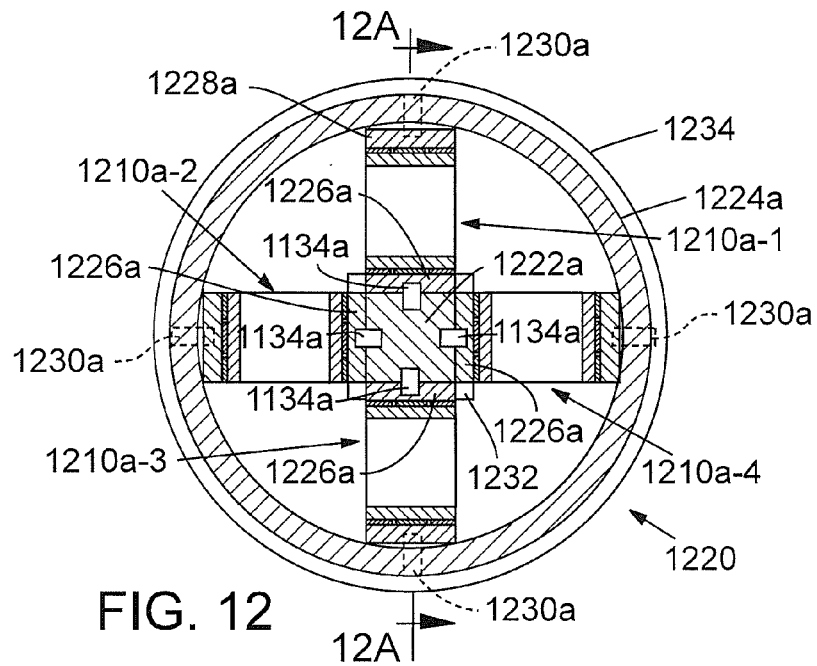
FIG. 12 is a cross-sectional view of a linear roller bearing assembly according to a twelfth embodiment of the invention.
Figure 12A:
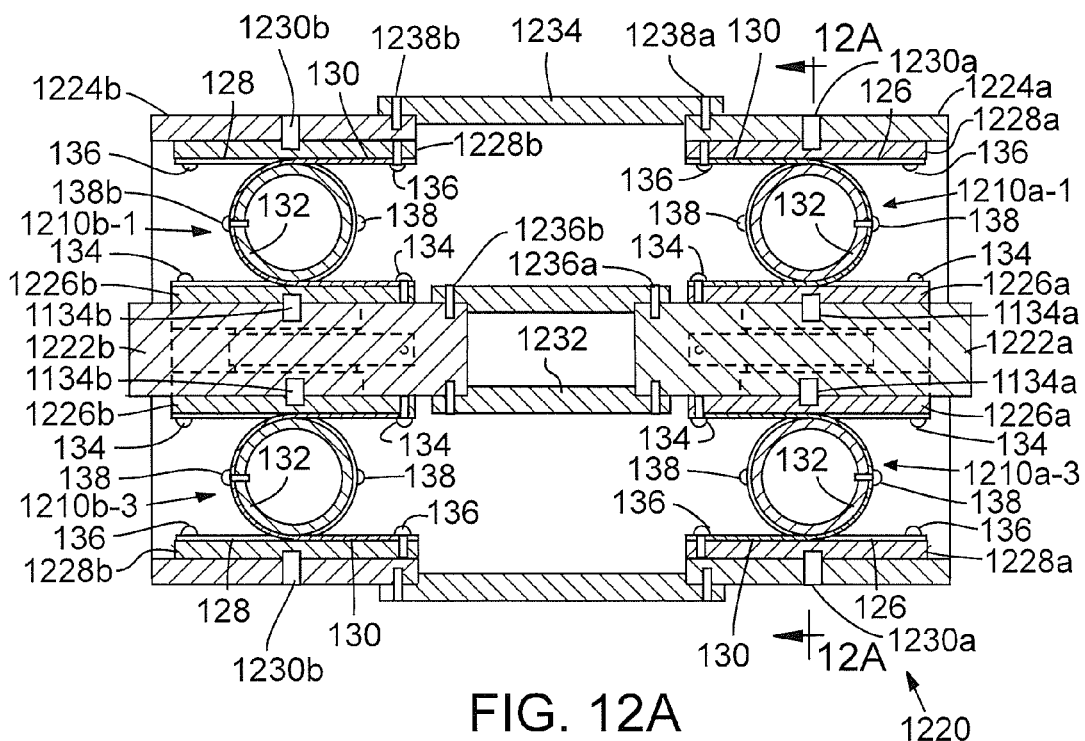
FIG. 12A is a cross-sectional view of the linear roller bearing assembly shown in FIG. 12 in a mid-stroke position, taken along line 12A-12A of FIG. 12.

FIG. 12 is a cross-sectional of a linear roller bearing assembly according to a twelfth embodiment of the invention. FIG. 12A is a cross-sectional view of the linear roller bearing assembly shown in FIG. 12 in a mid-stroke position, taken along line 12A-12A of FIG. 12.

Referring to FIGS. 12 and 12A, a linear roller bearing assembly 1220 according to a twelfth embodiment includes roller bearing sub-assemblies (e.g., first roller bearing sub-assemblies 1210a-1 and 1210b-1, second roller bearing sub-assemblies 1210a-2 and 1210b-2 (not shown), third roller bearing sub-assemblies 1210a-3 and 1210b-3 and fourth roller bearing sub-assemblies 1210a-4 and 1210b-4 (not shown), each generically referred to herein as a "roller bearing sub-assembly 1210"), hubs (e.g., first hub 1222a and second hub 1222b), collars (e.g., first collar 1224a and second collar 1224b), hub attachments (e.g., first hub attachments 1134a and second hub attachments 1134b), collar attachments (e.g., first collar attachments 1230a and second collar attachments 1230b), a hub spacer (e.g., hub spacer 1232), a collar spacer 1234, hub spacer attachments (e.g., first hub spacer attachments 1236a and second hub spacer attachments 1236b) and collar spacer attachments (e.g., first collar spacer attachments 1238a and second collar spacer attachments 1238b). Also shown in FIGS. 12 and 12A are mounting portions (e.g., first mounting portions 1226a and 1226b and second mounting portions 1228a and 1228b).

The roller bearing sub-assemblies 1210 may be provided as exemplarily described with respect to the first embodiment. For example, within each roller bearing sub-assembly 1210, first ends of the first peripheral strap 126, second peripheral strap 128, and central strap 130 is secured to a first mounting portion 1226a or 1226b by first mounting portion attachments 134. Likewise, second ends of the first peripheral strap 126, second peripheral strap 128, and central strap 130 are secured to a second mounting portion 1228a or 1228b by second mounting portion attachments 136. The first mounting portions 1226a and 1226b are coupled to respective ones of the first and second hubs 1222a and 1222b by one or more first hub attachments 1134a and one or more second hub attachments 1134b, respectively. The second mounting portions 1228a and 1228b are coupled to respective ones of the first and second collars 1224a and 1224b by one or more first collar attachments 1230a and one or more second hub attachments 1230b, respectively. Consequently, the straps 126, 128, and 130 of each roller bearing sub-assembly 1210 can be connected to either a hub 1222a or 1222b or a collar 1224a or 1224b via a first mounting portion 1226a or 1226b or a second mounting portion 1228a or 1228b.

The hub attachments 1134a and 1134b may be configured in a similar manner as described above with respect to the hub attachments 1036. Likewise, each of the hubs 1222a and 1222b, and each of the first mounting portions 1226a and 1226b, may be configured in a similar manner as described above with respect to the eighth embodiment to ensure that the hubs 1222a and 1222b and corresponding ones of the first mounting portions 1226a and 1226b are adequately secured to each other. Similarly, the collar attachments 1230a and 1230b may be configured in a similar manner as described above with respect to the collar attachments 1038. Likewise, each of the collars 1224a and 1224b, and each of the second mounting portions 1228a and 1228b, may be configured in a similar manner as described above with respect to the eighth embodiment to ensure that the collars 1224a and 1224b and corresponding ones of the second mounting portions 1228a and 1228b are adequately secured to each other.

In one embodiment, the hub spacer 1232 and the collar spacer 1234 may be components unique to the linear roller bearing assembly 1220. In another embodiment, the hub spacer 1232 and the collar spacer 1234 may be actual components of a machine with which the linear roller bearing assembly 1220 is incorporated. For example, the hub spacer 1232 may comprise different portions of an armature of a linear alternator. In another example, the collar spacer 1234 may be a portion of a cylinder within which the stator is located.

The hub spacer attachments 1236a and 1236b may be configured in a similar manner as described above with respect to the hub attachments 1036. Likewise, each of the hubs 1222a and 1222b, and the hub spacer 1232, may be configured in a similar manner as described above with respect to the eighth embodiment to ensure that the hubs 1222a and 1222b and the hub spacer 1232 are adequately secured to each other. Similarly, the collar spacer attachments 1238a and 1238b may be configured in a similar manner as described above with respect to the collar attachments 1038.

Likewise, each of the collars 1224a and 1224b, and the collar spacer 1234, may be configured in a similar manner as described above with respect to the eighth embodiment to ensure that the collar 1224 and the collar spacer 1234 are adequately secured to each other.

Although the roller bearing sub-assemblies 1210 are described above as being provided as described with respect to the first embodiment, it will be appreciated that each of the roller bearing sub-assemblies 1210 can be provided as any type of roller bearing sub-assembly described herein.

Although the linear roller bearing assembly 1220 has been described above as including groups of four roller bearing sub-assemblies 1210 disposed in a radial pattern around the hubs 1222a and 1222b, and groups of two roller bearing sub-assemblies 1210 disposed in an axial pattern along the hubs 1222a and 1222b, it will be appreciated that the linear roller bearing assembly 1220 can include three or more roller bearing sub-assemblies 1210 disposed in any radial and axial pattern around the hubs 1222a and 1222b.

The hubs 1222a and 1222b and collars 1224a and 1224b may be configured in a similar manner as described above with respect to the hub 822 and collar 824. For example, the hubs 1222a and 1222b may be configured to be coupled to a moveable component (e.g., a piston, etc.) of a machine (e.g., a Stirling engine, a cryocooler, a pump, a refrigerator, etc.) and the collars 1224a and 1224b may be configured to be coupled to the immoveable component of the machine.

FIG. 14 is an end view of a linear roller bearing assembly according to a thirteenth embodiment of the invention. FIG. 14A is a cross-sectional view of the linear roller bearing assembly shown in FIG. 14 in a mid-stroke position, taken along line 14A-14A of FIG. 14.

Referring to FIGS. 14 and 14A, a linear roller bearing assembly 1420 according to a thirteenth embodiment includes roller bearing sub-assemblies (e.g., first roller bearing sub-assembly 1410-1, second roller bearing sub-assembly 1410-2 and third roller bearing sub-assembly 1410-3, each generically referred to herein as a "roller bearing sub-assembly 1410"), a hub (e.g., hub 1422), a collar (e.g., collar 1424), and bores (e.g., first bore 1428-1, second bore 1428-2, and third bore 1428-3, each generically referred to herein as a "bore 1428").

The roller bearing sub-assemblies 1410 are spaced apart from each other at a regular interval around the hub 1422. Each of the roller bearing sub-assemblies 1410 is provided as exemplarily described with respect to FIG. 9.

Within the linear roller bearing assembly 1420, the roller bearing sub-assemblies 1410 support the hub 1422 and precisely guide relative motion between the hub 1422 and the collar 1424 so that gaps 1430 between the hub 1422 and collar 1424 are maintained even as the hub 1422 and collar 1424 move relative to each other along a linear direction.

Although the roller bearing sub-assemblies 1410 are described above as being provided as described with respect to FIG. 9, it will be appreciated that each of the roller bearing sub-assemblies 1410 can be provided as any type of roller bearing sub-assembly described herein.

Although the linear roller bearing assembly 1420 has been described above as including only three roller bearing sub-assemblies 1410 disposed in a radial pattern around the hub 1422, it will be appreciated that the linear roller bearing assembly 1420 can include three or more roller bearing sub-assemblies disposed in a radial pattern around the hub 1422.

The hub 1422 and the collar 1424 may be configured in a similar manner as described above with respect to the hub 822 and collar 824. For example, the hub 1422 may be configured to be coupled to a moveable component (e.g., a piston, etc.) of a machine (e.g., a Stirling engine, a cryocooler, a pump, a refrigerator, etc.) and the collar 1424 may be configured to be coupled to the immoveable component of the machine. Moreover, the bores 1428 may be configured to be coupled to a moveable component (e.g., a piston, etc.) or to an immoveable component (e.g., a housing, a mounting point) of the machine. For example, in the illustrated embodiment, a component of the machine may be coupled to the collar 1424 by being threadedly engaged with one or more of the bores 1428. In another example, a flange (not shown) may be provided at an end surface of the collar 1424 and the component of the machine may be coupled to the collar 1424 via the flange (e.g., using a clamp, a bolt, adhesive, or the like or a combination thereof).

Method of Forming Precision Linear Bearing Assembly

FIG. 13 is an end view illustrating the linear roller bearing assembly shown in FIG. 10 at an intermediate stage of fabrication. FIG. 13A is a cross-sectional view of the linear roller bearing assembly shown in FIG. 10, taken along line 13A-13A of FIG. 13, at another intermediate stage of fabrication.

The hub 1022 and collar 1024 of the linear roller bearing assembly 1020 may be formed according to any suitable method. For example, referring to FIG. 13, the linear roller bearing assembly 1020 may be fabricated by obtaining or otherwise forming a workpiece 1320 having an inner wall 1322 defining a central bore, and an outer wall 1324.

Next, bores (e.g., first bore 1310-1, second bore 1310-2, third bore 1310-3, fourth bore 1310-4, fifth bore 1310-5 and sixth bore 1310-6, each generically referred to herein as a "bore 1310"), equally spaced apart from one another, can be precision formed (e.g., by drilling, grinding, or the like or a combination thereof) in the workpiece 1320 using the axis of the central bore 1322 as a reference. As exemplarily illustrated, the axis of one bore 1310 is parallel with the axis of every other bore 1310. In the illustrated embodiment, the bores 1310 are disposed in a regular pattern around central bore 1322. It will be appreciated, however, that the bores 1310 may be disposed in any desired arrangement.

After forming the bores 1310, portions of the workpiece 1320 between pairs of adjacent bores 1310 can be removed (e.g., by saw-cutting, drilling, grinding, or the like or a combination thereof) to form gaps (e.g., first gap 1040-1, second gap 1040-2, third gap 1040-3, fourth gap 1040-4, fifth gap 1040-5 and sixth gap 1040-6, each generically referred to herein as the aforementioned "gap 1040"). It will be appreciated that the gaps 1040 may be made as wide or as narrow as desired. The gaps 1040 communicate with the bores 1310 to separate the workpiece 1320 into two separate and distinct pieces corresponding to the hub 1022 and the collar 1024. Subsequently, the collar 1024 may be shortened so that a tensioning ring (see, e.g., tensioning ring 1026 shown in FIG. 10) may be accommodated around the hub 1022 (see, e.g., FIG. 13A).

The first mounting portions 1032 and second mounting portions 1034 may be formed by any suitable method. For example, a pair of mounting portions 1032 and 1034 may be fabricated by obtaining or otherwise forming a solid, cylindrical workpiece (not shown) having a diameter that is approximately equal to the diameter of a bore 1310. The workpiece may then be processed (e.g., by cutting, drilling, grinding, or the like or a combination thereof) to remove a central portion of the workpiece, thereby forming the strap-supporting surfaces 123a and 125b of the mounting portions 1032 and 1034, respectively.

Subsequently, the roller-bearing sub-assemblies 1010 may be formed, inserted into the bores 1310 and secured to the hub 1022 and 1024 as exemplarily described above.

FIG. 15 is an end view of the linear roller bearing assembly shown in FIGS. 14 and 14A at an intermediate stage of fabrication. FIG. 15A is a cross-sectional view of the linear roller bearing assembly shown in FIG. 15, taken along line 15A-15A of FIG. 15.

The hub 1422 and collar 1424 of the linear roller bearing assembly 1420 may be formed according to any suitable method. For example, referring to FIGS. 15 and 15A, the linear roller bearing assembly 1420 may be fabricated by obtaining or otherwise forming a workpiece 1520 having an inner wall 1522 defining a central bore, and an outer wall 1524.

Next, bores (e.g., first bore 1510-1, second bore 1510-2, third bore 1510-3, each generically referred to herein as a "bore 1510"), equally spaced apart from one another, can be precision formed (e.g., by drilling, grinding, or the like or a combination thereof) in the workpiece 1520 using the axis of the central bore 1522 as a reference. As exemplarily illustrated, the axis of one bore 1510 is parallel with the axis of every other bore 1510. In the illustrated embodiment, the bores 1510 are disposed in a regular pattern around central bore 1522. It will be appreciated, however, that the bores 1510 may be disposed in any desired arrangement.

The bores 1428 are also formed (e.g., by cutting, drilling, grinding, or the like or a combination thereof) in the workpiece 1520 using the axis of the central bore 1522 as a reference. The bores 1428 can be formed before or after the bores 1510 are formed. In another embodiment, the bores 1428 can be formed contemporaneously with the formation of the bores 1510.

After forming the bores 1510, portions of the workpiece 1520 between pairs of adjacent bores 1510 can be removed (e.g., by saw-cutting, drilling, grinding, or the like or a combination thereof) to form gaps (e.g., first gap 1430-1, second gap 1430-2 and third gap 1430-3, each generically referred to herein as the aforementioned "gap 1430"). It will be appreciated that the gaps 1430 may be made as wide or as narrow as desired. The gaps 1430 communicate with the bores 1510 to separate the workpiece 1520 into two separate and distinct pieces corresponding to the hub 1422 and the collar 1424.

Opposing portions of the hub 1422 and collar 1424, which are spaced apart from each other by respective bores 1510, correspond to the mounting portions of the hub 1422 and collar 1424, respectively. Opposing sidewall surfaces 1528 and 1530 of each bore 1510 are precisely planar and parallel. Thus, the mounting portions of the hub 1422 and collar 1424 correspond to the first and second mounting portions 122 and 124, respectively, and the surfaces 1528 and 1530 correspond to the strap-supporting surfaces 123a and 125a of the first and second mounting portions 122 and 124, respectively.

Subsequently, the roller-bearing sub-assemblies 1410 may be formed, inserted into the bores 1510 and secured to the hub 1422 and 1424 as exemplarily described above.

Reciprocating Machinery Using Linear Roller Bearing Assemblies

Figure 16:
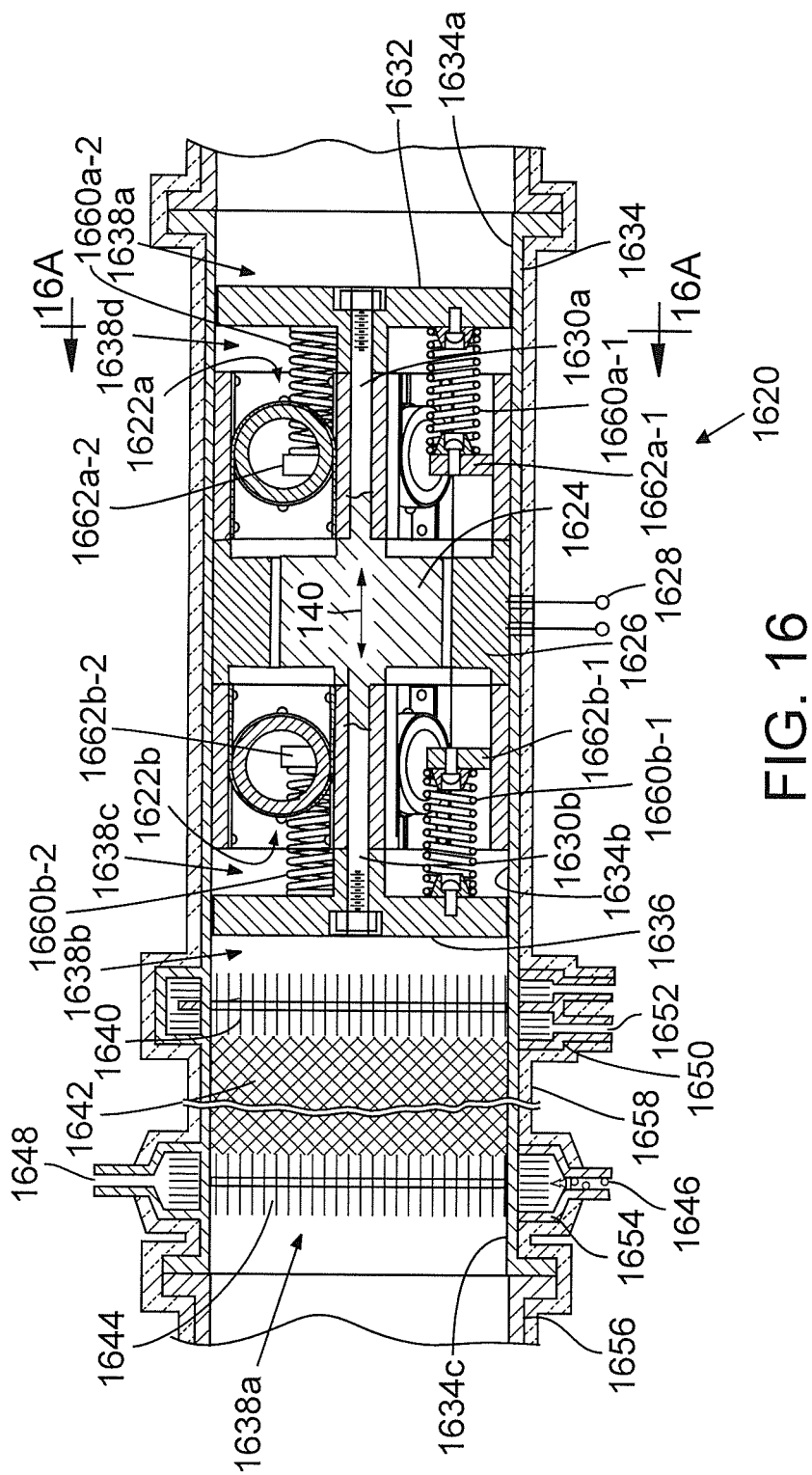
FIG. 16 is a partial cross-sectional view of a Stirling engine power module incorporating a linear roller bearing assembly having a plurality of roller bearing sub-assemblies, such as the roller bearing sub-assembly illustrated in FIG. 1, according to a fourteenth embodiment of the invention.
Figure 16A:
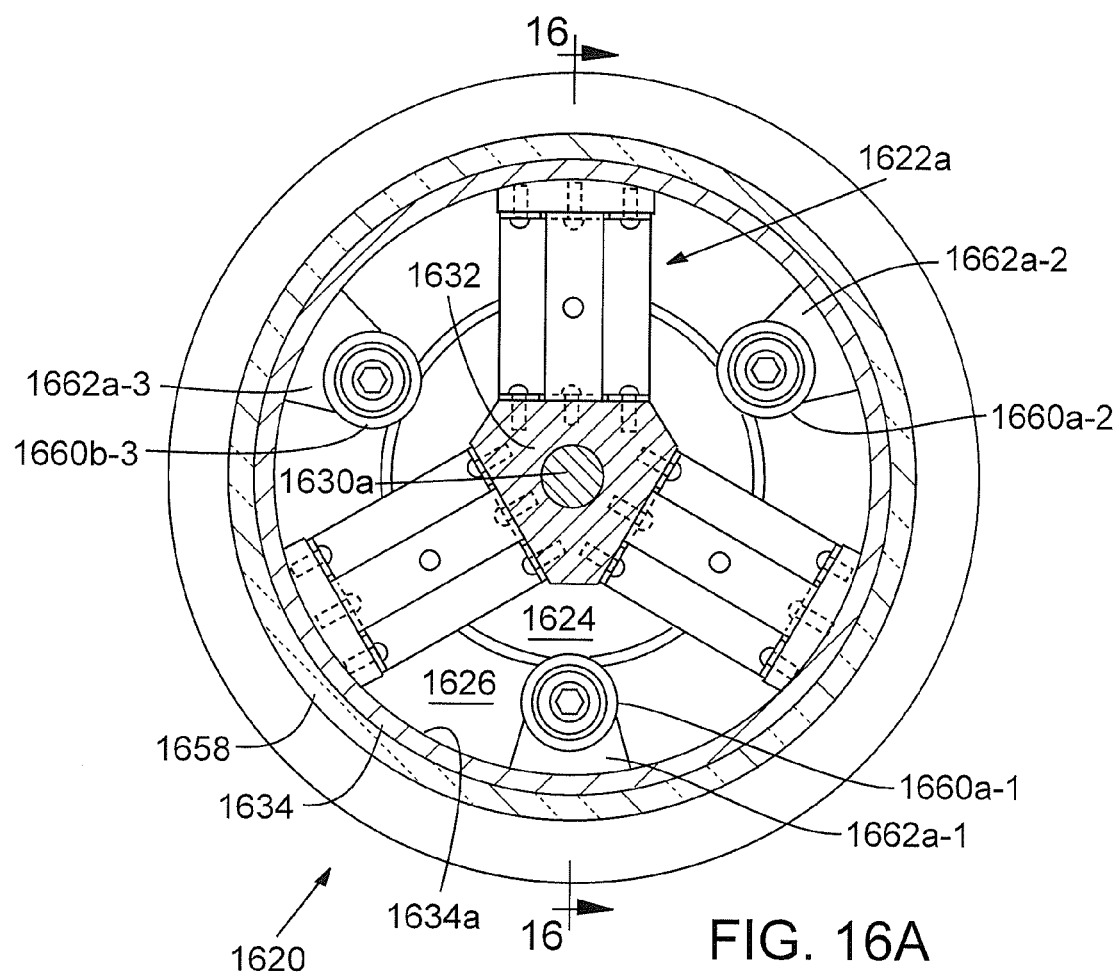
FIG. 16A is a cross-sectional view of the Stirling engine power module shown in FIG. 16, taken along line 16A-16A of FIG. 16.

FIG. 16 is a cross-sectional view of a Stirling engine power module incorporating a linear roller bearing assembly having a plurality of roller bearing sub-assemblies, such as the roller bearing sub-assembly illustrated in FIG. 1, according to a fourteenth embodiment of the invention. FIG. 16A is a cross-sectional view of the Stirling engine power module shown in FIG. 16, taken along line 16A-16A of FIG. 16.

Referring to FIGS. 16 and 16A, a Stirling engine power module 1620 may, for example, include one or more guiding mechanisms such as any of the aforementioned linear roller bearing assemblies (exemplarily illustrated in FIG. 16 as first linear roller bearing assembly 1622a and second linear roller bearing assembly 1622b), a linear alternator (e.g., including an armature 1624 and a stator 1626), electrical connections (e.g., electrical connections 1628), a hot piston 1632 and a cold piston 1636. These components are disposed within a cylinder 1634 having surfaces 1634a and 1634b. To have a minimum clearance annular gap between the pistons 1632 and 1636 and the cylinder 1634, the hot piston 1632 and the cold piston 1636 should be precisely centered relative to the surfaces 1634a and 1634b.

The Stirling engine power module 1620 may further include a plurality of working gas-containing regions, e.g., working-gas region 1638a (i.e., a "hot working gas-containing region"), working-gas region 1638b (i.e., a "cold working gas-containing region"), working-gas region 1638c (i.e., a cold-end bounce gas region) and working-gas region 1638d (i.e., a hot-end bounce gas region), within which a working gas (e.g., helium, hydrogen, nitrogen, air, or the like) can be contained. The hot piston 1632 is disposed at the "hot end" of the Stirling engine power module 1620 and the cold piston 1636 is disposed at the "cold end" of the Stirling engine power module 1620. As exemplarily illustrated, the working-gas region 1638a adjacent to the hot piston 1632 is disposed at the hot end of the Stirling engine power module 1620 and the working-gas region 1638a adjacent to the working gas heater 1644 and cold piston 1636 is disposed at the cold end of the Stirling engine power module 1620.

The Stirling engine power module 1620 may further include a working gas cooler (e.g., working gas cooler 1640), a regenerator 1642 (e.g., regenerator 1642), a working gas heater (e.g., working gas heater 1644), fuel 1646, a burner outlet 1648, a cold-end heat exchanger, gas-fired furnaces, biomass heat sources, coolant 1652 and a burner 1654. Working gas manifolds such as working gas manifolds 1656 may be disposed at opposite ends of the Stirling engine power module 1620 to couple the Stirling engine power module 1620 with other Stirling engine power modules as necessary. An insulator 1658 may be provided to substantially surround the Stirling engine power module 1620.

The Stirling engine power module 1620 may further include centering springs (e.g., first centering springs 1660a-1 and 1660b-1, second centering springs 1660a-2 and 1660b-2 and third centering springs 1660a-3 and 1660b-3) and spring mounting blocks (e.g., first spring mounting blocks 1662a-1 and 1662b-1, second spring mounting blocks 1662a-2 and 1662b-2 and third spring mounting blocks 1662a-3 and 1662b-3). One function of the centering springs 1658 is to maintain the mid-stroke position of the moving components to be axially centered within the Stirling engine power module 1620. The centering springs 1658 also provide additional axial spring rate as required for the Stirling engine power module 1620.

In one embodiment, the first linear roller bearing assembly 1622a and second linear roller bearing assembly 1622b may each be provided as the linear roller bearing assembly described above with respect to the eleventh embodiment. The armature 1624 and stator 1626 are disposed between the first linear roller bearing assembly 1622a and second linear roller bearing assembly 1622b. In one embodiment, the armature 1624 and stator 1626 may abut the first linear roller bearing assembly 1622a and second linear roller bearing assembly 1622b. The armature 1624 and stator 1626 may be provided in any manner known in the art. In one embodiment, the armature 1624 and/or stator 1626 may include wire windings, or may include magnets instead of or in addition to wire windings.

In one embodiment, the armature 1624 may be coupled to the first linear roller bearing assembly 1622a and second linear roller bearing assembly 1622b by being threadedly engaged with bores formed in the hubs (e.g., hub 1422, see FIG. 14) of the linear roller bearing assemblies 1622a and 1622b. Similarly, the stator 1626 may be coupled to the first linear roller bearing assembly 1622a and second linear roller bearing assembly 1622b by being threadedly engaged with bores (e.g., bores 1428-1, 1428-2, and 1428-3, see FIG. 14) formed in the collars (e.g., collar 1424, see FIG. 14) of the linear roller bearing assemblies 1622a and 1622b.

In one embodiment, the hot piston 1632 may include a thermally insulated cap (not shown) to reduce axial heat conduction within the cylinder 1634. The insulated cap may include a material such as stainless steel or other material having a suitably high resistance to melting during operation of the Stirling engine power module 1620. In other embodiments, the insulated cap contains a thermal insulation material such as a ceramic material, an insulative gas (e.g., Xe) or the like or a combination thereof. In still other embodiments, the insulated cap can include an evacuated (vacuum) chamber including thermal radiation shields. When provided as an evacuated chamber, the pressure within the insulated cap can be optimized to ensure structural stability of the insulated cap during operation of the Stirling engine power module 1620. In yet another embodiment, the insulated cap can include a chamber having a small bleed orifice in a wall of the hot cap. The bleed orifice can enable working gas within the cylinder 1634 to fill the hot cap at nominally average system pressure. The hot piston 1632 may be coupled to the first linear roller bearing assembly 1622a by being threadedly engaged with the bore formed in the hub (e.g., hub 1422, see FIG. 14) of the first linear roller bearing assembly 1622a. Likewise, the cold piston 1636 may be coupled to the second linear roller bearing assembly 1622b by being threadedly engaged with the bore formed in the hub (e.g., hub 1422, see FIG. 14) of the second linear roller bearing assembly 1624b.

Although the Stirling engine power module 1620 has been described above as including linear roller bearing assemblies such as that described above with respect to the thirteenth embodiment, it will be appreciated that the Stirling engine power module 1620 may include two or more of any of the linear roller bearing assemblies described herein, or other types of linear bearing assemblies as well. Further although the linear roller bearing assemblies 1622a and 1622b as each including roller bearing sub-assemblies such as those described above, with respect to FIG. 1, it will be appreciated that any linear roller bearing assembly may include any roller bearing sub-assembly described herein.

The working gas cooler 1640 can be formed from a high thermal conductivity material such as copper, brass, aluminum, or the like or a combination thereof, and be configured into cylindrical finned structures as commonly used in radiators, or other liquid/gas heat exchangers.

The regenerator 1642 can be formed from fine metal wires or thin foils configured so as to define uniform gas flow passages. The fine metal wires can be felted and sinter bonded to form a porous structure. The thin foils can be configured in parallel flat or concentric patterns. The regenerator 1642 can be formed from materials such as high temperature stainless steel.

The working gas heater 1644 can be formed from a high temperature material such as super alloys containing nickel and chrome, or any materials commonly used in jet engines. The working gas heater 1644 can be configured with flat plates or tubular passageways, which the working gas can pass over and through to facilitate heat transfer.

The axial distance between the working gas cooler 1640 and the working gas heater 1644 may be made as large as desired to prevent excessive heat transfer between the working gas heater 1644 and the working gas cooler 1640. In addition, the thickness of the wall of the cylinder 1634 may be as thin as desired to prevent excessive axial conduction down the cylinder wall between the working gas heater 1644 and the working gas cooler 1640, but should be thick enough to adequately contain the working gas, which is contained within the working gas-containing regions 1638a, 1638b, 1638c and 1638d at significantly elevated pressures.

The burner 1654 is configured to burn fuel 1646 and is in close thermal contact with the working gas heater 1644 around the perimeter of the cylinder 1634. Upon burning the fuel 1646, heat is generated which is then transmitted to the working gas heater 1644 about the perimeter of the cylinder 1634. The fuel 1646 may include natural gas, propane, fuel oil, kerosene, gasoline, JP4 fuel, biomass, or the like or a combination thereof.

The cold-end heat exchanger 1650 is configured to route the coolant 1652 in close thermal contact with the working gas cooler 1640 around the perimeter of the cylinder 1634. Heat within the working gas contained in the working gas-containing region 1638b is transferred to the coolant 1652 that is routed through the cold-end heat exchanger 1650. The coolant 1652 may include water-based anti-freeze fluids (e.g., ethylene glycol) or high conductivity oils. In one embodiment, the coolant 1652 can be any long-life, permanent anti-freeze fluid as used in commercial engine systems.

The insulator 1658 may be formed from high temperature ceramic fibers, a vacuum form of insulation with concentric separated metal foils. In low-temperature regions (e.g., in regions adjacent to the cold-end heat exchanger 1650, working gas cooler 1640 and cold piston 1636), the insulator 1658 can be formed from foam plastics such as Styrofoam, fiber glass, or the like or a combination thereof. Thicknesses of the insulator 1658 can be in the range of about 2 cm to about 8 cm.

The centering springs 1660a-1, 1660a-2 and 1660a-3 are coupled between respective ones of the spring mounting blocks 1662a-1, 1662a-2 and 1662a-3 and the hot piston 1632. Likewise, the centering springs 1660b-1, 1660b-2 and 1660b-3 are coupled between respective ones of the spring mounting blocks 1662b-1, 1662b-2 and 1662b-3 and the cold piston 1636. The spring mounting blocks 1662a-1, 1662b-1, 1662a-2, 1662b-2, 1662a-3 and 1662b-3 are, in turn, fixed to the cylinder 1634, or they may be integrally formed with the cylinder 1634.

Although FIG. 16 illustrates wherein the Stirling engine power module 1620 includes a burner 1654 to provide heat to the working gas within the working gas-containing region 1638a, working gas within the working gas-containing region 1638a can be heated by any suitable heat source. For example, sunlight can be focused onto the Stirling engine power module 1620 by a solar concentrator (e.g., a reflective, parabolic dish). Other heat sources include geothermal heat sources, nuclear heat sources, biological heat sources, two-phase thermal storage systems, gas-fired furnaces, biomass heat sources, waste heat sources, and the like.

The Stirling engine power module 1620 is part of a multi-cylinder Stirling engine, which is interconnected with the working gas manifolds 1656 to create a closed-loop series configuration. In the theoretical Stirling cycle, working gas pressures in each adjacent Stirling engine power module vary with a phase difference. This phase difference, along with changing gas pressures, and component motions are complexly dependent on the spring-mass properties of the moving components along with the thermodynamic and gas dynamic properties so as to create an efficiently performing engine. The burner 1654 converts chemical energy stored within the fuel 1646 into heat, which is conducted into the gas heater 1644 where it heats the working gas and raises its pressure within the working gas-containing region 1638*a*. The regenerator 1642 functions to cyclically store heat from the hot working gas as it flows through it and to give the heat back as the working gas flows back. The gas cooler 1640 receives heat from the working gas which lowers its temperature and pressure. The cold-end gas exchanger 1650 accepts the heat from the gas cooler 1640 as well as parasitic heat conducted by wall of cylinder 1634 and rejects this waste heat to the coolant 1652.

The linear roller bearing assemblies 1622*a* and 1622*b* support and precisely guide movement of the pistons 1632 and 1636 and armature 1624 within the cylinder 1634 so that a narrow annular clearance seal is formed between the hot piston 1632 and surface 1634*a* and between the cold piston 1636 and the surface 1634*b*, and so that an "air gap" is formed between the armature 1624 and the stator 1626. The clearance seal between the hot piston 1632 and surface 1634*a* should be adequate to prevent excessive working gas leakage between the working gas-containing regions 1638*a* and 1638*d*. The clearance seal between the cold piston 1636 and surface 1634*b* should be adequate to prevent excessive working gas leakage between the working gas-containing regions 1638*b* and 1638*c*.

The "air gap" between the armature 1624 and stator 1626 is typically wider than the aforementioned clearance seals. Therefore, to prevent excessive working gas leakage between the working gas-containing regions 1638*c* and 1638*d*, a liner or sleeve (not shown) can be attached to the armature 1624 and/or the stator 1626 to form a clearance seal sufficiently narrow to prevent excessive working gas leakage between the working gas-containing regions 1638*c* and 1638*d*. The liner may be formed of a non-ferromagnetic material such as plastic or the like. All of these non-contact clearance seals prevent wear and results in infinite piston seal life.

The hot piston 1632 and one end of the armature 1624 (i.e., a "hot end of the armature 1624") are exposed to the working-gas containing region 1638*d*. Likewise, the cold piston 1636 and another end of the armature 1624 (i.e., a "cold end of the armature 1624") are exposed to the working-gas containing region 1638*c*. In the illustrated embodiment, the area of the hot piston 1632 that is exposed to the working gas-containing region 1638*d* is larger than the area of the hot end of the armature 1624 that is exposed to the working gas-containing region 1638*d*. Likewise, the area of the cold piston 1636 that is exposed to the working gas-containing region 1638*c* is larger than the area of the cold end of the armature 1624 that is exposed to the working gas-containing region 1638*c*.

During operation of a multi-cylinder Stirling engine formed of many Stirling engine power modules 1620, pressure rises and falls within the working gas-containing region 1638*a* of one Stirling engine power module 1620 in a phased, cyclic manner when pressure rises and falls within the working gas-containing region 1638*a* of an adjacent Stirling engine power module 1620. The phased, cyclic pressure fluctuations alternately produce high and low pressures that act on the hot and cold pistons 1632 and 1636 and cause the armature 1624 to reciprocate along the aforementioned selected direction indicated by arrow 140. The aforementioned differences in exposed areas of the hot and cold pistons 1632 and 1636 relative to the hot and cold ends of the armature 1624 produce restoring forces (e.g., gas spring restoring forces) that help to reverse motion of the hot and cold pistons 1632 and 1636, and the armature 1624, during operation of the Stirling engine power module 1620. In this sense, the armature 1624 also functions as a piston, herein also referred to as an "armature piston 1624." Motion of the armature 1624 relative to the stator 1626 causes the stator 1626 to produce electric power, which can be accessed at the electrical connections 1628. The cyclic operation of the Stirling engine power module 1620 as exemplarily described above produces a double-acting, high-power density engine/alternator.

Constructed as described above, the hot piston 1632, cold piston 1636, components of the linear alternator, and working gas-containing regions 1638*c* and 1638*d* form a gas spring-mass system. The gas spring-mass system can be tuned at least by adjusting the volume of the working gas-containing regions 1638*c* and 1638*d*, by adjusting the average working gas pressure, by adjusting the exposure area of the hot piston 1632 and/or the armature 1624 to the working gas-containing region 1638*d*, by adjusting the exposure area of the cold piston 1636 and/or the armature 1624 to the working gas-containing region 1638*c*, by adjusting the mass of the armature 1624, the hot piston 1632 and/or the cold piston 1636, or the like or a combination thereof. Tuning the gas spring-mass system appropriately may help to allow the armature 1624 to achieve a desired resonant operating frequency (e.g., 60 Hz).

In one embodiment, the gas spring-mass system is tuned by increasing or decreasing the exposure area of the hot and cold ends of the armature 1624. When the exposure area of the hot and cold ends of the armature 1624 decrease, the natural frequency of the gas spring-mass system increases and the gas spring becomes more stiff; when the exposure area of the hot and cold ends of the armature 1624 increase, the natural frequency of the gas spring-mass system decreases and the gas spring becomes less stiff.

In another embodiment, the gas spring-mass system is tuned by decreasing the volume of the working gas-containing regions 1638*c* and 1638*d*. Decreasing the volume of the working gas-containing regions 1638*c* and 1638*d* causes the gas spring to become more stiff, which increases the natural frequency of the gas spring-mass system.

The armature 1624 and stator 1626 may be provided in any manner as desired. For example, the armature 1624 may include one or more magnets, one or more conductive windings, or a combination thereof. In one embodiment, one or more of the linear bearing assemblies 1622*a* and 1622*b* includes at least one electrical connector as exemplarily described above with respect to the sixth embodiment. In such an embodiment, the armature 1624 may include one or more conductive windings that are electrically connected to one or more of the electrical connectors which, in turn, may be connected to a power source (not shown). In one embodiment, the armature 1624 includes three conductive windings and each conductive winding is electrically connected to a different electrical conductor. In one embodiment, the stator 1626 may include conductive windings. When the stator 1626 includes conductive windings, electrical power may be applied to at least one conductive winding of the armature 1624 sufficient to move the armature 1624 relative to the stator 1626 (e.g., along the selected direction indicated by arrow 140), thereby adjusting the mid-stroke position of the armature 1624, as well as the pistons 1632 and 1636.

In the illustrated embodiment, clearance seals are formed between the hot piston 1632 and surface 1634*a* of the cylinder 1634 as well as between the cold piston 1636 and the surface 1634*b* of the cylinder 1634. In another embodiment, however, the size of the hot piston 1632 and cold piston 1636 could be changed and mating cylinders (not shown) could be secured to the cylinder 1634. The mating cylinders can be secured to portions of the cylinder that are radially adjacent to the hot and cold pistons having the changed size to provide clearance seals as described above. By adjusting or changing the size of the hot piston 1632 and the cold piston 1636, the overall weight of the gas spring-mass system can be adjusted, which may help to allow the armature 1624 to achieve a desired resonant operating frequency (e.g., 60 Hz).

Constructed as described above, the linear roller bearing assemblies 1622a and 1622b support and precisely guide movement of the hot piston 1632 and the cold piston 1636 relative to the cylinder surfaces 1634a and 1634b of the Stirling engine cycle 1620. Likewise, the linear roller bearing assemblies 1622a and 1622b support and precisely guide movement of the armature 1624 relative to the stator 1626. The stroke length of the hot and cold pistons 1632 and 1636 and overall operating frequency of the Stirling engine cycle 1620 can be increased by using linear roller bearing assemblies as exemplarily described herein instead of conventional bearings such as flexure-type bearings. Accordingly, the Stirling engine cycle 1620 can enjoy increased system efficiency and power density compared to Stirling engine cycles incorporating conventional flexure bearings. Moreover, use of the linear roller bearing assemblies as exemplarily described herein can advantageously lower the operating cost of the Stirling engine cycle 1620, as well as reduce the cost to manufacture the Stirling engine cycle 1620 and lower its weight.

Figure 17:
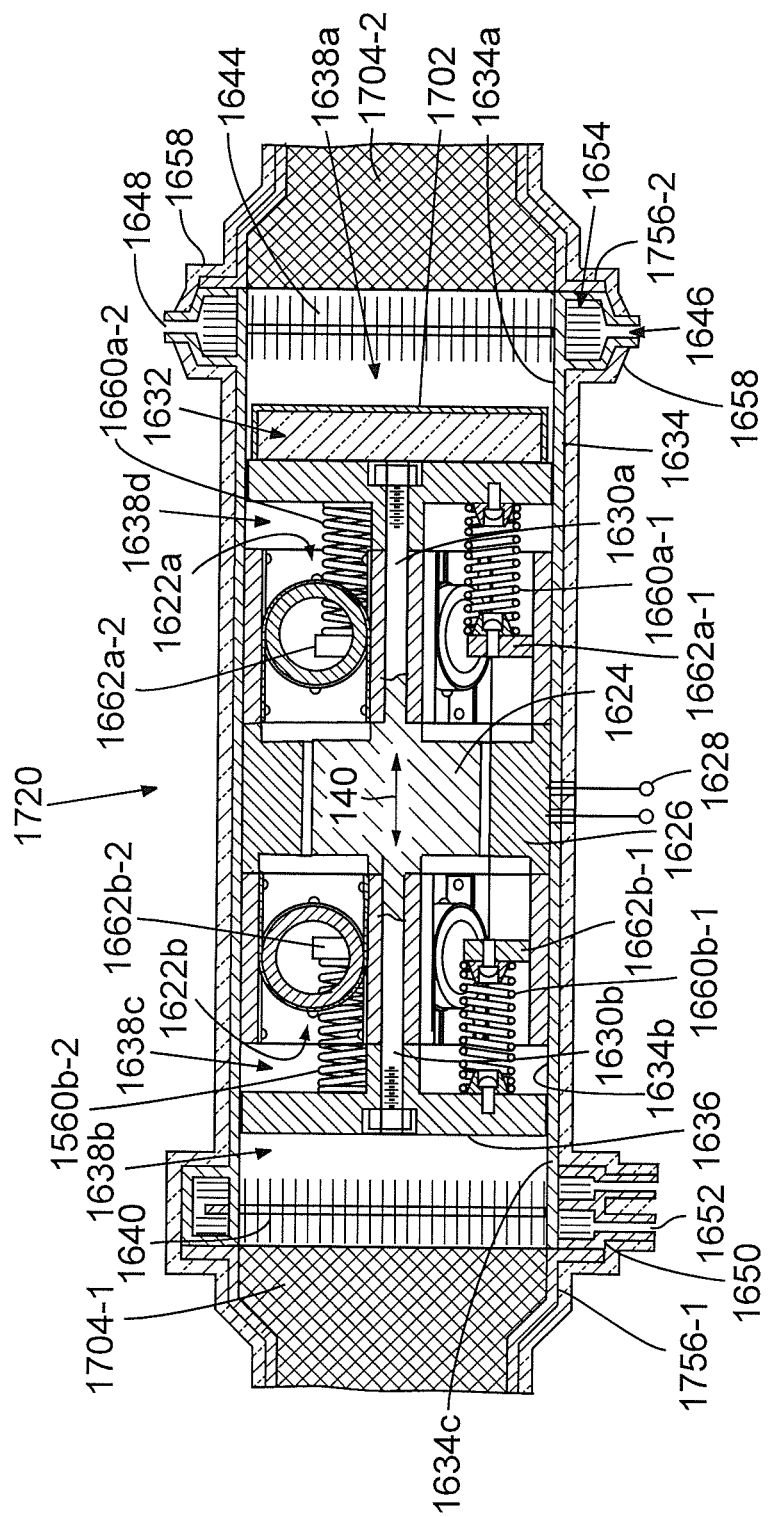
FIG. 17 is a partial cross-sectional view of a Stirling engine power module incorporating a linear roller bearing assembly having a plurality of roller bearing sub-assemblies, such as the roller bearing sub-assembly illustrated in FIG. 1, according to a fifteenth embodiment of the invention.

FIG. 17 is a partial cross-sectional view of a Stirling engine power module incorporating a linear roller bearing assembly having a plurality of roller bearing sub-assemblies, such as the roller bearing sub-assembly illustrated in FIG. 1, according to a fifteenth embodiment of the invention.

Referring to FIG. 17, a Stirling engine power module 1720 according to a fifteenth embodiment may be similar to the Stirling engine power module 1620. In the illustrated embodiment, the hot piston 1632 may include a thermally insulated cap 1702 (e.g., an insulated cap such as that described above with respect to the Stirling engine power module 1620) to reduce axial heat conduction within the cylinder 1634. In addition, working gas manifolds such as first working gas manifold 1756-1 and second working gas manifold 1756-2 (each generically referred to as a "working gas manifold 1756") may be disposed at opposite ends of the Stirling engine power module 1720 to couple the Stirling engine power module 1720 with other Stirling engine power modules as necessary. The insulator 1658 may be provided to substantially surround the Stirling engine power module 1720, as well as working gas manifolds 1756. The first working gas manifold 1756-1 may include a first regenerator 1704-1 disposed therein, which is in thermal communication with the working gas cooler 1640. The first regenerator 1704-1 may also thermally communicate with a working gas heater (not shown) of another Stirling engine power module coupled to the first working gas manifold 1756-1. Likewise, the second working gas manifold 1756-2 may include a second regenerator 1704-2 disposed therein, which is in thermal communication with the working gas heater 1644. The second regenerator 1704-2 may also thermally communicate with a working gas cooler (not shown) of another Stirling engine power module coupled to the second working gas manifold 1756-2. By providing the first and second regenerators 1704-1 and 1704-2 within corresponding working gas manifolds 1756, the working gas dead volume within the working gas manifolds 1756 can be reduced or eliminated entirely, permitting efficient use of working gas during operation of the Stirling engine power module 1720.

Figure 18:
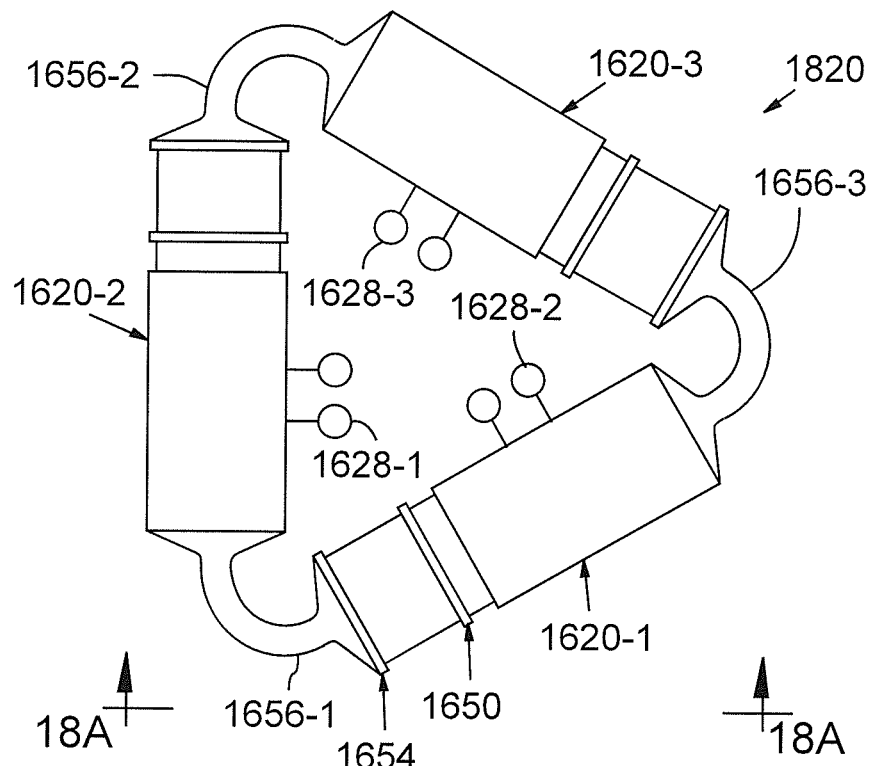
FIG. 18 is a top view of a multi-cylinder Stirling engine incorporating a plurality of Stirling engine power modules, such as the Stirling engine power module illustrated in FIG. 16, according to a sixteenth embodiment of the invention.

FIG. 18 is a top view of a multi-cylinder Stirling engine incorporating a plurality of Stirling engine power modules, such as the Stirling engine power module illustrated in FIG. 16, according to a sixteenth embodiment of the invention.

Figure 18A:
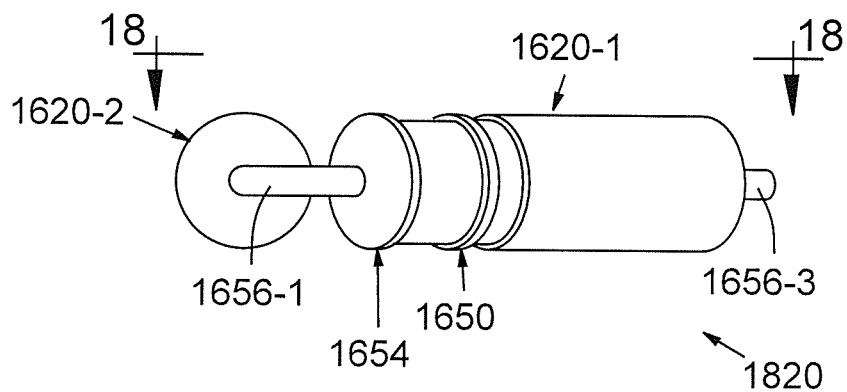
FIG. 18A is a side view of the multi-cylinder Stirling engine shown in FIG. 18, taken along line 18A-18A of FIG. 18.

FIG. 18A is a side view of the Stirling engine system shown in FIG. 18, taken along line 18A-18A of FIG. 18.

Referring to FIGS. 18 and 18A, a multi-cylinder Stirling engine 1820 includes Stirling engine power modules (e.g., a first Stirling engine power module 1620-1, a second Stirling engine power module 1620-2 and a third Stirling engine power module 1620-3, each generically referred to as the aforementioned "Stirling engine power module 1620") connected together by working gas manifolds (e.g., a first working gas manifold 1656-1, a second working gas manifold 1656-2 and a third working gas manifold 1656-3, each generically referred to as the aforementioned "working gas manifold 1656").

Within the multi-cylinder Stirling engine 1820, the Stirling engine power modules 1620 are disposed in a closed loop having a triangular shape, and are all disposed in a single level (e.g., such that bottom and/or top surfaces of the Stirling engine power modules 1620 are coplanar with each other). Each Stirling engine power module 1620 is connected to another Stirling engine power module 1620 by a working gas manifold 1656. Thus, the Stirling engine power modules 1620 are connected in series with each other via the working gas manifolds 1656.

The Stirling engine power modules 1620-1, 1620-2 and 1620-3 may each be provided as the Stirling engine power module 1620 described above with respect to the twelfth embodiment. Accordingly, the working gas-containing region 1638a at the hot end of one Stirling engine power module 1620 communicates directly with the working gas-containing region 1638a at the cold end of another Stirling engine power module 1620 via a working gas manifold. In other embodiments, however, the multi-cylinder Stirling engine 1820 may include any type of Stirling engine power module.

In one embodiment, heat can be delivered to the working gas-containing regions 1638a of some or all of the Stirling engine power modules 1620 from a common heat source (not shown). In another embodiment, however, heat can be delivered to the working gas-containing regions 1638a of one or more or all of the Stirling engine power modules 1620 from an independent heat source (not shown). Exemplary heat sources include burner such as a burner 1654, concentrated solar heat sources, geothermal heat sources, nuclear heat sources, biological heat sources, two-phase thermal storage systems, gas-fired furnaces, biomass heat sources, waste heat sources, or the like or a combination thereof.

Constructed as described above, the Stirling engine power modules 1620 operate 120 degrees (or approximately 120 degrees) out of phase with each other. The result of the operational phase difference between the various Stirling engine power modules 1620 is that high thermodynamic engine efficiency and power density can be achieved and vibration caused by piston motion in one Stirling engine power module can be effectively cancelled out in the rotary direction by vibration caused by piston motion in the other Stirling engine power modules.

Constructed as described above, the multi-cylinder Stirling engine 1820 provides compact manifolding between the different Stirling engine power modules so as to minimize working gas dead volume. The arrangement of Stirling engine power modules and configuration of working gas manifolds creates a flat triangular pattern, which can be practical for installations requiring a low profile while also providing a multi-cycle Stirling engine at relatively low cost. The illustrated multi-cylinder Stirling engine 1820 outputs 3-phase electric power, which can be useful in many applications. Power output by the multi-cylinder Stirling engine 1820 may also be rectified or modified using one or more suitable electronic control devices (not shown). Engine output wires (not shown) can be made relatively small for 3-phase power output delivery.

Although the multi-stage Stirling engine 1820 has been described as including only three Stirling engine power modules connected together in series, it will be appreciated that the multi-cylinder Stirling engine 1820 may include more than three Stirling engine power modules connected together in series to increase power and efficiency, reduce phase lag between cycles, and to reduce flow and dead volume losses in the working gas manifolds.

In one embodiment, the number of Stirling engine power modules included within the multi-cylinder Stirling engine 1820 corresponds to the number of sides of the closed loop. In such an embodiment, in a multi-cylinder Stirling engine 1820 including four Stirling engine power modules, the shape of the closed loop would resemble a square, or be rectangular. In a multi-cylinder Stirling engine 1820 including five Stirling engine power modules, the shape of the closed loop would be pentagonal. Thus, closed loop shape of the multi-cylinder Stirling engine 1820 can be any polygonal shape (e.g., hexagonal, heptagonal, octagonal, etc.), depending on the number of Stirling engine power modules (e.g., six, seven, eight, etc.) that are included within the multi-cylinder Stirling engine. It will be appreciated that the operational phase difference between each adjacent Stirling engine power module can correspond to the number of sides of the closed loop. For example, when the closed loop of the Stirling engine 1820 has four sides, the operational phase difference between adjacent Stirling engine modules is approximately 90 degrees.

Figure 19:
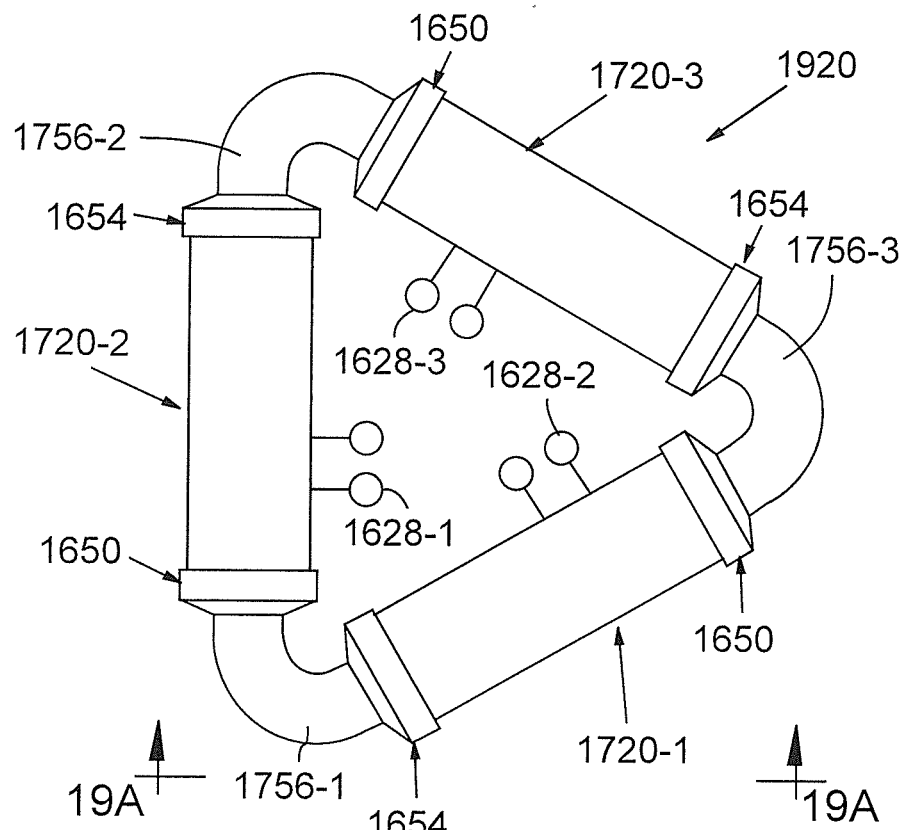
FIG. 19 is a top view of a multi-cylinder Stirling engine incorporating a plurality of Stirling engine power modules, such as the Stirling engine power module illustrated in FIG. 17, according to a seventeenth embodiment of the invention.
Figure 19A:
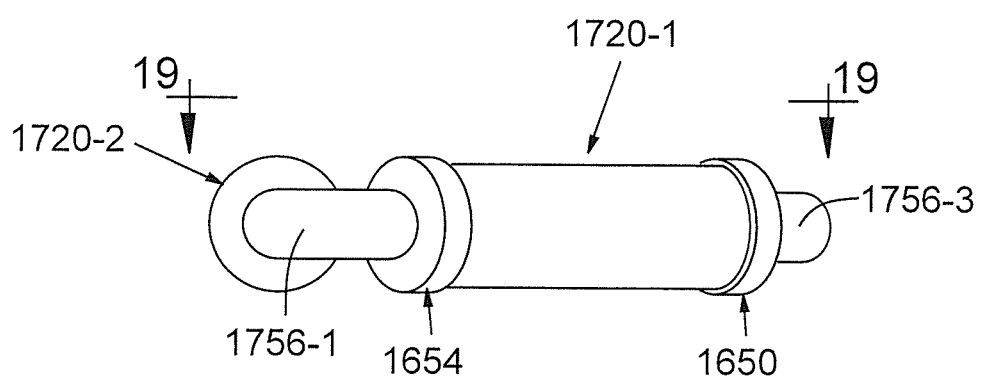
FIG. 19A is a side view of the multi-cylinder Stirling engine shown in FIG. 19, taken along line 19A-19A of FIG. 19.

FIG. 19 is a top view of a multi-cylinder Stirling engine incorporating a plurality of Stirling engine power modules, such as the Stirling engine power module illustrated in FIG. 17, according to a seventeenth embodiment of the invention. FIG. 19A is a side view of the multi-cylinder Stirling engine shown in FIG. 19, taken along line 19A-19A of FIG. 19.

Referring to FIGS. 19 and 19A, a multi-cylinder Stirling engine 1920 may be provided in a similar manner as discussed above with respect to the multi-cylinder Stirling engine 1820. The multi-cylinder Stirling engine 1920, however, may include Stirling engine power modules such as a first Stirling engine power module 1720-1, a second Stirling engine power module 1720-2 and a third Stirling engine power module 1720-3, each generically referred to as the aforementioned "Stirling engine power module 1720") connected together by working gas manifolds (e.g., a first working gas manifold 1756-1, a second working gas manifold 1756-2 and a third working gas manifold 1756-3, each generically referred to as the aforementioned "working gas manifold 1756"). It will be appreciated that the operation of the multi-cylinder Stirling engine 1920 may be similar to the operation of the multi-cylinder Stirling engine 1820 discussed above.

Figure 20:
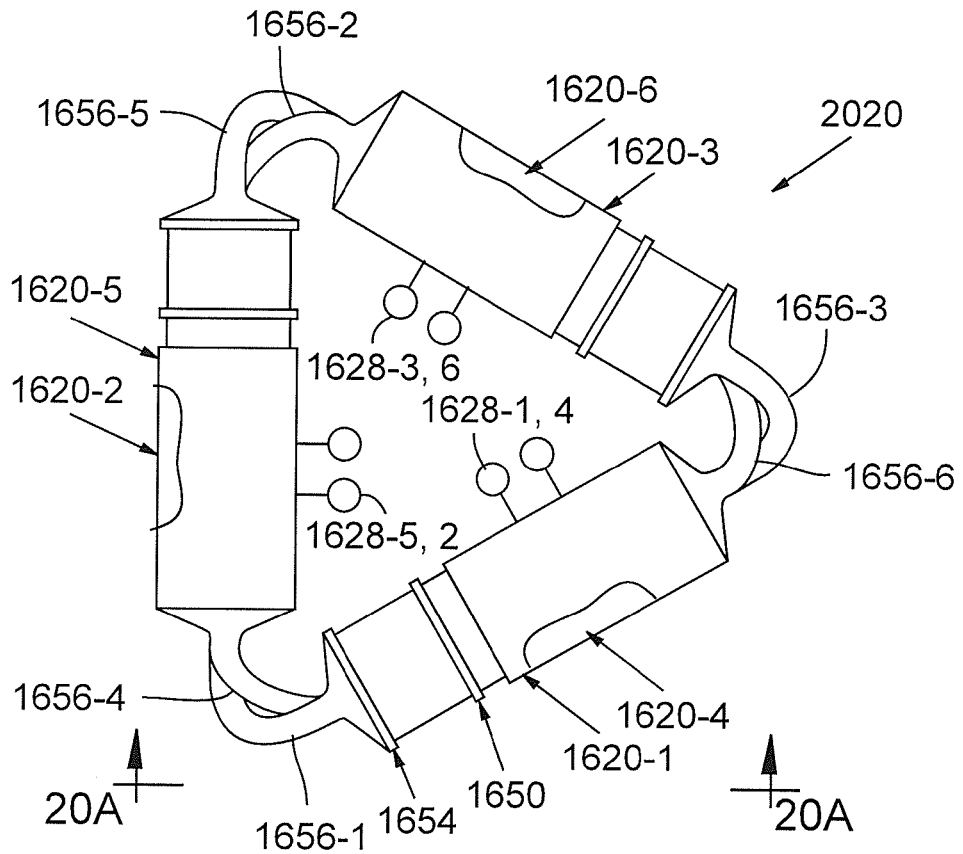
FIG. 20 is a top view of a multi-cylinder Stirling engine incorporating a plurality of Stirling engine power modules, such as the Stirling engine power module illustrated in FIG. 16, according to an eighteenth embodiment of the invention.
Figure 20A:
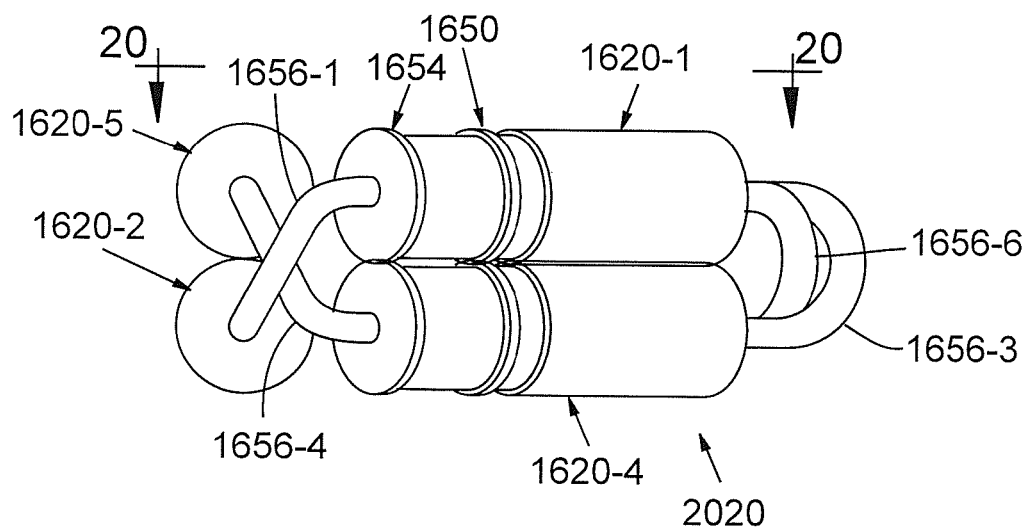
FIG. 20A is a side view of the multi-cylinder Stirling engine shown in FIG. 20, taken along line 20A-20A of FIG. 20, according to one embodiment.
Figure 20B:
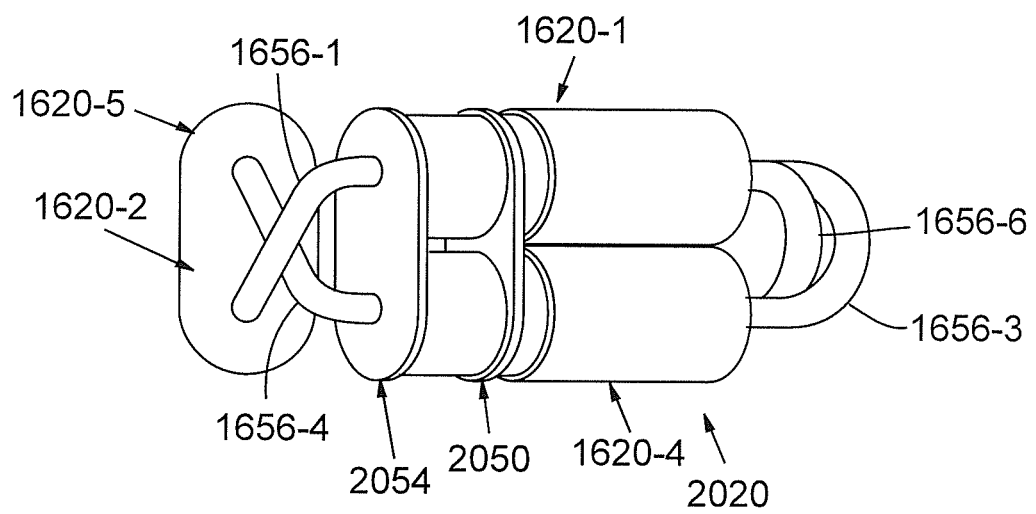
FIG. 20B is a side view of the multi-cylinder Stirling engine shown in FIG. 20, taken along line 20A-20A of FIG. 20, according to another embodiment.

FIG. 20 is a top view of a Stirling engine system incorporating a plurality of Stirling engine power modules, such as the Stirling engine power module illustrated in FIG. 20, according to an eighteenth embodiment of the invention. FIG. 20A is a side view of the multi-cylinder Stirling engine shown in FIG. 20, taken along line 20A-20A of FIG. 20, according to one embodiment. FIG. 20B is a side view of the multi-cylinder Stirling engine shown in FIG. 20, taken along line 20A-20A of FIG. 20, according to another embodiment.

Referring to FIGS. 20 and 20A, a multi-cylinder Stirling engine 2020 includes Stirling engine power modules (e.g., a first Stirling engine power module 1620-1, a second Stirling engine power module 1620-2, a third Stirling engine power module 1620-3, a fourth Stirling engine power module 1620-4, a fifth Stirling engine power module 1620-6 and a sixth Stirling engine power module 1620-6, each generically referred to herein as the aforementioned "Stirling engine power module 1620") connected together by working gas manifolds (e.g., a first working gas manifold 1656-1, a second working gas manifold 1656-2, a third working gas manifold 1656-3, a fourth working gas manifold 1656-4, a fifth working gas manifold 1656-5 and a sixth working gas manifold 1656-6, each generically referred to herein as the aforementioned "working gas manifold 1656").

Within the multi-cylinder Stirling engine 2020, the Stirling engine power modules 1620 are disposed in a closed loop having two levels also having the aforementioned triangular shape. For example, the first, third and fifth Stirling engine power modules 1620-1, 1620-3 and 1620-5 are disposed in an upper level of the multi-cylinder Stirling engine 2020 and the second, fourth and sixth Stirling engine power modules 1620-2, 1620-4 and 1620-6 are disposed in a lower level of the multi-cylinder Stirling engine 2020.

The Stirling engine power modules 1620 are connected in series with each other via the working gas manifolds 1656 such that the first, third and fifth working gas manifolds 1656-1, 1656-3 and 1656-5 route working gas from Stirling engine power modules 1620 in the upper level to corresponding Stirling engine power modules 1620 in the lower level, and such that the second, fourth and sixth working gas manifolds 1656-2, 1656-4 and 1656-6 route working gas from Stirling engine power modules 1620 in the lower level to corresponding Stirling engine power modules 1620 in the upper level.

In the illustrated embodiment, the Stirling engine power modules 1620-1, 1620-2, 1620-3, 1620-4, 1620-5 and 1620-6 may each be provided as the Stirling engine power module 1620 described above with respect to the twelfth embodiment. Accordingly, the working gas-containing region 1638$a$ of one Stirling engine power module communicates directly with the working gas-containing region 1638$a$ of another Stirling engine power module via a working gas manifold. In other embodiments, however, the multi-cylinder Stirling engine 2020 may include any type of Stirling engine power module.

In the embodiment illustrated in FIG. 20A, the cold-end heat exchanger 1650 and burner 1654 of a Stirling engine power module arranged at one position in the upper level (e.g., the first Stirling engine power module 1620-1) are aligned with the cold-end heat exchanger 1650 and burner 1654 of another Stirling engine power module arranged at a corresponding position in the lower level (e.g., the fourth Stirling engine power module 1620-4). Accordingly, in the embodiment illustrated in FIG. 20B, a single, monolithic burner 2054 can be used to heat the working gas within the first and fourth Stirling engine power modules 1620-1 and 1620-4 (as well as other pairs of overlapping Stirling engine power modules). Likewise a single, monolithic cold-end heat exchanger 2050 can be used to cool the working gas within the first and fourth Stirling engine power modules 1620-1 and 1620-4 (as well as other pairs of overlapping Stirling engine power modules).

In one embodiment, heat can be delivered to the working gas-containing regions 1638$a$ of some or all of the Stirling engine power modules 1620 from a common heat source (not shown). In another embodiment, however, heat can be delivered to the working gas-containing regions 1638$a$ of one or more of all of the Stirling engine power modules 1620 from an independent heat source (not shown).

Similar to the multi-cylinder Stirling engine 1820, the multi-cylinder Stirling engine 2020 provides compact manifolding between the different Stirling engine power modules. The arrangement of Stirling engine power modules and configuration of working gas manifolds also creates a relatively flat triangular pattern, which can be practical for installations requiring a low profile while also providing a multi-cycle Stirling engine at relatively low cost. Also similar to the multi-cylinder Stirling engine 1820, the illustrated multi-cylinder Stirling engine 2020 outputs 3-phase electric power, which can be useful in many applications, and power output by the multi-cylinder Stirling engine 2020 may be rectified or modified using one or more suitable electronic control devices (not shown). If each Stirling engine power module in the upper level is electrically connected in parallel to an adjacent Stirling engine power module in the lower level, the multi-cylinder Stirling engine 2020 can output 3-phase electric power.

Constructed as described above, the Stirling engine power modules 1620 operate 60 degrees (or approximately 60 degrees) out of phase with each other. That is, operation of the first Stirling engine power module 1620-1 can be 60 degrees out of phase with operation of the second Stirling engine power module 1620-2, operation of the second Stirling engine power module 1620-2 can be 60 degrees out of phase with operation of the third Stirling engine power module 1620-3, and so on. The result of the operational phase difference between the various Stirling engine power modules is that high thermodynamic engine efficiency and power density can be achieved.

Also due to the configuration of the multi-cylinder Stirling engine 2020, operation of the first Stirling engine power module 1620-1 can be 180 degrees out of phase with operation of the fourth Stirling engine power module 1620-4, operation of the second Stirling engine power module 1620-2 can be 180 degrees out of phase with operation of the fifth Stirling engine power module 1620-5 and operation of the third Stirling engine power module 1620-3 can be 180 degrees out of phase with operation of the sixth Stirling engine power module 1620-6. The result of the operational phase difference is that the direction of piston motion in one Stirling engine power module arranged at one position in the upper level (e.g., first Stirling engine power module 1420-1) is opposite the direction of piston motion in another Stirling engine power module arranged at a corresponding position in the lower level (e.g., fourth Stirling engine power module 1420-4). Consequently, any vibration caused by piston motion in one Stirling engine power module arranged at one position in the upper level is effectively cancelled out in the rotary direction by vibration caused by piston motion in the other Stirling engine power module arranged at the corresponding position in the lower level. Vibration between the upper and lower levels of Stirling engine power modules is also minimal due to the cancellation of vibratory moments between levels.

In one embodiment, the number of Stirling engine power modules included within the multi-cylinder Stirling engine 2020 corresponds to the number of sides of the closed loop. In such an embodiment, in a multi-cylinder Stirling engine 2020 including eight Stirling engine power modules (e.g., with four Stirling engine power modules in each level), the shape of the closed loop would resemble a square, or be rectangular. In a multi-cylinder Stirling engine 2020 including ten Stirling engine power modules (e.g., with five Stirling engine power modules in each level), the shape of the closed loop would be pentagonal. Thus, closed loop shape of the multi-cylinder Stirling engine 2020 can be any polygonal shape (e.g., hexagonal, heptagonal, octagonal, etc.), depending on the number of Stirling engine power modules (e.g., six, seven, eight, etc.) that are included within each level of the multi-cylinder Stirling engine. It will be appreciated that the operational phase difference between each adjacent Stirling engine power module can correspond to the number of sides of the closed loop. For example, when the closed loop of the Stirling engine 2020 has four sides, the operational phase difference between adjacent Stirling engine modules is approximately 45 degrees.

Figure 21:
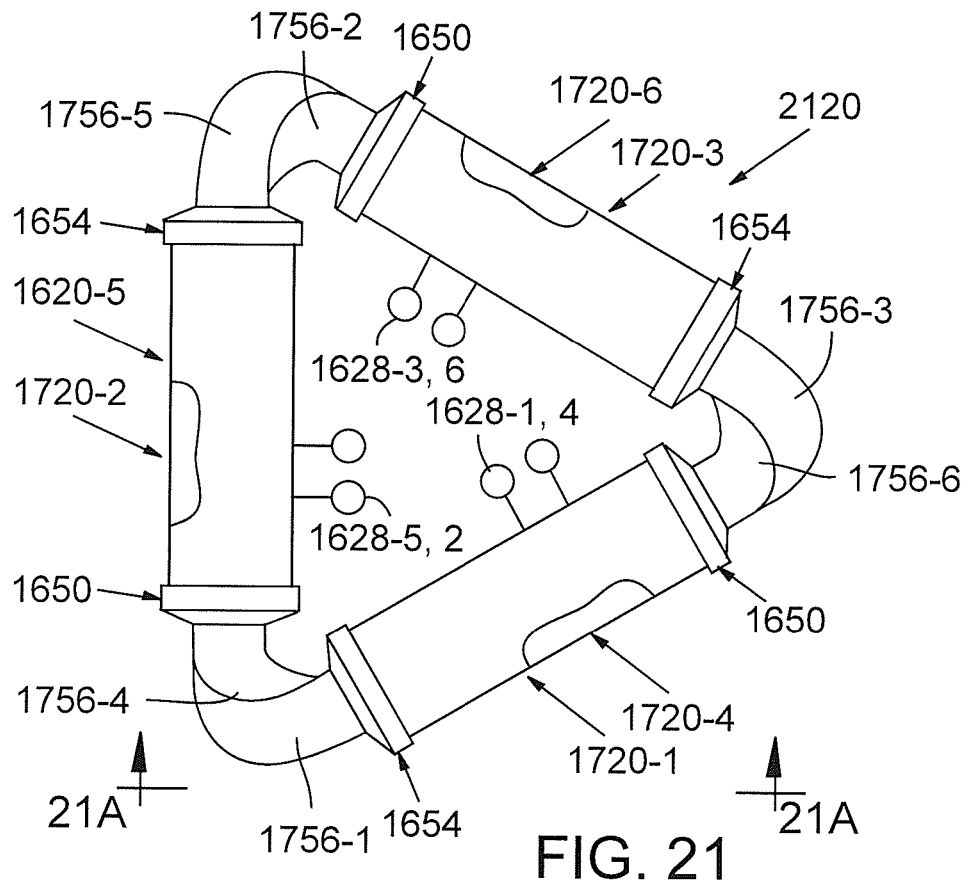
FIG. 21 is a top view of a multi-cylinder Stirling engine incorporating a plurality of Stirling engine power modules, such as the Stirling engine power module illustrated in FIG. 17, according to a nineteenth embodiment of the invention.
Figure 21A:
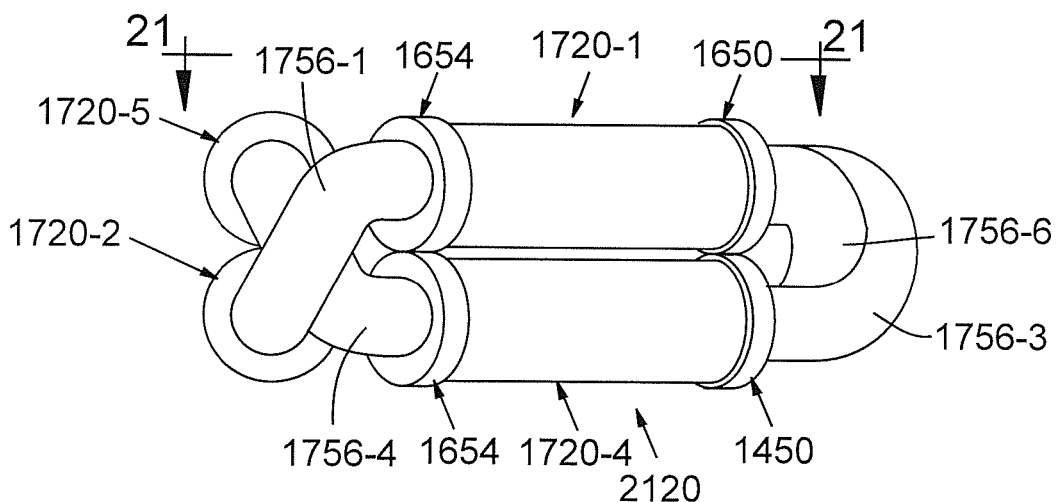
FIG. 21A is a side view of the multi-cylinder Stirling engine shown in FIG. 21, taken along line 21A-21A of FIG. 21, according to one embodiment.
Figure 21B:
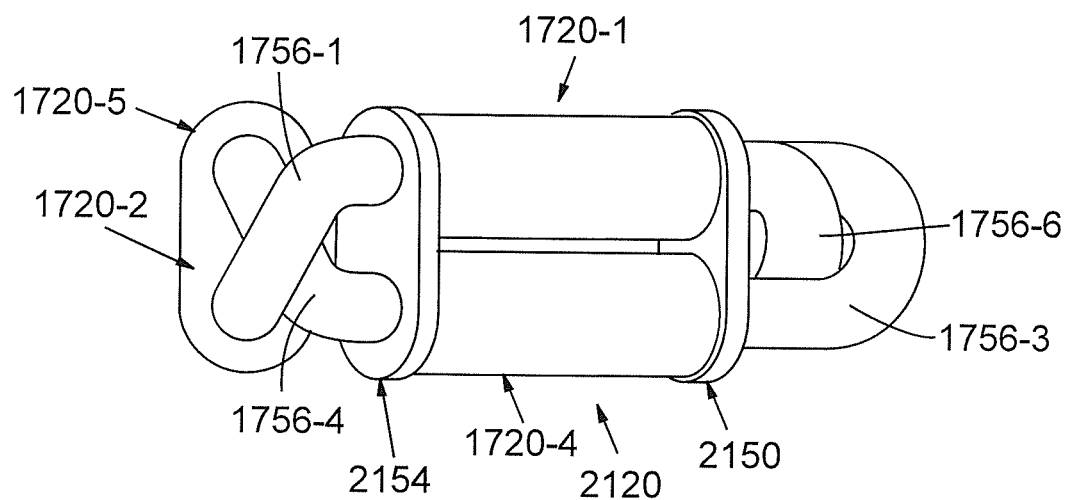
FIG. 21B is a side view of the multi-cylinder Stirling engine shown in FIG. 21, taken along line 21A-21A of FIG. 21, according to another embodiment.

FIG. 21 is a top view of a multi-cylinder Stirling engine incorporating a plurality of Stirling engine power modules, such as the Stirling engine power module illustrated in FIG. 17, according to a nineteenth embodiment of the invention. FIG. 21A is a side view of the multi-cylinder Stirling engine shown in FIG. 21, taken along line 21A-21A of FIG. 21, according to one embodiment. FIG. 21B is a side view of the multi-cylinder Stirling engine shown in FIG. 21, taken along line 21A-21A of FIG. 21, according to another embodiment.

Referring to FIGS. 21 and 21A, a multi-cylinder Stirling engine 2120 may be provided in a similar manner as discussed above with respect to the multi-cylinder Stirling engine 2020. The multi-cylinder Stirling engine 2120, however, may include Stirling engine power modules (e.g., a first Stirling engine power module 1720-1, a second Stirling engine power module 1720-2, a third Stirling engine power module 1720-3, a fourth Stirling engine power module 1720-4, a fifth Stirling engine power module 1720-6 and a sixth Stirling engine power module 1720-6, each generically referred to herein as the aforementioned "Stirling engine power module 1720") connected together by working gas manifolds (e.g., a first working gas manifold 1756-1, a second working gas manifold 1756-2, a third working gas manifold 1756-3, a fourth working gas manifold 1756-4, a fifth working gas manifold 1756-5 and a sixth working gas manifold 1756-6, each generically referred to herein as the aforementioned "working gas manifold 1756"). It will be appreciated that the operation of the multi-cylinder Stirling engine 2120 may be similar to the operation of the multi-cylinder Stirling engine 2020 discussed above.

In the embodiment illustrated in FIG. 21A, the cold-end heat exchanger 1650 and burner 1654 of a Stirling engine power module arranged at one position in the upper level (e.g., the first Stirling engine power module 1720-1) are aligned with the cold-end heat exchanger 1650 and burner 1654 of another Stirling engine power module arranged at a corresponding position in the lower level (e.g., the fourth Stirling engine power module 1720-4). Accordingly, in the embodiment illustrated in FIG. 21B, a single, monolithic burner 2154 can be used to heat the working gas within the first and fourth Stirling engine power modules 1720-1 and 1720-4 (as well as other pairs of overlapping Stirling engine power modules). Likewise a single, monolithic cold-end heat exchanger 2150 can be used to cool the working gas within the first and fourth Stirling engine power modules 1720-1 and 1720-4 (as well as other pairs of overlapping Stirling engine power modules). It will be appreciated that the operation of the multi-cylinder Stirling engine 2120 shown in FIG. 21B may be similar to the operation of the multi-cylinder Stirling engine 2020 discussed above with respect to FIG. 20B.

Stirling Engine Using Thermal Energy Recovery System

Figure 22:
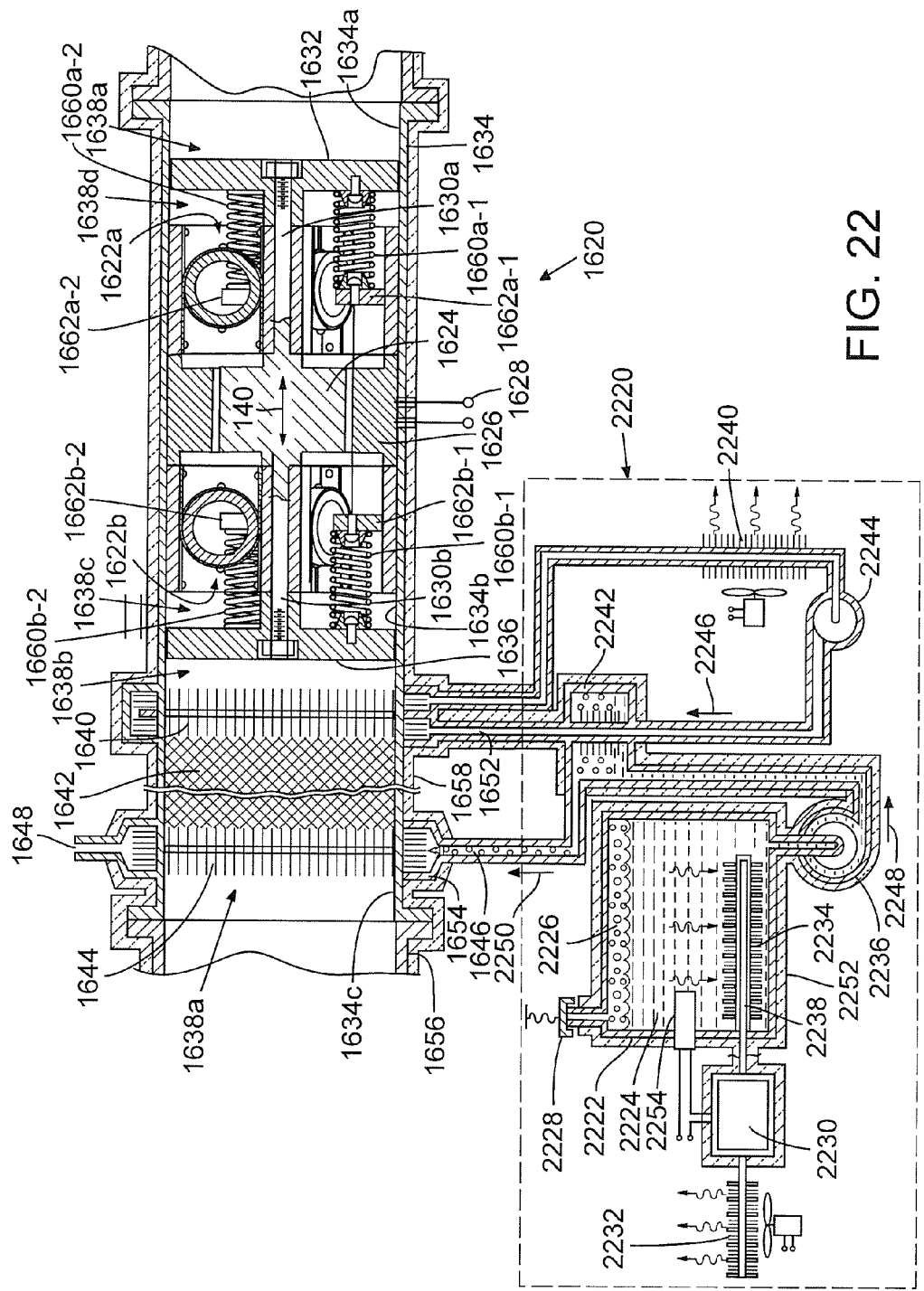
FIG. 22 is a cross-sectional, schematic view of a Stirling engine according to a twentieth embodiment of the invention.

FIG. 22 is a cross-sectional, schematic view of a Stirling engine according to a twentieth embodiment of the invention.

The thermodynamic (Carnot) efficiency of a Stirling engine is directly proportional to the ratio of the absolute temperature of working gas in the working gas-containing region 1638*b* to the absolute temperature of working gas in the working gas-containing region 1638a. The thermal energy recovery system 2220 shown in FIG. 22 can lower the temperature of the working gas in the working gas-containing region 1638b, thereby increasing the thermodynamic efficiency of the Stirling engine power module 1620 and its power density, which results in reduced fuel consumption, size, weight and operational cost of the Stirling engine power module 1620.

According to the twentieth embodiment, a Stirling engine may include a Stirling engine power module and a gasifier. The Stirling engine power module may include a cylinder having an interior configured to retain a working gas, a hot piston and a cold piston reciprocatably moveable within the interior of the cylinder, a burner disposed adjacent to the cylinder and configured to burn gaseous fuel and transmit heat to the interior of the cylinder and a cold-end heat exchanger disposed adjacent to the cylinder and configured to allow coolant to circulate and remove heat from the interior of the cylinder. The gasifier may be coupled to the burner and the cold-end heat exchanger and include a fuel-side thermal-exchange region configured to receive low-temperature liquid fuel retained within a fuel source, and a coolant-side thermal-exchange region configured to receive coolant circulated through the cold-end heat exchanger. The fuel- and coolant-side thermal-exchange regions can be in thermal contact with each other such that thermal energy of coolant received within the coolant-side thermal-exchange region is transferable to liquid fuel received at the fuel-side thermal exchange region to decrease the temperature of the coolant. The gasifier is configured to return coolant within the coolant-side thermal exchange region to the cold-end heat exchanger. A more detailed discussion of an exemplary thermal energy recovery system will now be described with respect to FIG. 22.

Referring to FIG. 22, a Stirling engine includes at least one Stirling engine power module (e.g., Stirling engine power module 1620) and the thermal energy recovery system 2220. The thermal energy recovery system 2220 includes a fuel source (e.g., a tank 2222 configured to retain a liquefied fuel 2224 and fuel vapor 2226 and having a fill cap 2228 incorporating a safety release valve), a cryocooler (e.g., cryocooler 2230), an ambient heat rejecter (e.g., ambient heat rejecter 2232), a heat acceptor (e.g., heat acceptor 2234), a fuel pump (e.g., fuel pump 2236), a thermal coupler (e.g., thermal coupler 2238), a conventional engine radiator (e.g., radiator 2240), a gasifier (e.g., gasifier 2242), a coolant pump (e.g., coolant pump 2244), an insulator (e.g., insulator 2252) and a fuel temperature switch (e.g., fuel temperature switch 2254). In other embodiments, the fill cap 2228 and safety release valve may be separate components. Also shown in FIG. 22 is a Stirling engine that includes at least one Stirling engine power module (e.g., the Stirling engine power module 1620). The thermal energy recovery system 2220 can be coupled to the burner 1654 and the cold-end heat exchanger 1650 of one or more Stirling engine power modules 1620. In one embodiment, the radiator 2240 may be omitted.

Within the thermal energy recovery system 2220, the tank 2222 stores a liquefied fuel 2224 which, when heated, can be used as the fuel 1646 for the burner 1654 to burn. In one embodiment, the liquefied fuel 2224 is liquefied natural gas (LNG), which has a boiling point of −162 degrees Centigrade. The liquefied fuel 2224 can be maintained within the tank 2222 at cryogenic temperatures by the cryocooler 2230, and its associated heat acceptor 2234 and ambient heat rejecter 2232. The fuel temperature switch 2254 controls the cryocooler 2230 to maintain the temperature of the liquefied fuel 2224 within a predetermined range (below the boiling point thereof). The safety relief valve 2228 prevents pressure from building within the tank 2222 to unacceptable levels if the liquefied fuel 2224 were to boil, thereby generating pressurized fuel vapor 2226.

The fuel pump 2236 communicates with the tank 2222 (e.g., via one or more pipes) to deliver the liquefied fuel 2224 to the gasifier 2242 (e.g., to a fuel-side thermal exchange region), as indicated by arrow 2248. A coolant-side thermal exchange region of the gasifier 2242 communicates with the coolant pump 2244 (e.g., via one or more pipes), which circulates coolant 1652 from the cold-end heat exchanger 1650 across the conventional engine radiator 2240 (e.g., as indicated by arrow 2246). As a result, the coolant 1652 that enters the coolant-side thermal exchange region of the gasifier has less thermal energy than the coolant 1652 that is initially output by cold-end heat exchanger 1650. Further, the coolant 1652 entering the coolant-side thermal exchange region of the gasifier 2242 has a higher temperature than the liquefied fuel 2224 that enters into the fuel-side thermal exchange region of the gasifier 2242.

When the fuel 2224 enters into the fuel-side thermal exchange region of the gasifier 2242, thermal energy corresponding to the sensible heat and latent heat of vaporization of the fuel 2224 is transferred from the coolant 1652 to the fuel 2224. As a result of the thermal transfer, the fuel 2224 can be vaporized as fuel 1646 which can be readily burned at burner 1654. Upon transferring thermal energy from the coolant 1652 to the fuel 2224, the thermal energy (temperature) of the coolant 1652 is further lowered before it is returned to the cold-end heat exchanger 1650. To facilitate the thermal transfer, one or both of the fuel- and coolant-side thermal exchange regions of the gasifier 2224 may comprise any known structures such as fins, tubes, wires, etc., formed of materials having a high-thermal conductivity (e.g., copper, brass, aluminum, or the like or a combination thereof).

Constructed as described above, the thermal energy recovery system 2220 improves the thermodynamic performance of the Stirling engine 1620 by lowering the temperature of the working gas in the working gas-containing region 1638b while reducing the energy required by the burner 1654 to burn the fuel 1646.

In one embodiment, the fuel 2224 can be cooled below its normal boiling point temperature (e.g., periodically) by the cryocooler 2230. The Stirling engine power module 1620 can operate for extended time and at even higher thermal efficiency on this reduced thermal energy in the sub-cooled fuel 2224. Operating costs can also be reduced by sub-cooling the fuel 2224 at times of off-peak power demand.

In the illustrated embodiment, the cryocooler 2230 is an integral part of the thermal energy recovery system 2220. In other embodiments, however, the cryocooler 2230 can be detached from the tank 2224 by, for example, removing the thermal coupler 2238 from the heat acceptor 2234 and disconnecting the electrical connections to the fuel temperature switch 2254.

Figure 23:
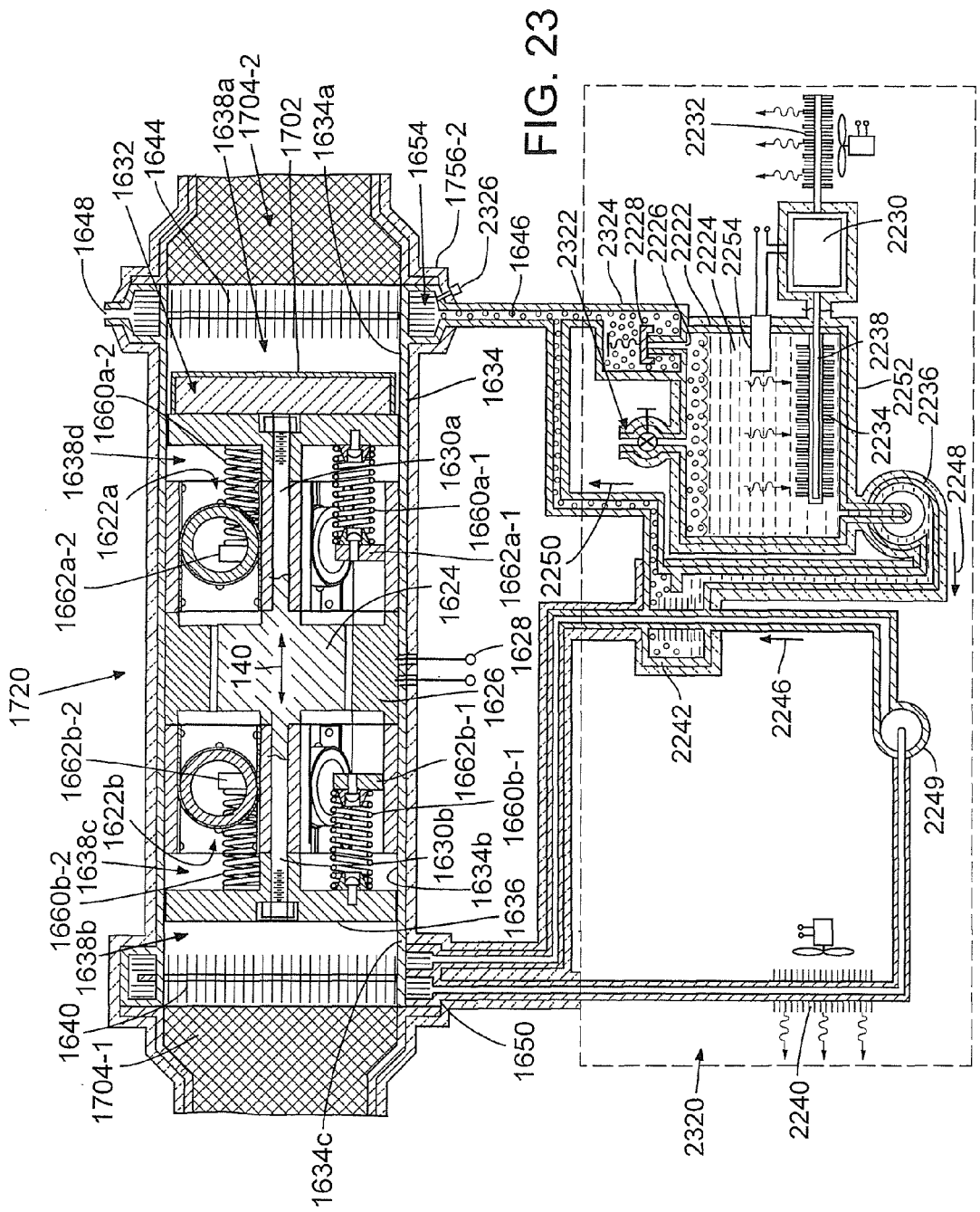
FIG. 23 is a cross-sectional, schematic view of a Stirling engine according to a twenty-first embodiment of the invention.

FIG. 23 is a cross-sectional, schematic view of a Stirling engine according to a twenty-first embodiment of the invention.

Referring to FIG. 23, a Stirling engine includes at least one Stirling engine power module (e.g., Stirling engine power module 1720) and a thermal energy recovery system 2320. Generally, the thermal energy recovery system 2320 includes the same components as the thermal energy recovery system 2220, but the components are configured differently to accommodate the spaced-apart configuration of the cold-end heat exchanger 1650 and the burner 1654 relative to the Stirling engine power module 1720.

In the illustrated embodiment, the thermal energy recovery system 2320 may further include a fuel supply valve 2322 coupled to the tank 2222. The fuel supply valve 2322 may further be configured to be coupled to a gaseous fuel supply to feed gaseous fuel into the tank 2222. The gaseous fuel fed into the tank 2222 can then be liquefied as it is cooled to cryogenic temperatures by the cryocooler 2230, and its associated heat acceptor 2234 and ambient heat rejecter 2232.

In the illustrated embodiment, the thermal energy recovery system 2320 may further include a fuel vapor return conduit 2324 configured to feed fuel vapor 2226 escaping the tank 2222 via the safety relief valve 2228 back to the burner 1654, so that it may be burned by the burner 1654. In one embodiment, the a pilot light 2326 may be provided to burn fuel vapor fed by the fuel vapor return conduit 2324 even when the burner 1654 is not on.

Roller Bearing Sub-Assembly Components

Figure 24:
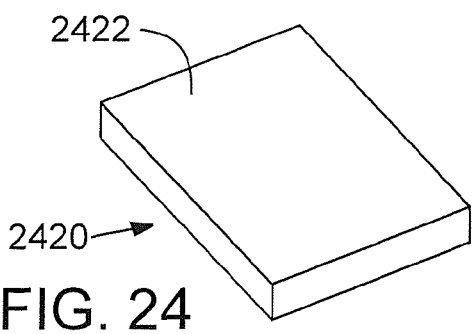
FIGS. 24-28 are perspective views of various mounting portions in roller bearing sub-assemblies, according to some embodiments of the invention.

FIGS. 24 to-28 are perspective views of various mounting portions in roller bearing sub-assemblies, according to some embodiments of the invention.

Strap-supporting surfaces of the various mounting portions described above are planar along the longitudinal direction of the straps, as well as along a direction transverse to the longitudinal direction. This is generically shown in FIG. 24, where a mounting portion 2420 includes a strap-supporting surface 2422 that is planar along the longitudinal direction of the straps, as well as along a direction transverse to the longitudinal direction. This configuration generally functions well. But when mated with a flat strap, the roller bearing sub-assembly is vulnerable to binding up if a foreign particle becomes lodged between the strap and mounting portion. It can be useful to provide a mounting portion with a strap-supporting surface that includes troughs extending along the longitudinal direction of the straps (i.e., along the selected direction indicated by arrow 140) that can accept debris to prevent binding or other resistance to motion. Examples of such mounting portions are illustrated in FIGS. 25-28.

Figure 25:
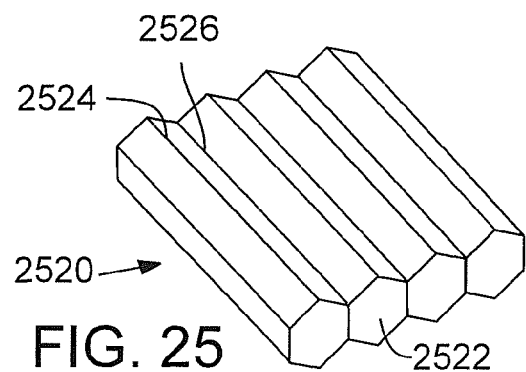

Referring to FIG. 25, a mounting portion may be provided as mounting portion 2520, including a plurality of polygonal rods 2522 bonded (e.g., by brazing, soldering, epoxy bonding, or the like or a combination thereof) or otherwise coupled together (e.g., by mechanical fasteners) to form a strap-supporting surface having ridges 2524 and troughs 2526 extending along the longitudinal direction of the straps. Although the mounting portion 2520 is illustrated as having rods 2522 that are hexagonal in cross-section, it will be appreciated that the rods 2522 may have any polygonal shape having an even number of sides when viewed in cross-section. It will also be appreciated that any of the mounting portions described above may be additionally configured to include the longitudinal ridges 2524 and troughs 2526 shown in FIG. 25.

Figure 26:
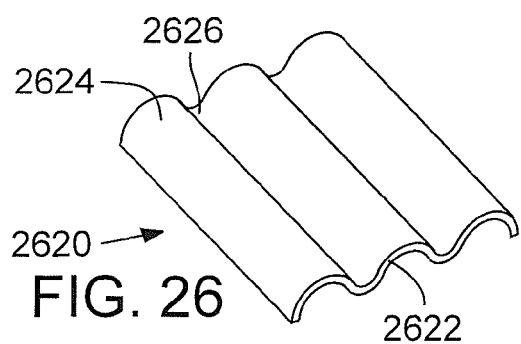

Referring to FIG. 26, a mounting portion may be provided as mounting portion 2620, including a corrugated sheet 2622 to form a strap-supporting surface having ridges 2624 and troughs 2626 extending along the longitudinal direction of the straps. It will also be appreciated that any of the mounting portions described above may be additionally configured to include the longitudinal ridges 2624 and troughs 2626 shown in FIG. 26.

Figure 27:
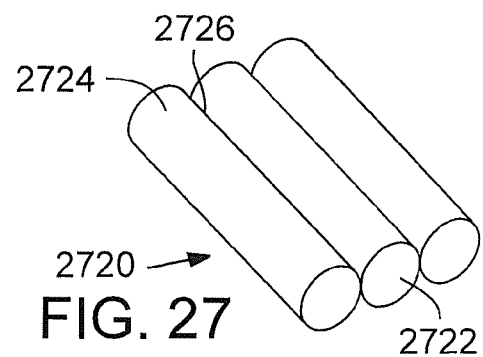

Referring to FIG. 27, a mounting portion may be provided as mounting portion 2720, including circular rods 2722 bonded (e.g., by brazing, soldering, epoxy bonding, or the like or a combination thereof) or otherwise coupled together (e.g., by mechanical fasteners) to form a strap-supporting surface having a plurality of ridges 2724 and a plurality of troughs 2726 extending along the longitudinal direction of the straps. Although the mounting portion 2720 is illustrated as having rods 2722 that are circular in cross-section, it will be appreciated that the rods 2722 may have an elliptical shape when viewed in cross-section. It will also be appreciated that any of the mounting portions described above may be additionally configured to include the longitudinal ridges 2724 and troughs 2726 shown in FIG. 27.

Figure 28:
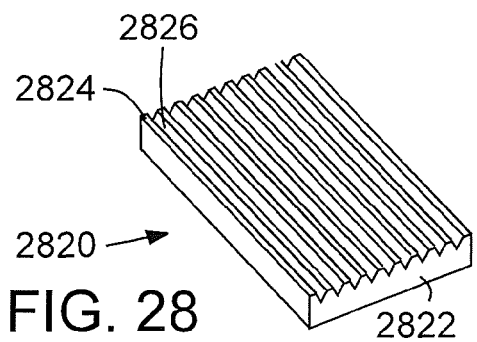
Figure 29:
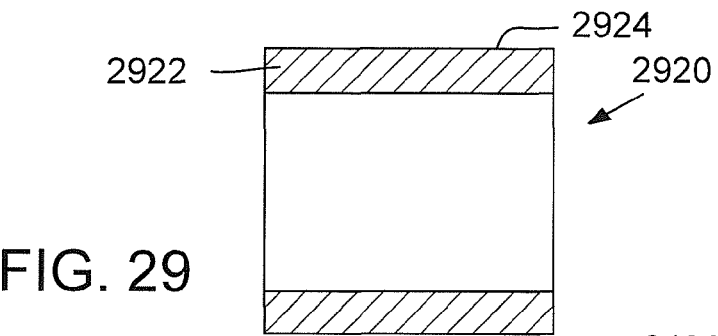
FIGS. 29-35 are cross-sectional views of rollers in roller bearing sub-assemblies according to some embodiments of the invention.
Figure 30:
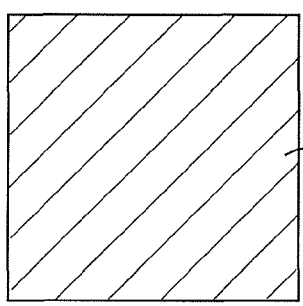

Referring to FIG. 28, a mounting portion may be provided as mounting portion 2820, including a contoured sheet 2822 configured to form a strap-supporting surface having a plurality of ridges 2824 and a plurality of troughs 2826 extending along the longitudinal direction of the straps. It will also be appreciated that any of the mounting portions described above may be additionally configured to include the longitudinal ridges 2824 and troughs 2826 shown in FIG. 28.

FIGS. 29 to 35 are cross-sectional views of rollers in roller bearing sub-assemblies according to some embodiments of the invention.

As described above, rollers are generally provided as hollow, cylindrical structures having a substantially constant diameter along their axis to produce a rolling surface that is planar along the axis of the roller. This is generically shown in FIG. 29, where a roller 2920 includes a hollow cylinder 2922 defining a rolling surface 2924 that is planar along its longitudinal axis. It will be appreciated that the rollers described herein can also be provided as solid rollers, such as roller 3020 having a solid cylinder 3022 shown in FIG. 30. These configurations generally function well. But when mated with a flat strap, the roller bearing sub-assembly is vulnerable to binding up if a foreign particle becomes lodged between a strap and the roller. It can be useful to provide the roller with troughs extending circumferentially around the roller (i.e., along the selected direction indicated by arrow 140), which accept debris to prevent binding or other resistance to motion. Examples of such rollers are illustrated in FIGS. 31-35. In all embodiments, it will be appreciated that light-weight rollers with reduced rotational moments of inertia advantageously allow a higher operational speed. Also, lower inertia forces reduce tensile loads in the straps and attachments imposed during reversal of roller direction at the ends of stroke. Additionally, thin-walled rollers can provide radial flexibility permitting radial pre-loading of the roller bearing sub-assembly.

Figure 31:
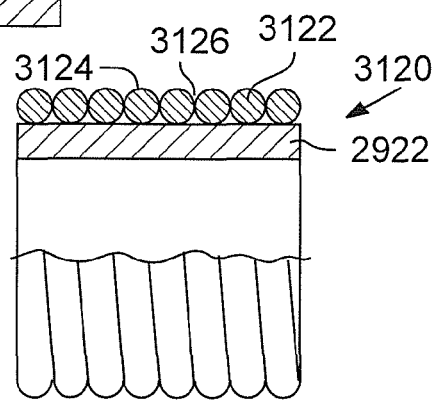

Referring to FIG. 31, a roller 3120 may include the cylinder 2922 and wire 3122 wrapped helically around the cylinder 2922 to form a rolling surface having helical ridges 3124 and helical troughs 3126 extending circumferentially around the cylinder 2922. It will be appreciated that any of the rollers described above may be additionally configured to include the circumferential ridges 3124 and troughs 3126 shown in FIG. 31.

Figure 32:
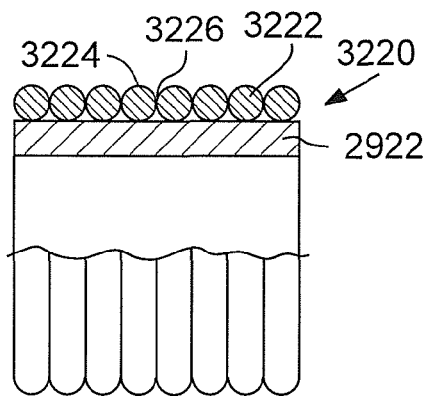

Referring to FIG. 32, a roller 3220 may include the cylinder 2922 and wires 3222 wrapped around the cylinder 2922 to form a rolling surface having ridges 3224 and troughs 3226 extending circumferentially around the cylinder 2922. It will be appreciated that any of the rollers described above may be additionally configured to include the circumferential ridges 3224 and troughs 3226 shown in FIG. 32.

Figure 33:
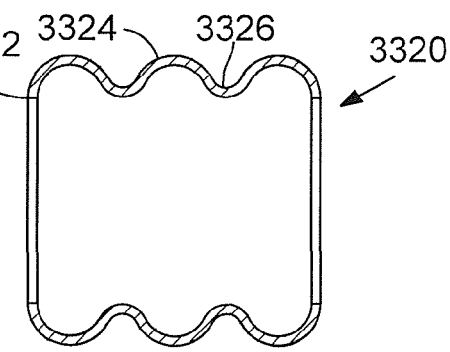

Referring to FIG. 33, a roller 3320 may include a corrugated cylinder 3322 forming a rolling surface configured to have ridges 3324 and troughs 3326 extending circumferentially around the cylinder 3322. It will be appreciated that any of the rollers described above may be additionally configured to include the circumferential ridges 3324 and troughs 3326 shown in FIG. 33.

Figure 34:
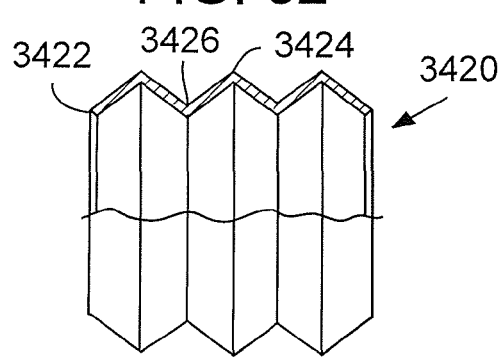

Referring to FIG. 34, a roller 3420 may include a corrugated cylinder 3422 forming a rolling surface configured to have ridges 3424 and troughs 3426 extending circumferentially around the cylinder 3422. It will be appreciated that any of the rollers described above may be additionally configured to include the circumferential ridges 3424 and troughs 3426 shown in FIG. 34.

Figure 35:
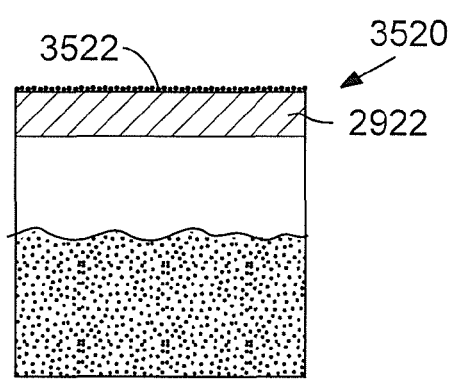

Referring to FIG. 35, a roller 3520 may include the cylinder 2922 and texturizing material 3522 formed on the cylinder 2922 dispersed on the rolling surface to form a tortuous arrangement of troughs or cavities. It will be appreciated that any of the rollers described above may be additionally configured to include the texturizing material.

FIGS. 36 to 40 are top views of straps in roller bearing sub-assemblies according to some embodiments of the invention. FIGS. 36A-40A are cross-sectional views of straps shown in FIGS. 36-40, respectively, according to some embodiments of the invention.

Straps described above are planar. This is generically shown in FIGS. 36 and 36A, where a strap 3620 includes a strap body 3622 having uniform width and attachment regions 3624 where attachments such as attachments 134, 136 and 138 attach the strap to various structures. This configuration generally functions well. But when mated with a flat mounting portion or roller, the roller bearing sub-assembly is vulnerable to binding up if a foreign particle becomes lodged between the strap and adjacent structures. It can be useful to configure one or more straps such that one or more strap surfaces includes troughs extending along the longitudinal direction of the straps (i.e., along the selected direction indicated by arrow 140) that can accept debris to prevent binding or other resistance to motion. Examples of such mounting portions are illustrated in FIGS. 37-34A.

Referring to FIGS. 37 and 37A, a strap 3720 includes strap bodies 3722 each having an attachment region 3624 and wires 3724 extending between adjacent strap bodies 3722. The wires 3724 may be attached to the strap bodies 3722 by any suitable method (e.g., by brazing, welding, soldering, adhesive bonding, sinter bonding, or the like or a combination thereof). The wires 3724 define ridges 3726 and troughs 3728 extending along the longitudinal direction of the strap 3720, which can accept debris to prevent binding or other resistance to motion. Lateral vibration of the wires 3724 can be damped by their close contact or by adjacent bonding (e.g., by brazing, welding, soldering, adhesive bonding, sinter bonding, or the like or a combination thereof).

Referring to FIGS. 38 and 38A, a strap 3820 includes a strap body 3822 having attachment regions 3624 and slots 3824 extending between adjacent attachment regions 3724. The slots 3824 extend along the longitudinal direction of the strap 3820, which can accept debris to prevent binding or other resistance to motion. The slots 3824 can be formed by, for example, providing a strap body such as strap body 3622 and forming slots therein according to any suitable method (e.g., by saw-cutting, drilling, punching, or the like, or a combination thereof).

Referring to FIGS. 39 and 39A, a strap 3920 includes the strap bodies 3922 and a wire 3924 extending between adjacent ones of the strap bodies 3922. Each wire 3924 may be attached to a strap body 3822 by any suitable method (e.g., by brazing, welding, soldering, adhesive bonding, sinter bonding, or the like or a combination thereof).

Referring to FIGS. 40 and 40A, a strap 4020 includes wires 4022 defining ridges 4024 and troughs 4026 extending along the longitudinal direction of the strap 4020, which can accept debris to prevent binding or other resistance to motion. Lateral vibration of the wires 4024 can be damped by their close contact or by adjacent bonding (e.g., by brazing, welding, soldering, adhesive bonding, sinter bonding, or the like or a combination thereof).

While the embodiments of the present invention have been particularly shown and described above, it will be understood by one of ordinary skill in the art that various changes in form and details may be made therein without departing from the spirit and scope of the present invention as defined by the following claims.

What is claimed is:

1. A roller bearing sub-assembly, comprising:
a first mounting portion;
a second mounting portion spaced apart from the first mounting portion;
a roller having a circumference and an axial length, and disposed between the first and second mounting portions;
a plurality of straps disposed along the axial length of the roller, each of the straps having opposite ends, the plurality of straps connecting the first and second mounting portions to the roller;
at least three of the plurality of the straps anchored at one opposite end to the roller; and
at least one of the plurality of the straps wrapped over the roller without being anchored thereto, and anchored at one opposite end to the first mounting portion and anchored at another opposite end to the second mounting portion;
wherein the configuration of the first mounting portion, the second mounting portion, the roller, and the straps permit relative movement of the first and second mounting portions along a linear distance substantially equal to the circumference of the roller.

2. The roller bearing sub-assembly according to claim 1, further comprising a tensioning device coupled to the first mounting portion, with one opposite end of at least one of the straps anchored to the tensioning device, for maintaining tension within the straps.

3. The roller bearing sub-assembly according to claim 1, wherein the roller is further defined as a first roller and further includes a second roller disposed between the first and second mounting portions, wherein at least one of the straps is wrapped partially over the first roller and the second roller.

4. The roller bearing sub-assembly according to claim 1, wherein the first mounting portion is coupled to a first component of a machine, and the second mounting portion is coupled to a second component of the machine such that the first and second components are moveable along a linear distance relative to each other.

5. The roller bearing sub-assembly according to claim 1, wherein at least one of the straps is formed of an electrically conductive material for electrically connecting a plurality of components within a machine.

6. The roller bearing sub-assembly according to claim 1, wherein the straps are further defined as a first peripheral strap (126), a first intermediate strap (622), a central strap (130), a second intermediate strap (624) and a second peripheral strap (128), and are arranged in sequence axially across the roller, each of the first peripheral strap (126), the central strap (130) and the second peripheral strap (128) are each anchored at one respective opposite end to the roller, the first peripheral and second peripheral straps (126, 128) are anchored at another respective opposite end to the first mounting portion (122), and the central strap (130) is anchored at another respective opposite end to the second mounting portion (124).

7. The roller bearing sub-assembly according to claim 6, wherein the first intermediate and second intermediate straps are each wrapped over the roller without being anchored thereto.

8. The roller bearing sub-assembly according to claim 6, wherein each of the first intermediate strap (622) and second intermediate strap (624) is connected at one respective opposite end to the first mounting portion (122) and is connected at another respective opposite end to the second mounting portion (124).

9. The roller bearing sub-assembly according to claim 8, further including a tensioning device coupled to the first mounting portion, with one opposite end of each of the first intermediate and second intermediate straps anchored to the tensioning device for maintaining tension within the straps.

10. The roller bearing sub-assembly according to claim 1, wherein:
the roller is further defined as a first roller (132a) and further includes a second roller (132b) spaced from and parallel to the first roller, with the first and second rollers disposed between the first and second mounting portions;
wherein the plurality of straps are further defined as a first peripheral strap (726), a first intermediate strap (732), a first central strap (730a), a second central strap (730b), a second intermediate strap (734) and a second peripheral strap (728);
each of the straps being wrapped over different portions of the first and second rollers, with at least four of the straps anchored respectively to the first and second rollers at respective opposite ends, and at least two of the straps anchored respectively to the first and second mounting portions at respective opposite ends;
wherein the first peripheral (726), first intermediate (732), first central (730a), second intermediate (734) and second peripheral (728) straps are arranged in sequence axially across the first roller (132a) and the first peripheral (726), first intermediate (732), second central (730b), second intermediate (734) and second peripheral (728) straps are arranged in sequence axially across the second roller (132b);
wherein the first peripheral strap is anchored at respective opposite ends to the first and second rollers with the first peripheral strap wrapped over the rollers in a first direction, and the first intermediate strap is anchored at respective opposite ends to the first and second rollers with the first intermediate strap wrapped over the rollers in a second direction, opposite the first direction, and
wherein the second intermediate strap is anchored at respective opposite ends to the first and second rollers with the second intermediate strap wrapped over the rollers in the second direction and second peripheral strap is anchored at respective opposite ends to the first and second rollers with the second peripheral strap wrapped over the rollers in the first direction; and
wherein the first central strap (730a) is wrapped over the first roller (132a), and is anchored at one opposite end to the first mounting portion (722) and anchored at another opposite end to the second mounting portion (724); and
wherein the second central strap (730b) is wrapped over the second roller (132b), and is anchored at one opposite end to the first mounting portion (722) and anchored at another opposite end to the second mounting portion (724).

11. The roller bearing subassembly according to claim 10, wherein each of the first peripheral and second peripheral straps are anchored to one of the first and second mounting portions at a point defined between the opposite ends of the respective strap.

12. The roller bearing subassembly according to claim 10, wherein each of the first intermediate and second intermediate straps are anchored to one of the mounting portions at a point defined between the opposite ends of the respective strap.

13. The roller bearing subassembly according to claim 10, wherein each of the first peripheral and second peripheral straps are anchored to the first mounting portion at a point defined between the opposite ends of the respective strap, and each of the first intermediate and second intermediate straps are anchored to the second mounting portion at a point defined between the opposite ends of the respective strap.

14. The roller bearing sub-assembly according to claim 10, further including a tensioning device coupled to at least one of the first and second mounting portions, with one opposite end of at least one of the first central strap and second central strap anchored to the tensioning device for maintaining tension within the straps.

15. The roller bearing sub-assembly according to claim 14, wherein the first central and second central straps are each wrapped over one of the first and second rollers without being anchored thereto.

16. The roller bearing sub-assembly according to claim 10, wherein the first peripheral strap is anchored to the first mounting portion between the first and second rollers and the first intermediate strap is anchored to the second mounting portion between the first and second rollers.

17. A dual roller bearing sub-assembly comprising:
a plurality of roller bearing sub-assemblies according to claim 16, including at least a first roller bearing sub-assembly and a second roller bearing sub-assembly; wherein
the mounting portions of the first roller bearing sub-assembly are coupled to the respective mounting portions of the second roller bearing sub-assembly, such that the first mounting portions are in first common plane and the second mounting portions are in second common plane, spaced from the first common plane.

18. A linear roller bearing assembly, comprising:
a plurality of roller bearing sub-assemblies according to claim 1;
a hub;
a collar disposed around the hub; wherein
at least three roller bearing sub-assemblies are disposed radially around the hub for guiding linear movement of the hub relative to the collar along a selected direction.

19. The linear roller bearing assembly according to claim 18, wherein the hub and collar each define an axis and are moveably coupled to each other such that the axis of the hub can be radially positioned with respect to the axis of the collar.

20. The linear roller bearing assembly according to claim 18,
wherein the first mounting portion and the second mounting portion each have a strap-supporting surface configured to contact the straps, and
wherein at least one of the strap-supporting surfaces includes at least one trough extending along the selected direction.

21. The linear roller bearing assembly according to claim 18, wherein at least one roller bearing sub-assembly includes at least one strap formed of an electrically conductive material for electrically connecting a plurality of components within a machine.

22. The linear roller bearing assembly according to claim 18, wherein the hub is coupled to a first component of a machine, and the collar is coupled to a second component of the machine such that the first and second components are moveable along a linear distance relative to each other.

23. The linear roller bearing assembly according to claim 22, wherein at least one of the first and second components of the machine is further defined as a reciprocatably moveable component of the machine.

24. The linear roller bearing assembly according to claim 22, wherein the machine is further defined as one of a Stirling engine, a cryocooler, a pump, and a refrigerator.

25. A roller bearing sub-assembly, comprising:
- a first mounting portion;
- a second mounting portion spaced apart from the first mounting portion;
- a roller disposed between the first and second mounting portions;
- a plurality of straps disposed along the axial length of the roller, each of the straps having opposite ends, the plurality of straps connecting the first and second mounting portions to the roller;
- at least three of the plurality of the straps anchored at one opposite end to the roller; and
- at least two of the plurality of the straps wrapped over the roller without being anchored thereto, and anchored at one opposite end to the first mounting portion and anchored at another opposite end to the second mounting portion;
- wherein the configuration of the first mounting portion, the second mounting portion, the roller, and the straps permit relative movement of the first and second mounting portions along a linear distance substantially equal to the circumference of the roller.

* * * * *